United States Patent
Kagalwala et al.

(10) Patent No.: US 7,653,652 B2
(45) Date of Patent: Jan. 26, 2010

(54) DATABASE SCHEMA FOR STRUCTURED QUERY LANGUAGE (SQL) SERVER

(75) Inventors: Raxit A. Kagalwala, Issaquah, WA (US); John Patrick Thompson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/919,682

(22) Filed: Aug. 17, 2004

(65) Prior Publication Data

US 2005/0027725 A1    Feb. 3, 2005

(51) Int. Cl.
G06F 7/00    (2006.01)

(52) U.S. Cl. ............... 707/103 R; 707/10; 707/100; 707/101; 707/102; 707/104.1

(58) Field of Classification Search ............ 707/10, 707/100–104.1; 717/100
See application file for complete search history.

(56) References Cited

U.S. PATENT DOCUMENTS

| | | | |
|---|---|---|---|
| 5,295,256 A * | 3/1994 | Bapat | 717/137 |
| 5,499,371 A * | 3/1996 | Henninger et al. | 717/108 |
| 5,504,885 A * | 4/1996 | Alashqur | 707/4 |
| 5,569,207 A | 10/1996 | Gisselberg et al. | |
| 5,596,745 A * | 1/1997 | Lai et al. | 707/103 R |
| 5,596,746 A * | 1/1997 | Shen et al. | 707/101 |
| 5,692,129 A * | 11/1997 | Sonderegger et al. | 707/103 R |
| 5,742,813 A | 4/1998 | Kavanagh et al. | |
| 5,765,159 A * | 6/1998 | Srinivasan | 707/102 |
| 5,794,030 A | 8/1998 | Morsi | |
| 5,799,309 A * | 8/1998 | Srinivasan | 707/102 |
| 5,832,498 A * | 11/1998 | Exertier | 707/103 R |
| 5,850,544 A | 12/1998 | Parvathaneny et al. | |
| 5,873,093 A * | 2/1999 | Williamson et al. | 707/103 R |
| 5,893,108 A * | 4/1999 | Srinivasan et al. | 707/103 R |
| 5,937,402 A * | 8/1999 | Pandit | 707/4 |
| 5,937,409 A | 8/1999 | Wetherbee | |
| 5,956,725 A * | 9/1999 | Burroughs et al. | 707/101 |
| 5,956,730 A | 9/1999 | Burroughs et al. | |
| 5,963,939 A * | 10/1999 | McCann et al. | 707/4 |
| 6,012,067 A * | 1/2000 | Sarkar | 707/103 R |
| 6,067,584 A * | 5/2000 | Hayles et al. | 710/10 |
| 6,076,090 A | 6/2000 | Burroughs et al. | |
| 6,081,808 A | 6/2000 | Blackman et al. | |
| 6,085,198 A | 7/2000 | Skinner et al. | |
| 6,101,502 A | 8/2000 | Heubner et al. | |
| 6,112,210 A | 8/2000 | Nori et al. | |
| 6,122,641 A * | 9/2000 | Williamson et al. | 707/103 R |
| 6,125,363 A | 9/2000 | Buzzeo et al. | |
| 6,134,559 A | 10/2000 | Brumme et al. | |
| 6,157,928 A | 12/2000 | Sprenger et al. | |
| 6,163,776 A * | 12/2000 | Periwal | 707/4 |
| 6,169,993 B1 | 1/2001 | Shutt et al. | |
| 6,170,005 B1 | 1/2001 | Meandzija | |
| 6,192,371 B1 | 2/2001 | Schultz | |

(Continued)

OTHER PUBLICATIONS

"Oracle Database Administration, The Essential Reference" by David C. Kreines, Brian Laskey from Safari Tech Books Online (pub. Date Apr. 1999, pp. 1-577—ISBN: 1-56592-516-5.*

(Continued)

*Primary Examiner*—Jean B Fleurantin
*Assistant Examiner*—Anh Ly

(57) ABSTRACT

A schema for a SQL (structured query language) database defines classes, properties, methods, and associations.

29 Claims, 12 Drawing Sheets

U.S. PATENT DOCUMENTS

| | | | |
|---|---|---|---|
| 6,243,709 B1* | 6/2001 | Tung | 707/103 R |
| 6,279,008 B1* | 8/2001 | Tung Ng et al. | 707/102 |
| 6,289,339 B1 | 9/2001 | Weber | |
| 6,317,748 B1 | 11/2001 | Menzies et al. | |
| 6,330,555 B1 | 12/2001 | Weber | |
| 6,356,946 B1 | 3/2002 | Cleggs et al. | |
| 6,374,252 B1* | 4/2002 | Althoff et al. | 707/102 |
| 6,374,253 B1* | 4/2002 | Weider et al. | 707/102 |
| 6,374,256 B1 | 4/2002 | Ng et al. | |
| 6,405,202 B1 | 6/2002 | Britton et al. | |
| 6,418,448 B1* | 7/2002 | Sarkar | 707/104.1 |
| 6,437,559 B1 | 8/2002 | Zajac et al. | |
| 6,487,552 B1 | 11/2002 | Lei et al. | |
| 6,493,719 B1 | 12/2002 | Booth et al. | |
| 6,496,833 B1 | 12/2002 | Goldberg et al. | |
| 6,529,910 B1* | 3/2003 | Fleskes | 707/10 |
| 6,569,207 B1 | 5/2003 | Sundaresan et al. | |
| 6,571,232 B1* | 5/2003 | Goldberg et al. | 707/103 R |
| 6,574,635 B2 | 6/2003 | Stauber et al. | |
| 6,591,272 B1* | 7/2003 | Williams | 707/102 |
| 6,631,519 B1 | 10/2003 | Nicholson et al. | |
| 6,665,677 B1* | 12/2003 | Wotring et al. | 707/100 |
| 6,681,383 B1 | 1/2004 | Pastor et al. | |
| 6,701,321 B1* | 3/2004 | Tsai | 707/102 |
| 6,704,744 B1* | 3/2004 | Williamson et al. | 707/103 R |
| 6,704,747 B1* | 3/2004 | Fong | 707/104.1 |
| 6,711,582 B2* | 3/2004 | Aldridge et al. | 707/103 Y |
| 6,754,670 B1 | 6/2004 | Lindsay et al. | |
| 6,769,124 B1* | 7/2004 | Schoening et al. | 719/316 |
| 6,850,983 B2* | 2/2005 | Rezaiifar et al. | 709/227 |
| 7,024,656 B1* | 4/2006 | Ahad | 717/116 |
| 7,058,958 B1 | 6/2006 | Shutt et al. | |
| 7,072,934 B2* | 7/2006 | Helgeson et al. | 709/203 |
| 7,089,583 B2* | 8/2006 | Mehra et al. | 726/3 |
| 7,127,474 B2 | 10/2006 | Williamson et al. | |
| 7,152,070 B1 | 12/2006 | Musick et al. | |
| 2001/0034733 A1* | 10/2001 | Prompt et al. | 707/102 |
| 2002/0023261 A1* | 2/2002 | Goodwin et al. | |
| 2002/0049603 A1* | 4/2002 | Mehra et al. | 705/1 |
| 2002/0049749 A1* | 4/2002 | Helgeson et al. | 707/3 |
| 2002/0059293 A1 | 5/2002 | Hirsch | |
| 2002/0107872 A1 | 8/2002 | Hudis | |
| 2002/0116385 A1 | 8/2002 | Kagalwala et al. | |
| 2002/0116698 A1* | 8/2002 | Lurie et al. | 717/100 |
| 2002/0120859 A1* | 8/2002 | Lipkin et al. | 713/200 |
| 2002/0156790 A1 | 10/2002 | Kagalwala et al. | |
| 2002/0161734 A1 | 10/2002 | Stauber et al. | |
| 2002/0194155 A1* | 12/2002 | Aldridge et al. | 707/1 |
| 2003/0088576 A1* | 5/2003 | Hattori et al. | 707/103 R |
| 2003/0120675 A1 | 6/2003 | Stauber et al. | |
| 2003/0212705 A1* | 11/2003 | Williamson et al. | 707/103 R |
| 2006/0020586 A1* | 1/2006 | Prompt et al. | 707/3 |
| 2006/0173873 A1* | 8/2006 | Prompt et al. | 707/100 |
| 2007/0094302 A1 | 4/2007 | Williamson et al. | |

OTHER PUBLICATIONS

"Definition of derived classes in OODBs"—Samos et al.—Database Engineering and Applications Symposium, 1998, Jul. 8-10, 1998 (pp. 150-158).*

"Data model issues for object-oriented applications"—Banerjee et al.—ACM transactions on Information Systems (TOIS), vol. 5, Issues 1, Jan. 1987 (pp. 3-26).*

"A study of three alternative Workstation-server Architectures for Object-Oriented database Systems"—DeWitt et al.—The graduate School of the University of Wisconsin, Proceedings of 16$^{th}$ international conference, Mar. 1990 (pp. 1-35).*

"Final Office Action", U.S. Appl. No. 09/789,804, filed Apr. 29, 2009,28 pages.

"Advisory Action", U.S. Appl. No. 09/789,804, (Aug. 10, 2009),3 pages.

* cited by examiner

DATABASE SCHEMA FOR STRUCTURED QUERY LANGUAGE (SQL) SERVER

RELATED APPLICATION

This application claims priority to U.S. patent application Ser. No. 09/789,804, filed Feb. 20, 2001, which claims priority to U.S. Provisional Application No. 60/249,528, filed Nov. 17, 2000.

TECHNICAL FIELD

This invention relates to databases and to database management schemas.

BACKGROUND

Database management systems (DBMS) are core components of virtually every enterprise (e-business) application. The ability to effectively configure, monitor, and manage a DBMS is critical to the success of enterprise applications.

Most DBMSs are designed for compatibility with relational databases. A relational database comprises a plurality of tables. Each table has a plurality of data records (rows) and each table includes a definition of the fields (columns) that the records will contain. A relational database includes the specification of relationships between fields of different tables. A DBMS performs common management tasks such as creating databases, adding tables, replication management, data backup, etc.

The Desktop Management Task Force (DMTF) Common Information Model (CIM) is an approach to the management of systems, software, users, and networks that applies the basic structuring and conceptualization techniques of the object-oriented paradigm. More specifically, the purpose of CIM is to model various computer-related systems-both hardware and software. It is important to recognize that object-oriented modeling is different from object-oriented programming.

This type of modeling uses schemas to represent systems. A schema is an abstraction of something that exists in the real world. Generally, a schema comprises a collection of classes and associations.

A class models a set of objects that have similar properties and fulfill similar purposes. In a database management schema, for example, individual classes might define such things as files, users, tables, etc.

Classes follow a hierarchical structure. Classes can have subclasses, also referred to as specialization classes. The parent class of a subclass is referred to as a superclass or a generalization class. A class that does not have a superclass is referred to as a base class.

A typical schema might comprise a collection of different schemas, which in this case can also be referred to as sub-schemas. Such subschemas are often located in various different namespaces. A namespace is simply a way to logically group related data. Within a given namespace, all names are unique. Within the following disclosure, the terms "schema" and subschema are used interchangeably.

A subclass inherits properties of its superclass. All properties and methods of a superclass apply to the subclass.

It is conventional to represent a class by a rectangle containing the name of the class. FIG. 1 shows an example. A class with properties is represented by a rectangle divided into two regions as in FIG. 2, one containing the name of the class and the other a list of properties. Inheritance, or a subclass/superclass relationship, is represented by a line drawn between the subclass and the superclass, with an arrow adjacent to the superclass indicating the superclass. Lines representing inheritance are shown in FIG. 3, indicated by reference numeral 10.

Classes contain instances that are collections of values that conform to the type established by the class. Instances are identified by keys that are unique within the class. In other words, no two instances in the same class in the same namespace may have the same values for all of their key values. The term "object" may be used to refer to either an instance or a class.

An association represents a relationship between two or more objects. More specifically, an association is a mechanism for providing an explicit mapping between classes. Associations can be within a namespace or across namespaces. Associations are conventionally shown as a line between two classes, as indicated by reference number 12 in FIG. 3.

CIM schemas describe the gamut of managed elements: servers and is desktops (operating systems, components, peripherals, and applications, all layers of the network (from Ethernet switches to IP and HTTP connections), and even end-users. Schema properties model the attributes that apply to objects, such as the type of printer or storage medium, RAM and CPU capacity, storage capacity, etc.

The discussion above gives a general overview of object-oriented modeling and CIM. Please refer to Winston Vumpus, John W. Sweitzer, Patrick Thompson, Andrea R. Westerinin, and Raymond C. Williams; Common Information Model, John Wiley & Sons, Inc., New York (2000) for further information regarding CIM. Also refer to Common Information Model (CIM) Specification, V2.0, Mar. 3, 1998, available from the Distributed Management Taskforce. DMTF has a number of other resources on its Internet web site.

SUMMARY

A database schema described herein is an extension of the CIM core model. It defines classes, properties, methods, and associations for a SQL (structured query language) database. Although a specific embodiment is disclosed herein, it should be recognized that variations of the described embodiment are possible while still remaining within the scope of the appended claims.

The database schema described herein may be used to manage the various systems, services, and applications that are represented in the schema as objects. For example, an object-oriented service of an operating system may use the schema to manipulate classes of the schema to model the objects represented therein. As a result, the classes may be manipulated to model the objects for the operating system. In this way, applications, hardware (such as RAM, printers), and so forth may be managed for the operating system according to the CIM core model.

DETAILED DESCRIPTION

This disclosure addresses a database schema for a SQL (structure query language) database, such as Microsoft's SQL Server database system. Prior to describing the database schema, however, an exemplary computing environment is described to provide a context for implementing the schema.

Exemplary Computing Environment

Figure 1:
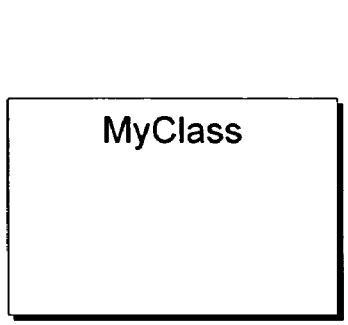
FIGS. 1-3 illustrate CIM drawing conventions.
Figure 2:
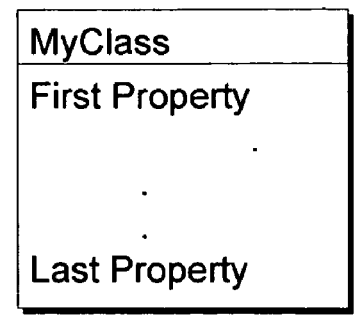
Figure 3:
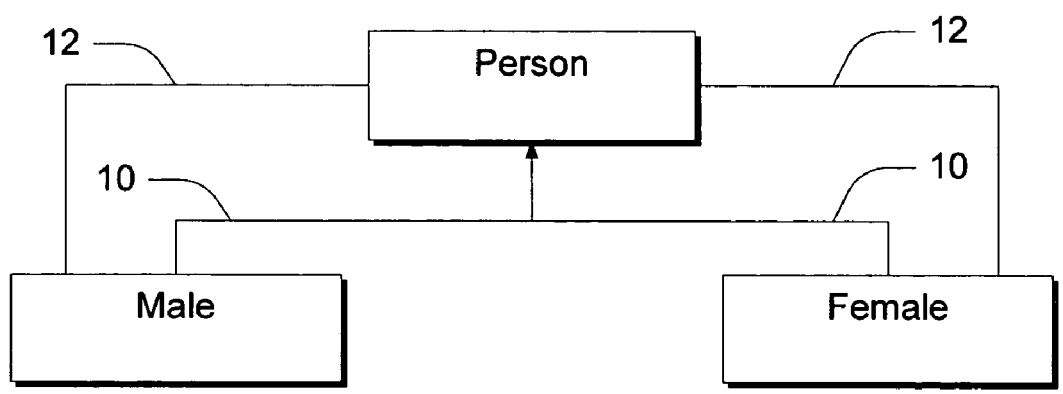
Figure 4:
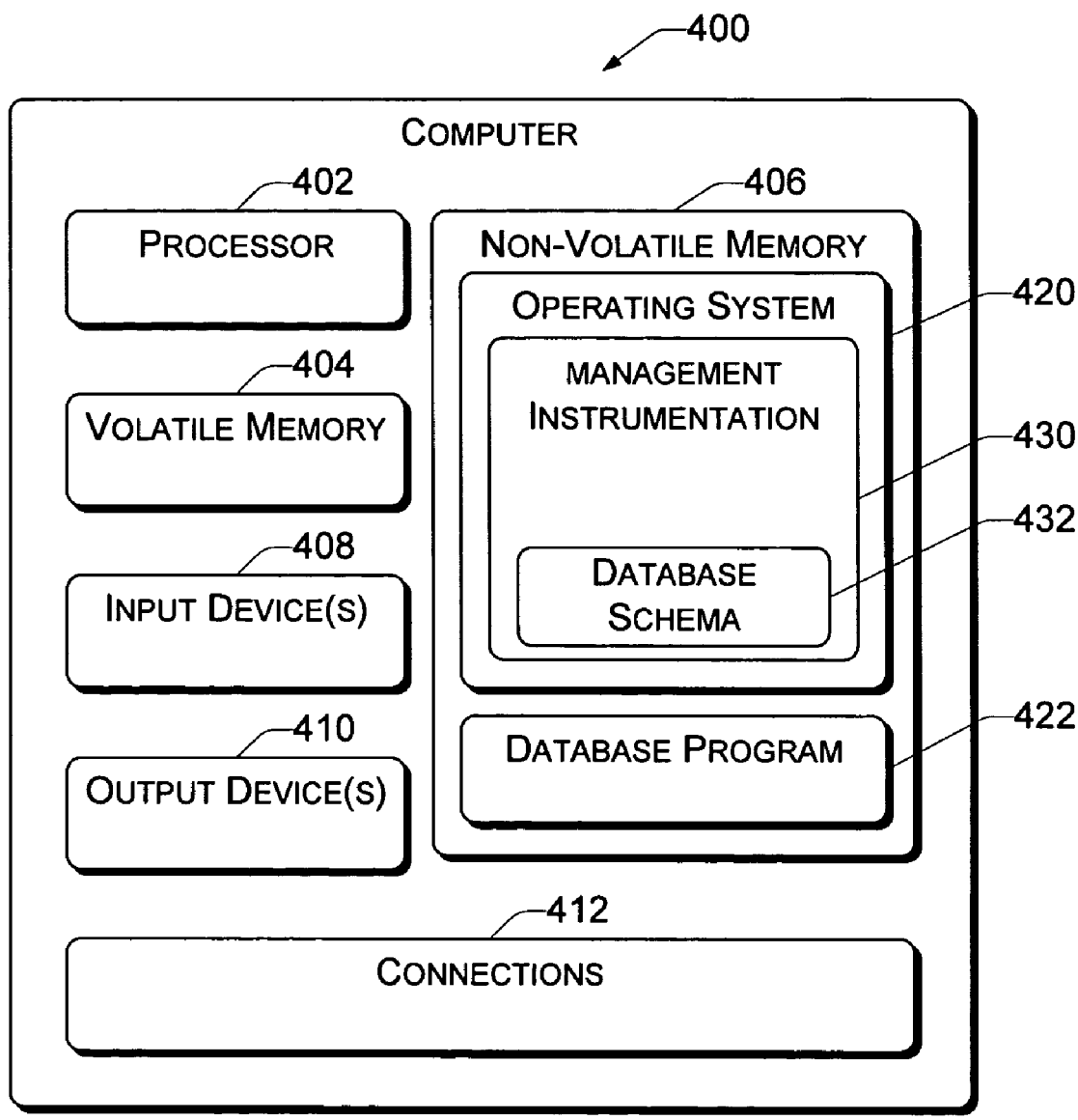
FIG. 4 is a block diagram showing components of a typical computer.

FIG. 4 shows an exemplary computer system 400 that implements the database schema. The computer 400 is representative of many different configurations, including personal computers, server computers, hand-held or laptop devices, multiprocessor systems, micro-processor systems, game consoles, set top boxes, programmable consumer electronics, network PCs, minicomputers, mainframe computers, distributed computing environments that include any of the above systems or devices, and the like. Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media.

Communication media typically embodies computer-readable instructions, data structures, program modules or other data in a modulated data signal such as a carrier wave or other transport mechanism and includes any information delivery media. By way of example, communication media includes wired media such as a wired network or direct-wired connection and wireless media such as acoustic, RF, infrared and other wireless media. Combinations of any of the above should also be included within the scope of computer readable media.

In the FIG. 4 illustration, the computer 400 has a processor unit 402 with one or more processors, volatile memory 404 (e.g., RAM), and non-volatile memory 406 (e.g., ROM, Flash, hard disk, optical, RAID memory, etc.). The computer 400 also includes one or more input devices 408 (e.g., keyboard, mouse, stylus, touch screen, microphone, etc.) and one or more output devices 412 (e.g., display, speakers, printer, etc.) A set of connections 412 may also be provided to facilitate wireless or wire-based communication with other computers, peripherals, and the like.

The computer 400 runs an operating system 420. The "Windows" brand of operating systems, available from Microsoft Corporation of Redmond, Wash., is one example of a suitable operating system. The computer 400 is also illustrated as running a database program 422, although this may be executed on a separate computer. The "SQL Server" brand of database programs, also available from Microsoft Corporation, is an example of a suitable database program.

For illustration purposes, operating system 420 and database program 422 are shown as discrete blocks stored in the non-volatile memory 406, although it is recognized that such programs and components reside at various times in different storage components of the computer 400 and are executed by the processor 402. Generally, these software components are stored in non-volatile memory 406 and from there, are loaded at least partially into the volatile main memory 404 for execution on the processor 402.

The "Windows 2000" operating system includes a service known as "Windows Management Instrumentation" (WMI) 430. WMI is an example of a management infrastructure for managing the operating system. It is Microsoft's implementation of the Web-Based Enterprise Management (WBEM) initiative, an industry standard administered by the Distributed Management Task Force (DMTF). WMI provides an object-oriented way of monitoring, configuring and controlling systems, services, and applications on the Windows platform. WMI objects are defined with logical classes derived from the Common Information Model (CIM). WMI provides services such as SQL query language support and programmable event notification.

To support CIM, WMI maintains a schema definition. The schema definition consists of one or more data structures that are typically stored on some form of non-volatile media. A schema can be installed in one or more namespaces. The schema contains a definition of all classes, their properties, and associations.

In particular, the computer 400 supports a database schema 432 for use in WMI to represent manageable components of the SQL server database. Such managed objects include tables, files, configuration data, and other logical components. The database schema is located in its own namespace (e.g., root\MicrosoftSQLServer).

Database Schema

The remaining discussion pertains to an exemplary management instrumentation schema for an SQL Server database software. The schema is depicted in its entirety in FIGS. 5-14. Throughout the drawings, conventional CIM classes are designated by the prefix "CIM". Classes that are defined for the SQL Server database software are designated by the prefix "MSSQL". Additionally, another group of classes pertaining to an operating system are also defined. In this example, the operating system is a "Windows" brand operating system from Microsoft Corporation and the classes are designated by the prefix "Win32".

The schema covers the following five main categories:
Application System: This category includes SQL Server settings, services, and logs.
Database Objects: This category includes the components of a database system such as databases, tables, keys, and columns.
Security: This category includes users, roles, authentication login records, and permission settings for the user and roles.
Physical Storage: This category includes the physical files and file groups that are used to store the data.
Bulk Data Operations: This category includes operations such as backup, restore, and bulk copy of data.

Rather than try to present the entire schema in one drawing, which is impractical, the schema is illustrated over multiple drawings according to the above categories. This results in some classes being replicated in more than one drawing. However, at the risk of some redundancy, each drawing portrays that portion of the schema that covers the category or subcategory.

Additionally, the schema is generally described below with reference to the corresponding figures. One exemplary implementation of all schema classes, as well as their properties, methods, and associations, is provided following this general description beneath the heading "Exemplary Implementation of Database Schema".

A. Application System

Figure 6:
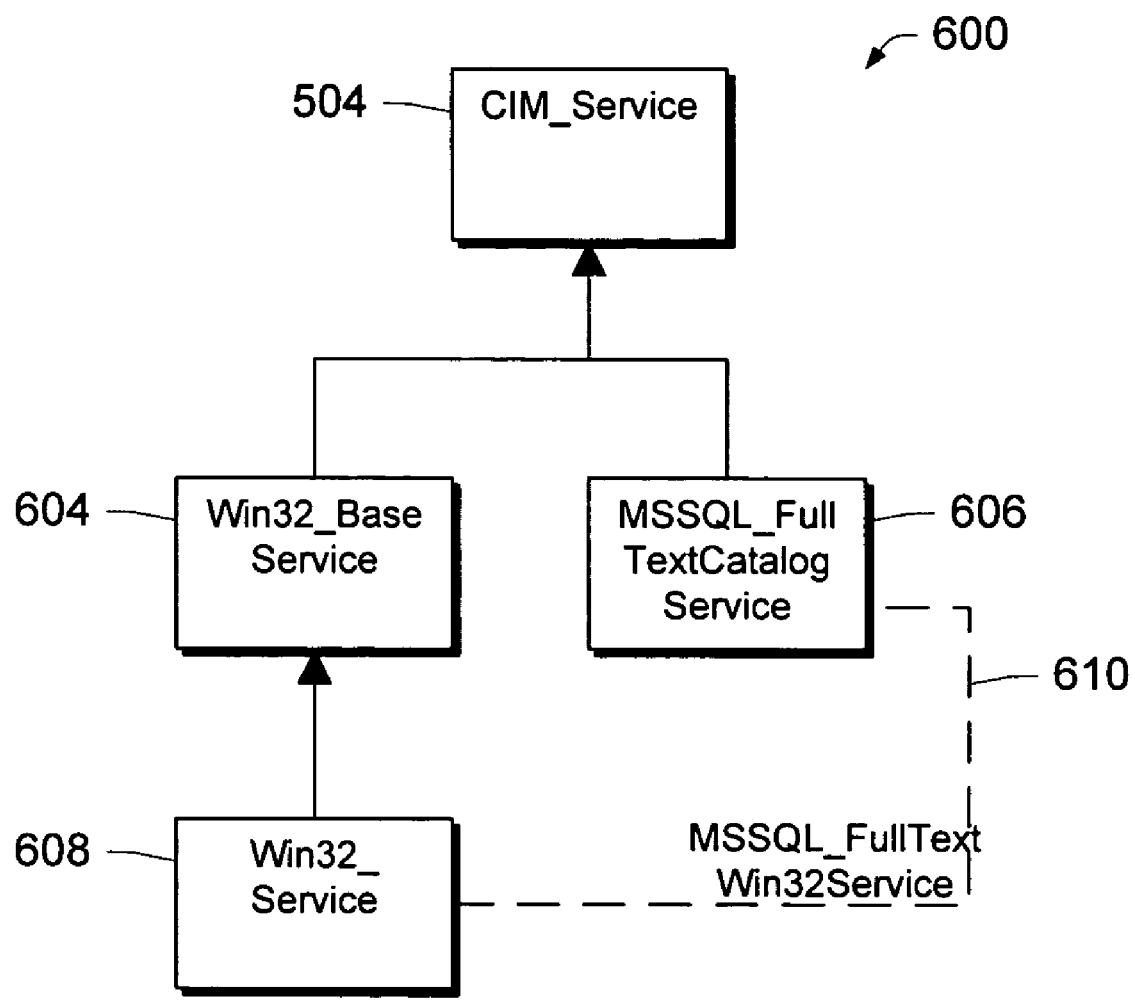
Figure 7:
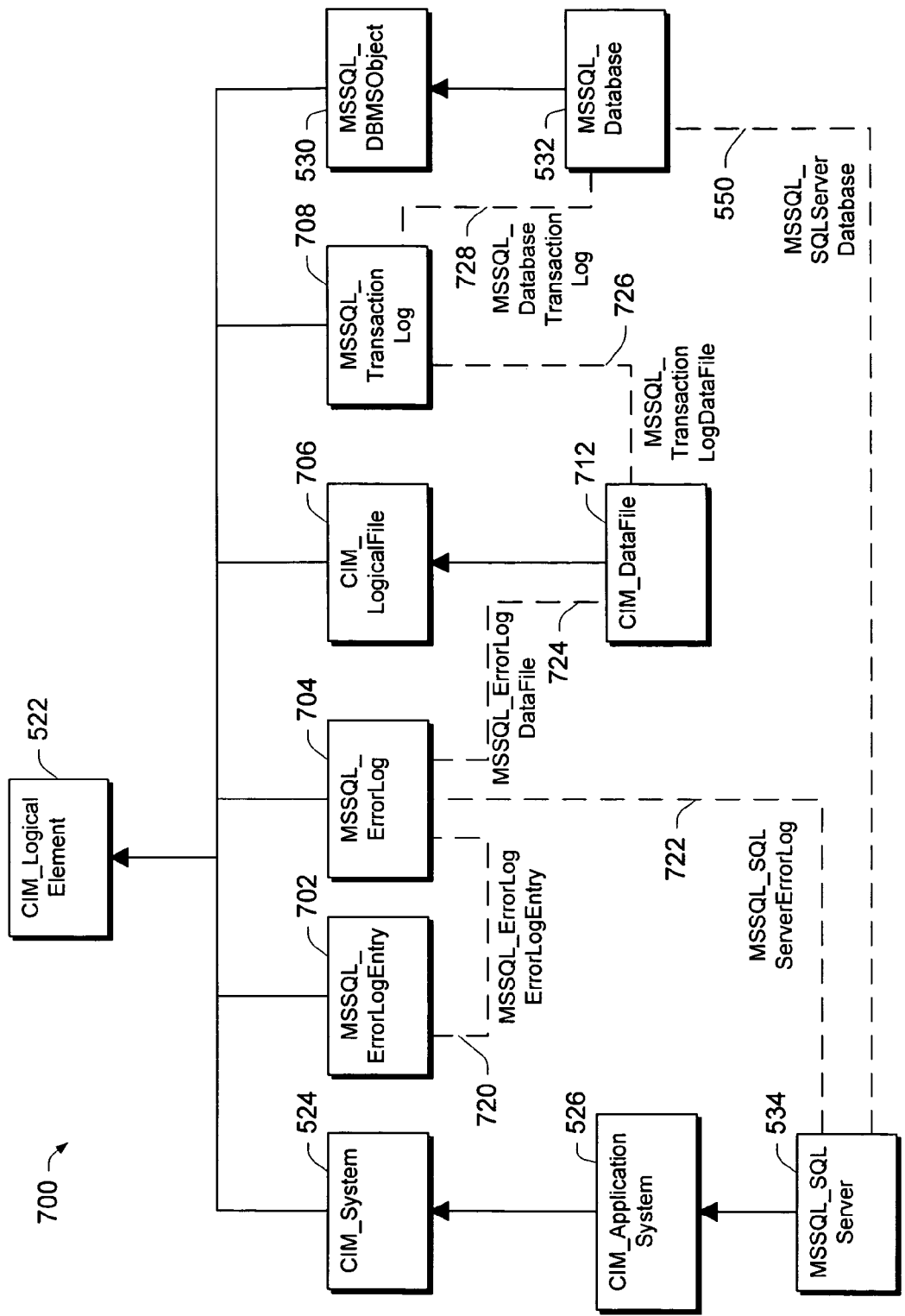

The schema portions covering the application system of the SQL Server database can be separated into three subcategories: (1) settings, (2) services, and (3) transactions and error logs. The schema portions for these three subcategories are illustrated in FIGS. 5-7.

Figure 5:
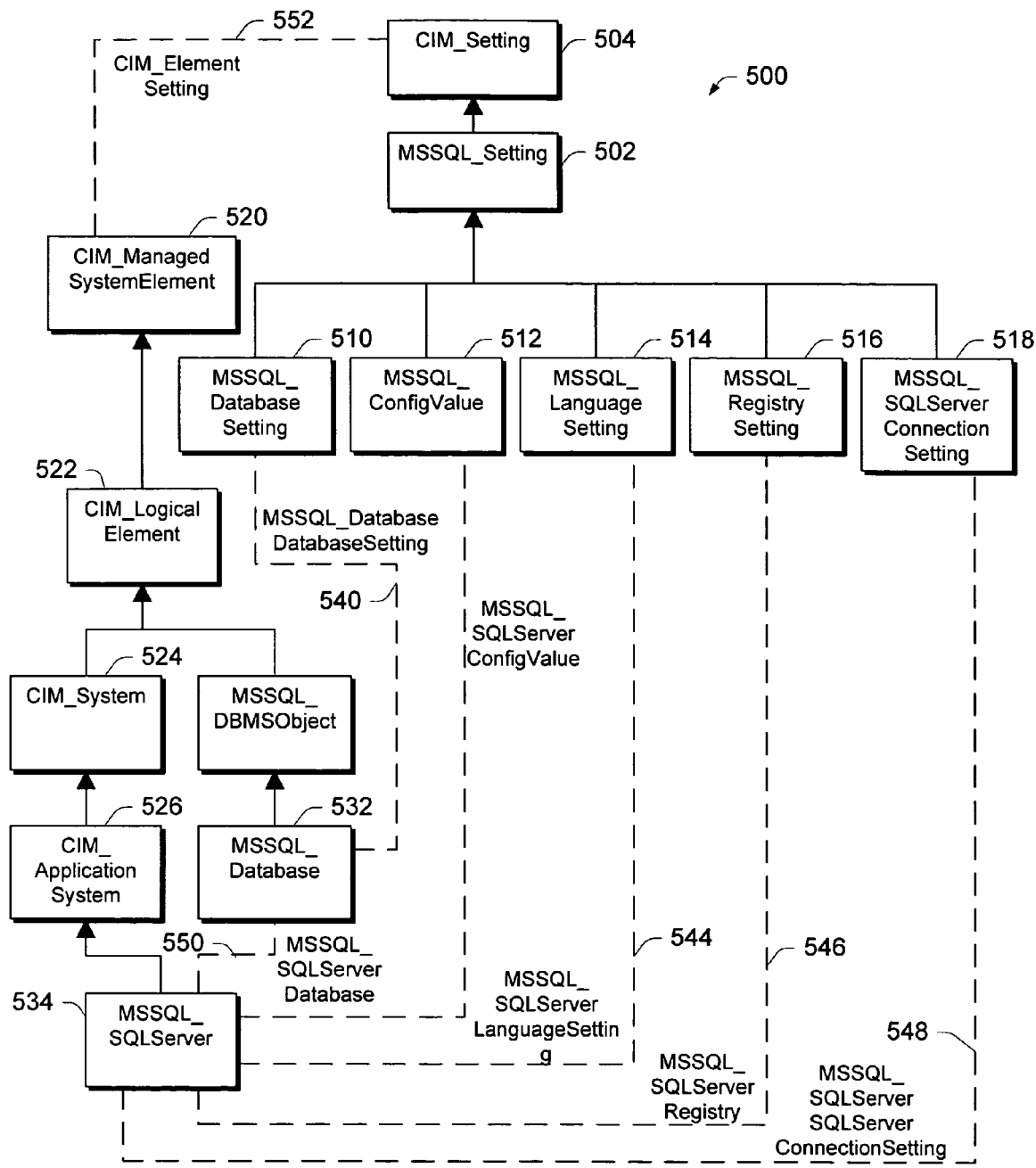
FIGS. 5-14 illustrates a database schema for a SQL database.

FIG. 5 shows a setting portion 500 of the SQL Server schema. Setting portion 500 has a superclass 502 entitled "MSSQL_Setting", which is a subclass of a CIM class 504 entitled "CIM_Setting". Beneath the MSSQL_Setting class 502 are five subclasses: MSSQL_DatabaseSetting 510 that represents operational settings for a database; MSSQL_ConfigValue 512 that represents configuration values; MSSQL_LanguageSetting 514 that exposes the properties of an installed language record so that error and status information can be presented as localized text; MSSQL_RegistrySetting 516 that represents the installation and run-time parameters stored in the registry; and MSSQL_SQLServerConnectionSetting 518 represents default connection settings used by a WMI provider to connect to SQL DMO (Distributed Management Objects).

FIG. 5 also illustrates a separate set of CIM classes represented by base class 520 entitled "CIM_ManagedSystemElement", which is a base class for the system element hierarchy. Any distinguishable component of a system is a candidate for inclusion in this class. Examples include software components (e.g., files), devices (e.g., disk drives, controllers), and physical components (e.g., chips, cards). Beneath the base class is CIM_LogicalElement class 522, which is the base class for all the components of the system that represent abstract system components (e.g., profiles, processes, system capabilities in the form of logical devices, etc.). A subclass of class 522 is CIM_System class 524, which represents a logical element that aggregates an enumerable set of managed system elements. Beneath CIM-System class 524 is CIM_ApplicationSystem class 526, which represents an application or a software system that supports a particular business function and that can be managed as independent units.

The schema 500 also defines three extensions to the conventional CIM classes, including MSSQL_DBMSObject class 530, MSSQL_Database class 532, and MSSQL_SQLServer class 534. MSSQL_DBMSObject class 530 is a subclass of CIM_LogicalElement class 522 and represents objects in a database system, such as databases, tables, keys and constraints. MSSQL_Database class 532 represents instances of SQL Server databases and MSSQL_SQLServer class 532 represents instances of the SQL Server.

FIG. 5 also illustrates associations between the MSSQL_Setting class 502 and MSSQL_Database class 532 and MSSQL_SQLServer class 534. The associations are illustrated as broken lines to distinguish them from the solid inheritance lines. The associations are defined as association-type classes, which include properties and methods like normal classes. Consider an association 540 named "MSSQL_DatabaseDatabaseSetting" that is defined between the MSSQL_DatabaseSetting class 510 and the MSSQL_Database class 532. The MSSQL_DatabaseDatabaseSetting association class 540 associates a SQL Server database to an instance of the MSSQL_DatabaseSetting class 510 that contains the settings for the database.

Other association classes include the following:
MSSQL_SQLServerConfigValue class 542 represents an association between a SQL Server installation and the configured value settings for the installation.
MSSQL_SQLServerLanguageSetting class 544 represents an association between a SQL Server installation and its language settings.
MSSQL_SQLServerRegistrySetting class 546 represents an association between a SQL Server installation and its registry setting.
MSSQL_SQLServerSQLServerConnection class 548 represents an association between a SQL Server installation and settings used by the WMI SQL Server administration provider to connect to the SQL Server.

There is also an association class 550, named "MSSQL_SQLServerDatabase", between the MSSQL_SQLServer class 534 and the MSSSQL_Database class 532 that represents an association between a SQL Server installation and a database that is part of the installation.

Additionally, FIG. 5 illustrates a CIM_ElementSetting class 552 that associates the CIM_ManagedSystemElement class 520 with the CIM_Setting class 504.

FIG. 6 shows a services portion 600 of the SQL Server schema. Services portion 600 includes the CIM_Setting class 504, a Win32_BaseService class 604 that represents executable objects installed in a registry database and maintained by the Service Control Manager, a MSSQL_FullTextCatalogService class 606 that represents a single search persistent data store, and a Win32_Service class 608 that represents a service on a 32-bit "Windows"-brand operating system. There is one association class 610, named "MSSQL_FullTextWin32Service", that associates the MSSQL_FullTextCatelogService class 606 with the Win32-Service class 608.

FIG. 7 shows a portion 700 of the SQL Server schema for the transaction and error logs. Similar to the setting schema portion 500 of FIG. 5, schema portion 700 includes the CIM_LogicalElement class 522, the CIM-System class 524, the CIM_ApplicationSystem class 526, the MSSQL_SQLServer class 534, the MSSQL_DBMSObject class 530, and the MSSQL_Database class 532. New to the schema 700 are a set of subclasses of the CIM_LogicalELement class 522. These subclasses include MSSQL_ErrorLogEntry class 702 that represents entries in a SQL Service error log, MSSQL_ErrorLog 704 that represents the SQL Service error logs, CIM_LogicalFile class 706 that represents a named collection of data located in a file system on a storage extent, and MSSQL_TransactionLog 708 that represents the transaction log of the SQL Server database. A CIM_DataFile class 712 inherits from the CIM_Logical File class 706 to represent a type of logical file that is a named collection of data or executable code.

The schema 700 defines several association classes, including:
MSSQL_ErrorLogErrorLogEntry class 720 represents an association between an error log and an entry in the error log.
MSSQL_SQLServerErrorLog class 722 represents an association between a SQL Server installation and the error log used by the installation.
MSSQL_ErrorLogDataFile class 724 represents an association between the error log and the operating system file used to store the error log.
MSSQL_TransactionLogDataFile class 726 represents an association between the transaction log and the operating system file that is used to store the log.
MSSQL_DatabaseTransactionLog class 728 represents an association between the database and the transaction log for the database.
MSSQL_SQLServerDatabase class 550, described previously, represents an association between a SQL Server installation and a database that is part of the installation.

B. Database Objects

The portions of the schema covering the database objects of the SQL Server database can be divided into four subcategories: (1) objects (e.g., tables, views, stored procedures, etc.), (2) index, (3) constraints, and (4) keys. The schema portions for these four subcategories are illustrated in FIGS. 8-11.

Figure 8:
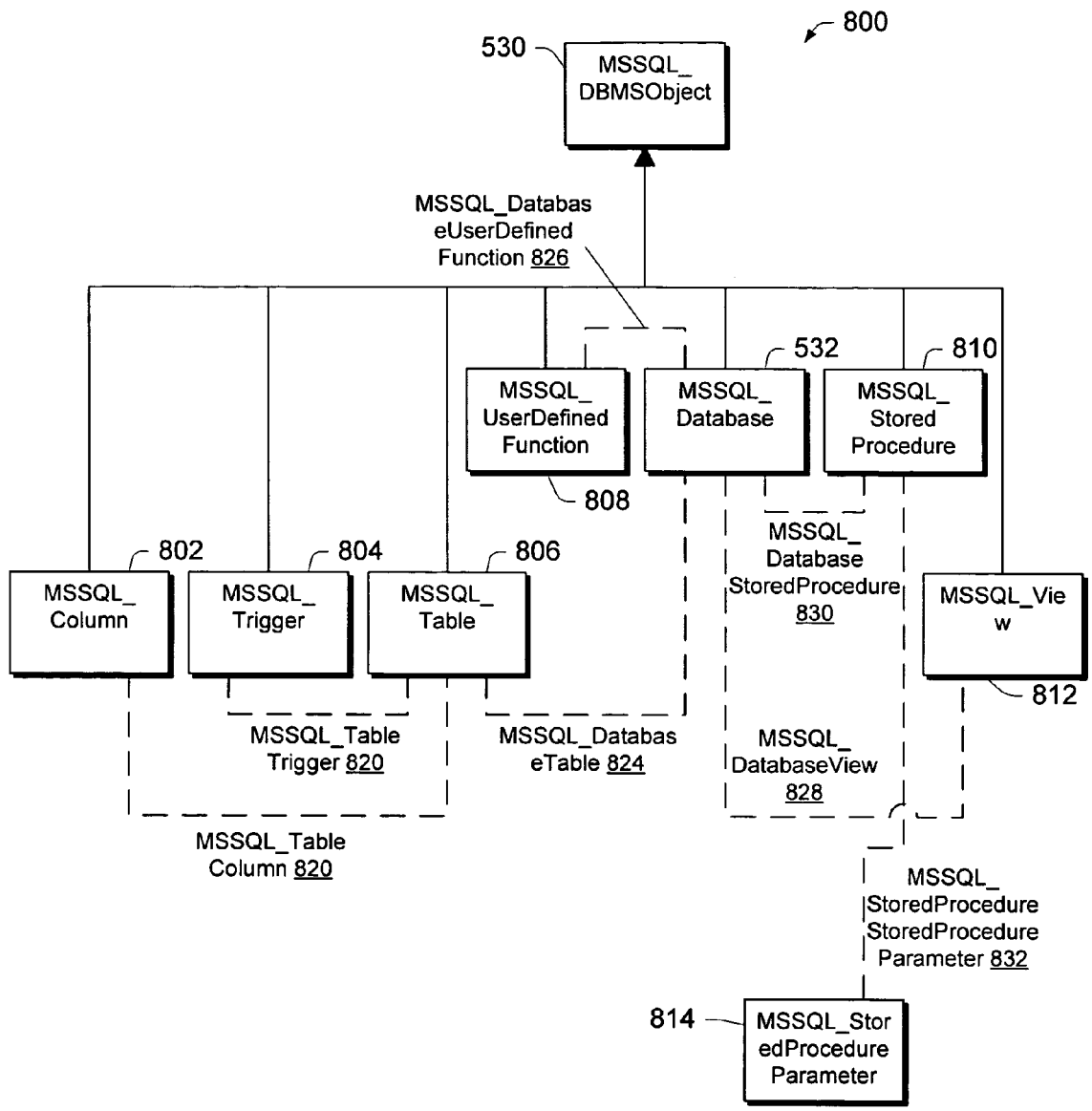

FIG. 8 shows a portion 800 of the SQL Server schema for the database objects, such as tables, columns, views, databases, stored procedures, and so on. The base class for database objects schema 800 is the MSSQL_DBMSObject class 530. Subclasses of this base class 530 are MSSQL_Column class 802 that represents a column in a table, MSSQL_Trigger class 804 that represents a trigger to be executed when a specified data modification, such as an attempt to delete a row, is attempted on the table, MSSQL_Table class 806 that represents a table in the SQL database, MSSQL_UserDefinedFunction class 808 that represents a user defined function in the SQL database, MSSQL_Database class 532, MSSQL_StoredProcedure class 810 that represents standard as well as extended stored procedures defined in the SQL database, MSSQL_View class 812 that represents view tables in the database, and MSSQL_StoredProcedureParameter class 814 that represents the input and output parameters of a stored procedure.

The database objects schema 800 defines several association classes, including:

MSSQL_TableColumn class 820 represents an association between a table and a column contained in the table.

MSSQL_TableTrigger class 822 represents an association between a table and a trigger defined for the table.

MSSQL_DatabaseTable class 824 associates a database to all the tables contained in the database.

MSSQL_DatabaseUserDefinedFunction class 826 represents an association between a database and a user-defined function defined within the database.

MSSQL_DatabaseView class 828 associates a database to the view contained within the database.

MSSQL_DatabaseStoredProcedure class 830 represents an association between the database and a stored procedure defined within the database.

MSSQL_StoredProcedureStoredProcedureParameter class 832 associates a stored procedure to a parameter used in the stored procedure.

Figure 9:
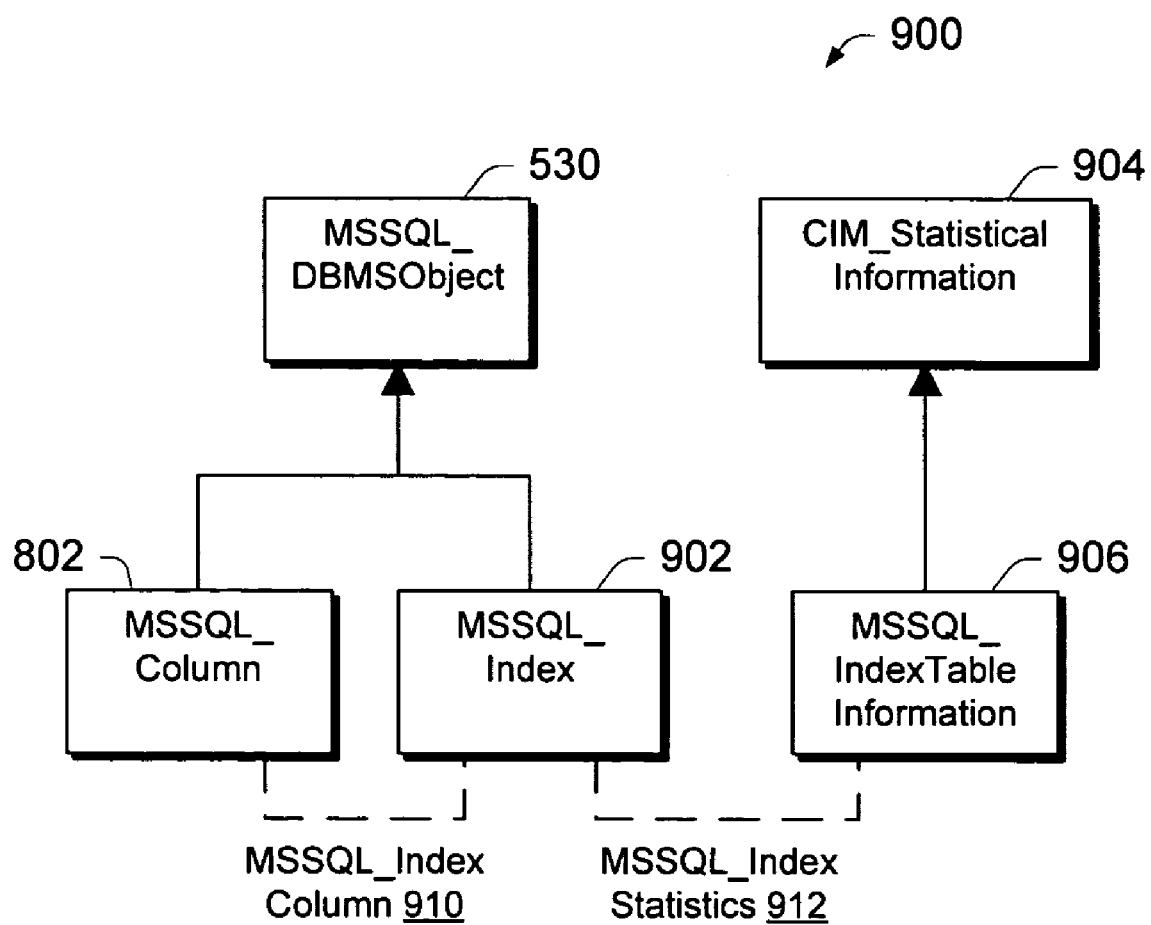

FIG. 9 shows an index portion 900 of the SQL Server schema. Again, the base class is the MSSQL_DBMSObject class 530. Here, two subclasses are defined: MSSQL_Column class 802 and MSSQL_Index class 902 that represents an index for a table. Additionally, the index portion of the schema shows a CIM class 904 named "CIM_StatisticalInformation", having a subclass 906 named "MSSQL_IndexTableInformation" that represents the information regarding the age and structure of the index statistical information.

Two association classes are also defined:

MSSQL_IndexColumn class 910 represents an association between an index and a column that participates in the index.

MSSQL_IndexStatistics class 912 represents an association between an index and the statistical information stored with the index.

Figure 10:
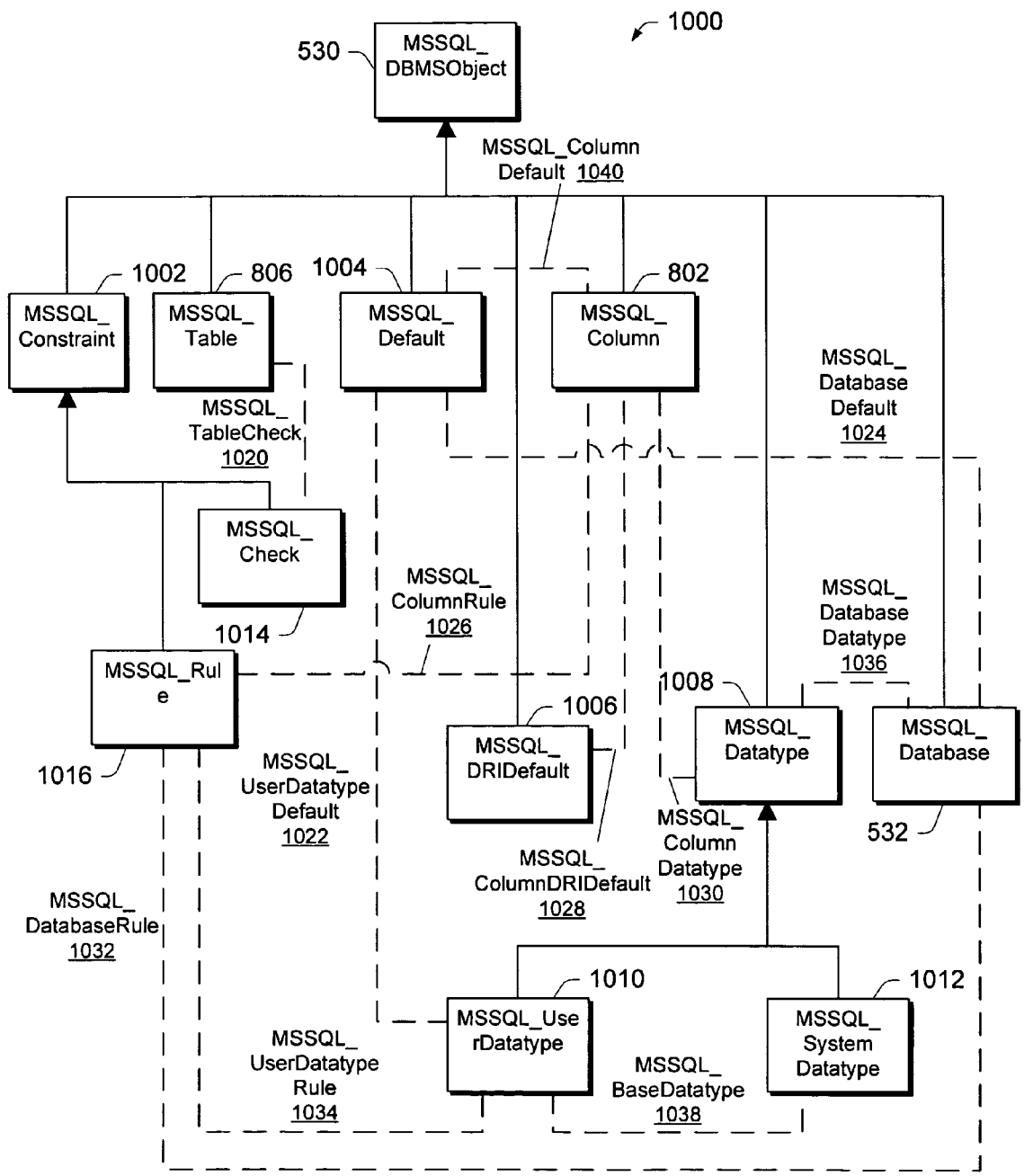

FIG. 10 shows a portion 1000 of the SQL Server schema pertaining to constraints, which are the rules and checks to create constraints on data. The base class is once again the MSSQL_DBMSObject class 530. Beneath this base class 530 are the familiar MSSQ_Table class 806, the MSSQL_Column class 802, and MSSQL_Database class 532. Another subclass is MSSQL_Constraint class 1002 that represents constraints defined in the SQL Server database. There are three types of constraints that can be defined: checks, keys, and rules. MSSQL_Default class 1004 represents the attributes of a single SQL Server default. Such defaults provide data to columns and user-defined data types when no other data is available on an "INSERT" statement execution.

The remaining subclasses of base class 530 are MSSQL_DRIDefault class 1006 that represents the properties of a SQL Server column DEFAULT constraint and MSSQL_Datatype class 1008 that represents all the datatypes defined in a SQL Server installation, including both user-defined datatypes, as well as system-defined datatypes. Beneath the MSSQL_Datatype class 1008 are two subclasses that represent the two types of datatypes: MSSQL_UserDatatype class 1010 and MSSQL_SystemDatatype class 1012.

The remaining classes illustrated in constraint portion 1000 of the SQL schema are MSSQL_Check class 1014 that represents the attributes of a SQL Server integrity constraint and MSSQL_Rule class 1016 that represents a single data-integrity rule.

There are a number of association classes defined in this portion of the schema. The association classes include:

MSSQL_TableCheck class 1020 represents an association between a table and the checks defined for the table.

MSSQL_UserDatatypeDefault class 1022 represents an association between a user-defined datatype and the rule bound to the column.

MSSQL_DatabaseDefault class 1024 associates a database to the defaults defined within the database.

MSSQL_ColumnRule class 1026 represents an association between a column and a rule bound to the column.

MSSQL_ColumnDRIDefault class 1028 associates a column to a DRI default.

MSSQL_-ColumnDatatype class 1030 associates a column with its data type.

MSSQL_DatabaseRule class 1032 represents an association between a database and the rules defined within the database.

MSSQL_UserDatatypeRule class 1034 represents an association between a user defined datatype and the rule bound to the column.

MSSQL_DatabaseDatatype class 1036 associates a database to the datatypes defined within the database.

MSSQL_BaseDatatype class 1038 represents an association between a user-defined datatype and the system datatype from which it is derived.

MSSQL_ColumnDefault class associates a column to the default for the column.

Figure 11:
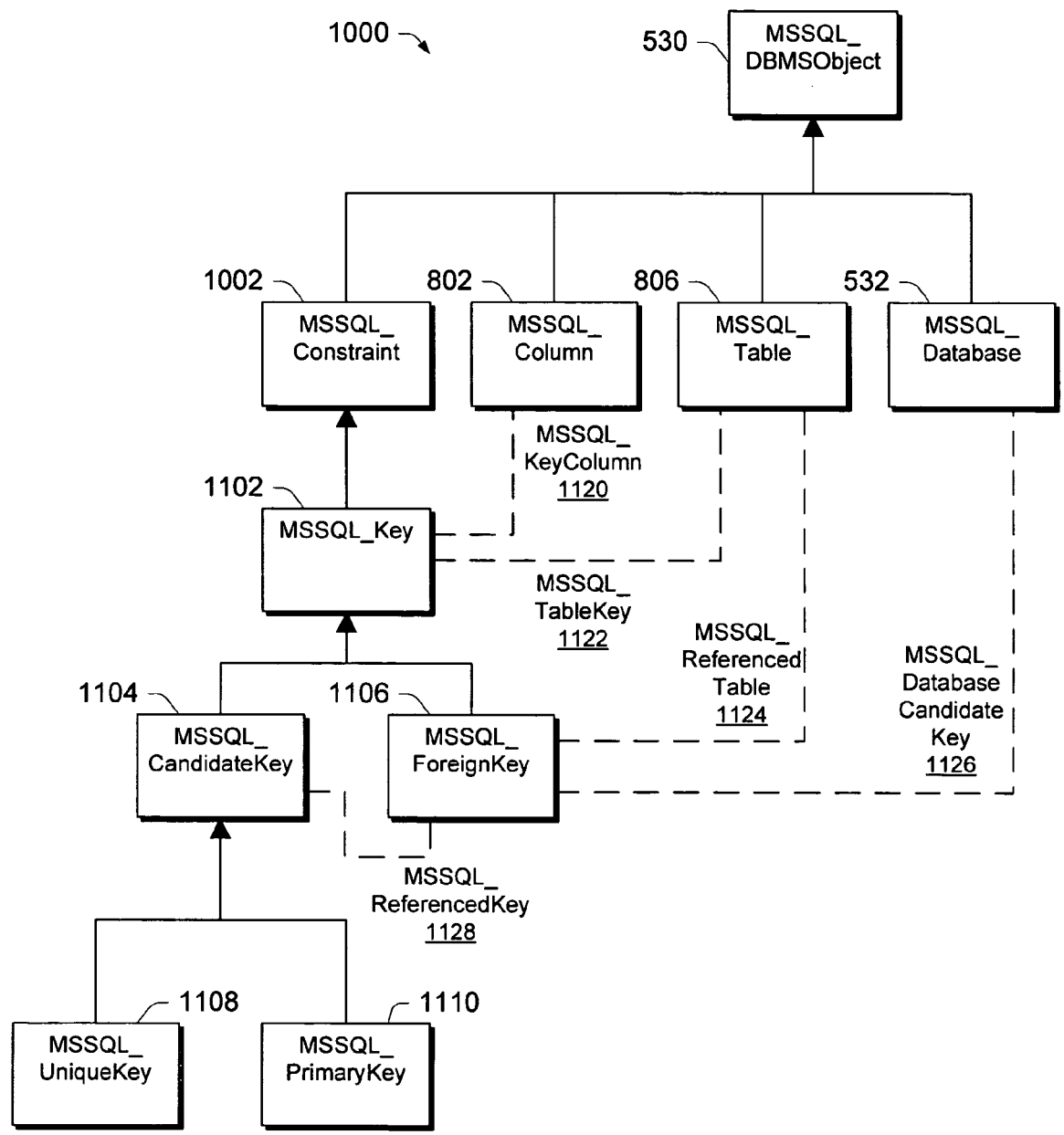

FIG. 11 shows a portion 1100 of the SQL Server schema pertaining to keys. The base class is once again the MSSQL_DBMSObject class 530. Beneath this base class 530 are previously introduced classes including the MSSQL_Constrain class 1002, the MSSQL_Column class 802, MSSQ_Table class 806, and the MSSQL_Database class 532. Newly presented in this portion of the schema is the MSSQL_Key class 1102 that represents the keys defined for a SQL Server table.

One subclass of key class 1102 is the MSSQL_CandidateKey class 1104 that represents a candidate key in a SQL Server table. It consists of a set of columns that can uniquely identify a row in a table. Another subclass is MSSQL_ForeignKey class 1106, which represents the foreign keys defined for a SQL Server database table.

Beneath the candidate key class 1104 are two classes: MSSQL_UniqueKey class 1108 that represents a unique key in a database and MSSQL_PrimaryKey class 1110 that represents a primary key of a table.

Association classes defined in this portion of the schema include:

MSSQL_KeyColumn class 1120 represents an association between a key and a column that is part of the key.

MSSQL_TableKey class 1122 represents an association between a table and a key defined for the table.

MSSQL_ReferencedTable class 1124 represents an association between a foreign key and the table that contains the primary key referenced by the foreign key.

MSSQL_DatabaseCandidateKey 1126 represents an association between a database and a candidate key that is present in one of the tables in the database. This association allows an application to perform a single traversal to find the candidate keys in a database.

MSSQL_ReferencedKey class 1128 represents an association between a foreign key and the candidate key that the foreign key references.

C. Security

The schema portions covering the security features of the SQL Server database can be separated into two subcategories: (1) server login records and (2) permissions. The schema portions for these subcategories are illustrated in FIGS. 12-13.

Figure 12:
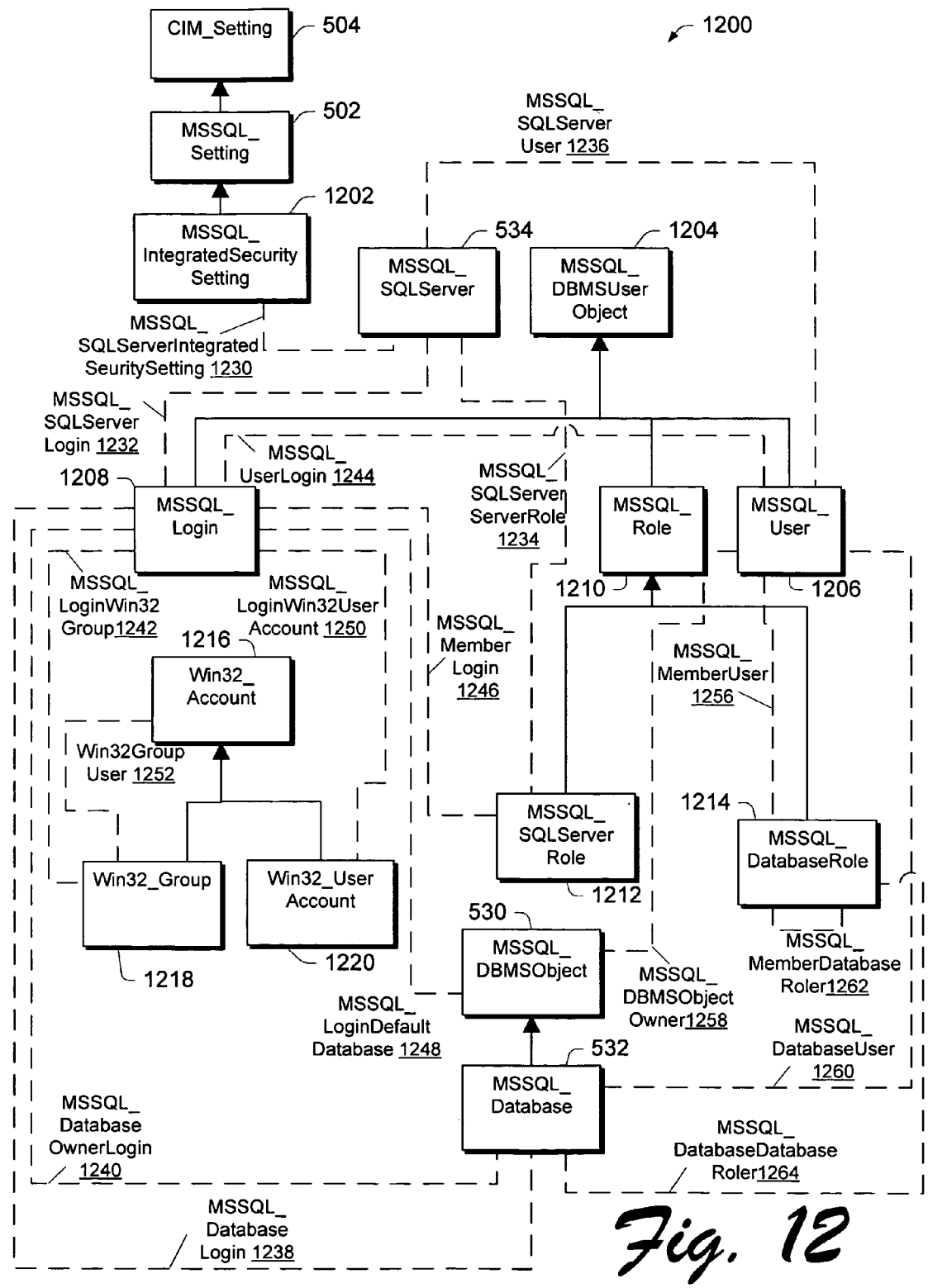
Figure 13:
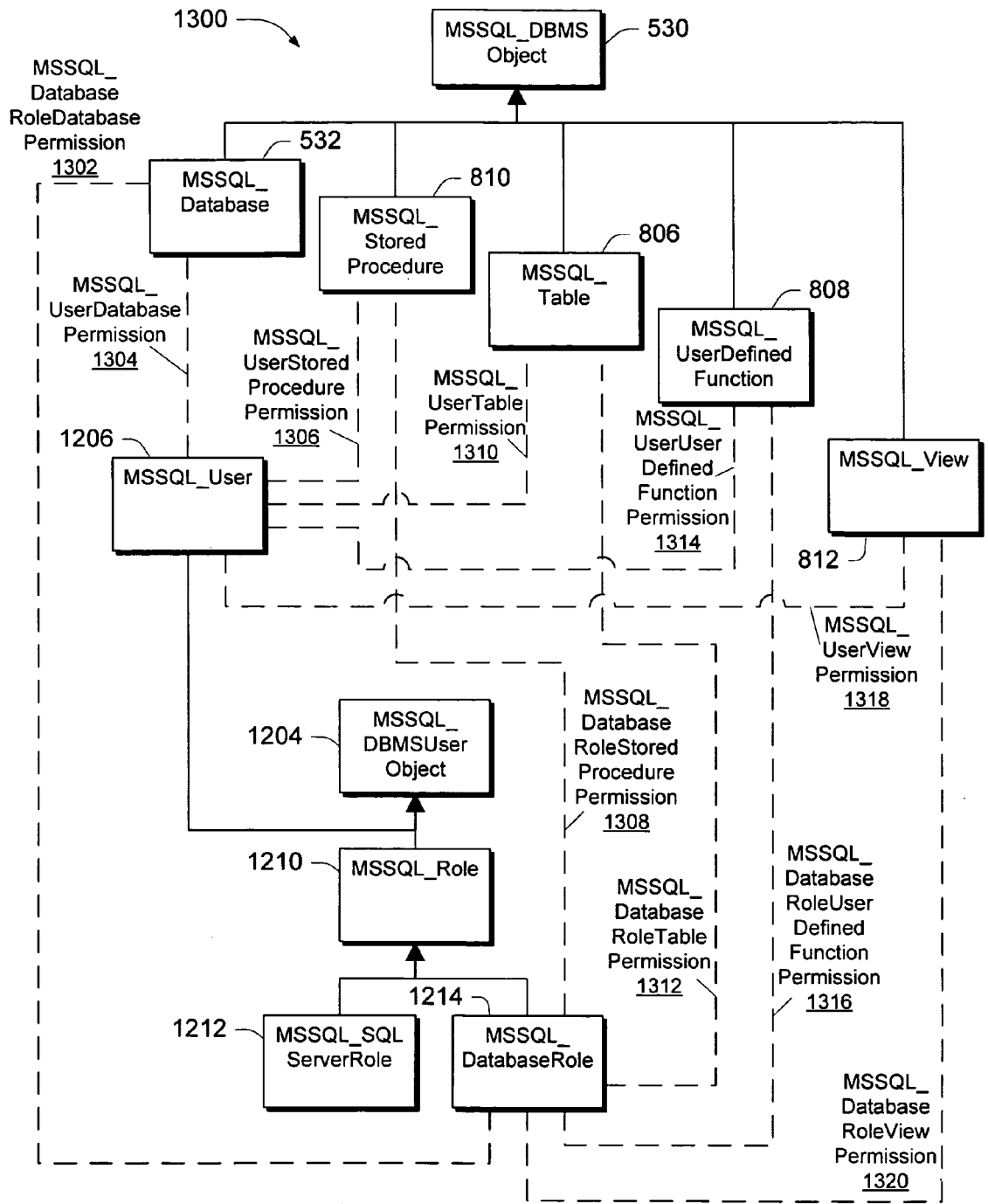

FIG. 12 shows a security portion 1200 of the SQL Server schema pertaining to server login records. Familiar classes in the security portion 1200 include CIM_Setting class 504, MSSQL_Setting class 502, MSSQL_SQLServer 534, MSSQL_DBMSObject 530, and MSSQL_Database 532. Newly presented classes include MSSQL_IntegratedSecuritySetting class 1202 that represents the integrated security settings when WMI interacts with SQL Server. MSSQL_DBMSUserObject class 1204 represents all objects related to user authentication, including objects such as users, logins, and roles defined for a SQL Server installation. The user, logins, and roles are represented by MSSQL_User class 1206, the MSSQL_Login class 1208, and the MSSQL_Role class 1210, respectively, which are subclasses to the MSSQL_DBMSUserObject class 1204. With respect to the MSSQL_Role class 1210, roles are used to establish groups of users with similar security attributes. Permissions can be granted by role, simplifying security planning and administration. Beneath the MSSQL_Role class 1210 are MSSLQ_SQLServerRole class 1212 that represents a SQL Server security role not constrained to operation within a single database and MSSQL_DatabaseRole class 1214 that represents the properties of a SQL Server database role.

Also illustrated in security portion 1200 of the SQL Server schema is a Win32_Account class 1216 that contains information about user accounts and group accounts known to a "Win32" operating system. Descendents of this class are group names recognized by a "Windows NT" domain as represented by Win32_Group class 1218 and information about a user account on a "Win32" system as represented by Win32_UserAccount class 1220.

Association classes defined in this portion of the schema include the following:

MSSQL_SQLServerIntegratedSecuritySetting class 1230 represents an association between a SQL Server installation and its security settings.

MSSQL_SQLServerLogin class 1232 represents an association between a SQL server and a login defined within the SQL Server.

MSSQL_SQLServerServerRole class 1234 represents an association between a SQL Server and server roles defined within the SQL Server.

MSSQL_SQLServerUser class 1236 represents an association between a SQL Server and a database user. This association allows an application to perform a single traversal to find the database users in a SQL Server and the login to which they are mapped.

MSSQL_DatabaseLogin class 1238 represents an association between a database and a login that is mapped to a user defined in the database. This association allows an application to perform a single traversal to find the logins used by a database.

MSSQL_DatabaseOwnerLogin class 1240 represents an association between a database and the login mapped to the user that owns the database.

MSSQL_LoginWin32Group class 1242 represents an association between a login and the "Win32" user group used for authentication by the login.

MSSQL_UserLogin class 1244 represents an association between a database user and the login used to authenticate the user.

MSSQL_MemberLogin class 1246 represents an association between a SQL Server role and a login that is a member of the role.

MSSQL_LoginDefaultDatabase class 1248 represents an association between a login and the default database for the login.

MSSQL_LoginWin32UserAccount class 1250 represents an association between a login and the "Win32" user account used for authentication by the login.

Win32_GroupUser class 1252 represents an association between a group and an account that is a member of that group.

MSSQL_MemberUser class 1256 represents an association between a database role and a user that is a member of the role.

MSSQL_DBMSObjectOwner class 1258 represents an association between a SQL Server database object and the user who owns the object.

MSSQL_DatabaseUser class 1260 represents an association between a database and a user defined for the database.

MSSQL_MemberDatabaseRole class 1262 associates two database roles, one being a member of the other.

MSSQL_DatabaseDatabaseRole class 1264 associates database role to the database within which the role is defined.

FIG. 13 shows a portion 1300 of the SQL Server schema that relates to permissions of users and roles. All of the classes illustrated in FIG. 13 have been introduced above. New to this schema portion are the association-type class that associates a user or a role with a database object, such as a table, view, and database. In particular, the associations define permissions granted or denied to specific users/roles with regard to specific databases and/or portions of databases.

The association classes include:

MSSQL_DatabaseRoleDatabasePermission class 1302 represents the permissions that a database role has for the database in which it is defined.

MSSQL_UserDatabasePermission class 1304 represents the permissions granted to a user for a database.

MSSQL_UserStoredProcedurePermission class 1306 represents the permissions granted to a user for a stored procedure.

MSSQL_DatabaseRoleStoredProcedurePermission class 1308 represents the permissions that a database role has for a stored procedure.

MSSQL_UserTablePermission class 1310 represents the permissions granted to a user for a table.

MSSQL_DatabaseRoleTablePermission 1312 represents the permissions that a database role has for a table.

MSSQL_UserUserDefinedFunctionPermission 1314 represents the permissions granted to a user for a stored procedure.

MSSQL_DatabaseRoleUserDefinedFunctionPermission 1316 represents the permissions that a database role has for a table.

MSSQL_UserViewPermission 1318 represents the permissions granted to a user for a view.

D. Physical Storage

Figure 14:
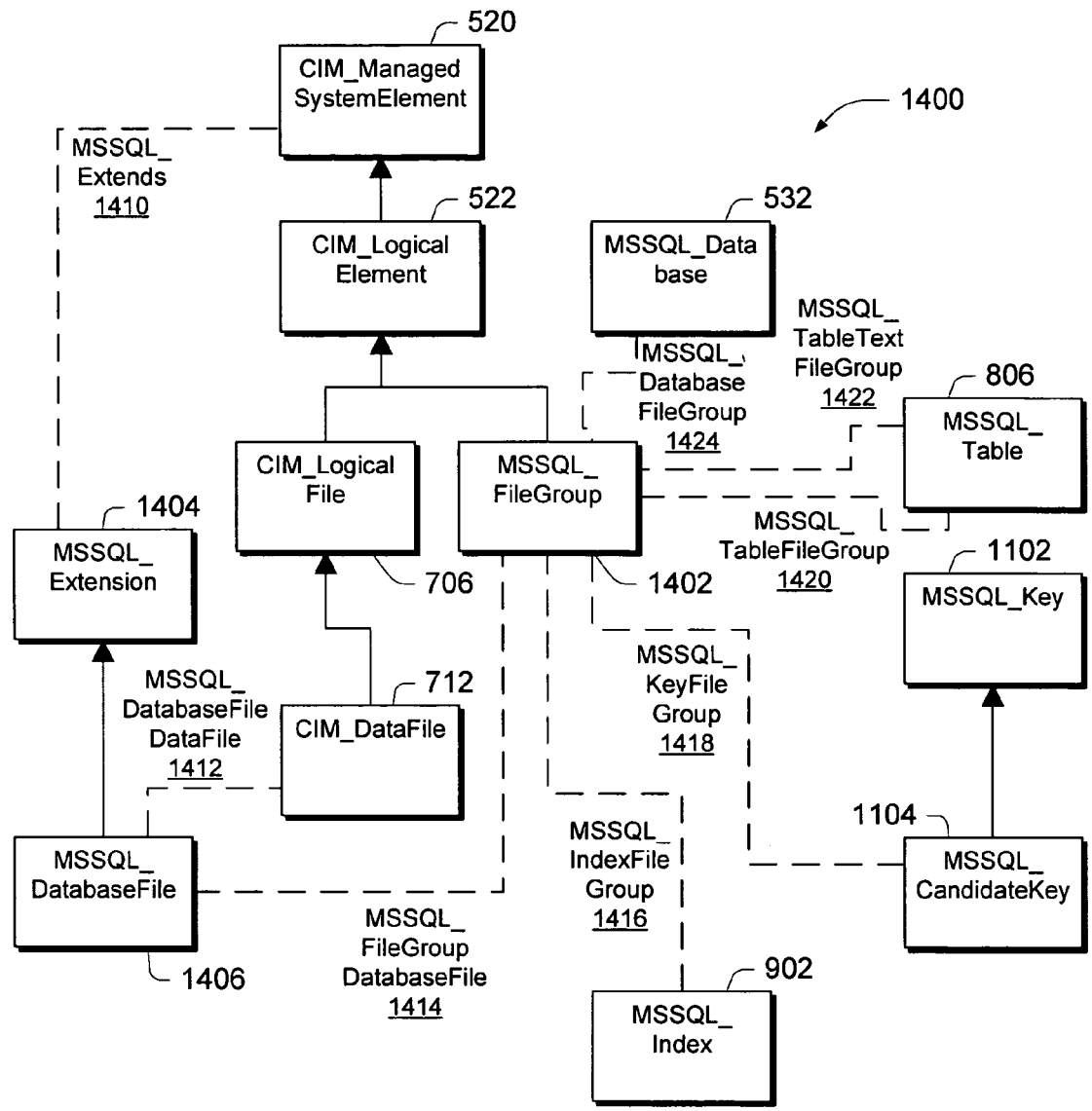

FIG. 14 shows a portion 1400 of the SQL Server schema that relates 19 physical storage. Many of the classes have been described previously. New to this schema portion are MSSQL_FileGroup class 1402 that exposes the attributes of a the SQL Server filegroup, MSSQL_Extension class 1404 that represents extensions made via associations to a managed system element, and MSSQL_DatabaseFile class 1406 that is an extension to the CIM_DataFile class 712.

The association classes in portion 1400 include the following:

- MSSQL_Extends class 1410 is an abstract association class that associates a class with another class that extends the former class by defining some new properties and methods.
- MSSQL_DatabaseFileDataFile class 1412 associates a CIM_Datafile class 712 to the MSSQL_DatabaseFile class 1406 class that contains database file specific properties of an operating system file.
- MSSQL_FileGroupDatabaseFile class 1414 associates a database file group to the operating system files that are part of the group.
- MSSQL_IndexFileGroup class 1416 represents an association between an index and a file group that stores the index.
- MSSQL_KeyFileGroup class 1418 represents an association between a key and the file group used to store the key.
- MSSQL_TableFileGroup class 1420 represents an association between a table and the file groups used to store the table.
- MSSQL_TableTextFileGroup class 1422 associates a table with the file group that is used to store the variable length data in the table.
- MSSQL_DatabaseFileGroup class 1424 represents an association between a database and the file group that contains the operating system files that store the data for the database.

E. Bulk Data Operations

The operations related to data backup and restore are performed by executing certain methods on the MSSQL_SQLServer class 534, MSSQL_Database class 532, MSSQL_Table class 806, and MSSQL_View class 812. The settings for these operations are specified using instances of the following classes:

- MSSQL_RestoreSetting class specifies the behavior of a restore operation for a SQL Server database or log. The class is also used to specify the behavior of the verify operation for a SQL Server backup.
- MSSQL_BackupSetting class specifies the settings for a backup operation.
- MSSQL_TransferSetting class represents the settings used to control the data elements moved from one SQL database to another.
- MSSQL_BulkCopySetting class represents the settings for importing or exporting data from a table or a view.

Exemplary Implementation of Database Schema

The following provides one exemplary implementation of all schema classes introduced above, as well as their properties, methods, and associations. The various classes are grouped together as CIM classes, MSSQL classes, and Win32 classes.

A. CIM Classes

CIM_ApplicationSystem

The CIM_ApplicationSystem class is used to represent an application or a software system that supports a particular business function and that can be managed as independent units. Such a system can be decomposed into its functional components using the CIM_SoftwareFeature class. The software features for a particular application or software system are located using the CIM_ApplicationSystemSoftwareFeature association.

Properties string Caption
   Access Type: Read-only
   The Caption property is a short textual description (one-line string) of the object.
   Maximum Length: 64 string CreationClassName
   Access Type: Read-only
   The CreationClassName property indicates the name of the class or the subclass used in the creation of an instance. When used with the other key properties of this class, this property allows all instances of this class and its subclasses to be uniquely identified.

string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

string Name
   Access Type: Read-only
   The inherited Name property serves as key of a CIM_System instance in an enterprise environment.

string NameFormat
   Access Type: Read-only
   The CIM_System object and its derivatives are top level objects of CIM. They provide the scope for numerous components. Having unique system keys is required. A heuristic can be defined in individual system subclasses to attempt to always generate the same system name key. The NameFormat property identifies how the system name was generated, using the subclass' heuristic.

string PrimaryOwnerContact
   Access Type: Read-only
   A string that provides information on how the primary system owner can be reached (e.g. phone number, email address, . . . ).

string PrimaryOwnerName
   Access Type: Read-only
   The name of the primary system owner.

string Roles [ ]
   Access Type: Read/Write
   A collection of strings that specify the roles this system plays in the IT environment.

string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror resilvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"
Maximum Length: 10

CIM-LogicalFile
Abstract Class
The CIM_LogicalFile class represents a named collection of data (this can be executable code) located in a file system on a storage extent.

Properties uint32 AccessMask
Access Type: Read-only
The AccessMask property is a bit array representing the access rights to the given file or directory held by the user or group on whose behalf the instance is returned. This property is only supported under Windows NT and Windows 2000. On Windows 98 and on Windows NT/2000 FAT volumes, FULL_ACCESS is returned, indicating no security has been set on the object.

| Bit Position | Description |
|---|---|
| 0 | FILE_READ_DATA (file) or FILE_LIST_DIRECTORY (directory) |
| 1 | FILE_WRITE_DATA (file) or FILE_ADD_FILE (directory) |
| 2 | FILE_APPEND_DATA (file) or FILE_ADD_SUBDIRECTORY (directory) |
| 3 | FILE_READ_EA |
| 4 | FILE_WRITE_EA |
| 5 | FILE_EXECUTE (file) or FILE_TRAVERSE (directory) |
| 6 | FILE_DELETE_CHILD (directory) |
| 7 | FILE_READ_ATTRIBUTES |
| 8 | FILE_WRITE_ATTRIBUTES |
| 16 | DELETE |
| 17 | READ_CONTROL |
| 18 | WRITE_DAC |
| 19 | WRITE_OWNER |
| 20 | SYNCHRONIZE | boolean Archive
Access Type: Read-only
The Archive property is a boolean value indicating that the file should be archived.

string Caption
Access Type: Read-only
The Caption property is a short textual description (one-line string) of the object.
Maximum Length: 64 boolean Compressed
Access Type: Read-only
The Compressed property is a boolean value indicating that the file is compressed.

string CompressionMethod
Access Type: Read-only
The CompressionMethod property is a free form string indicating the algorithm or tool used to compress the logical file. If it is not possible (or not desired) to describe the compression scheme (perhaps because it is not known), use the following words: "Unknown" to represent that it is not known whether the logical file is compressed or not, "Compressed" to represent that the file is compressed but either its compression scheme is not known or not disclosed, and "Not Compressed" to represent that the logical file is not compressed.

string CreationClassName
Access Type: Read-only
The CreationClassName property is a string indicating the name of this class.

datetime CreationDate
Access Type: Read-only
The CreationDate property is a datetime value indicating the file's creation date.

string CSCreationClassName
Access Type: Read-only
The CSCreationClassName property is a string indicating the class of the computer system.

string CSName
Access Type: Read-only
The CSName property is a string indicating the name of the computer system.

string Description
Access Type: Read-only
The Description property provides a textual description of the object.

string Drive
Access Type: Read-only
The Drive property is a string representing the drive letter (including colon) of the file. Example: c:

string EightDotThreeFileName
Access Type: Read-only
The EightDotThreeFileName property is a string representing the DOS-compatible file name for this file. Example: c:\progra~1 boolean Encrypted
Access Type: Read-only
The Encrypted property is a boolean value indicating that the file is encrypted.

string EncryptionMethod
Access Type: Read-only
The EncryptionMethod property is a free form string indicating the algorithm or tool used to encrypt the logical file. If it is not possible (or not desired) to describe the encryption scheme (perhaps for security reasons), use the following words: "Unknown" to represent that it is not known whether the logical file is encrypted or not, "Encrypted" to represent that the file is encrypted but either its encryption scheme is not known or not disclosed, and "Not Encrypted" to represent that the logical file is not encrypted.

string Extension
Access Type: Read-only
The Extension property is a string representing the file's extension (without the dot). Example: txt, mof, mdb.

string FileName
Access Type: Read-only
The FileName property is a string representing the filename (without extension) of the file. Example: autoexec uint64 FileSize
Access Type: Read-only
The FileSize property represents the size of the file (in bytes).
Units: Bytes string FileType
   Access Type: Read-only
   The FileType property is a string descriptor representing the file type (indicated by the Extension property).

string FSCreationClassName
   Access Type: Read-only
   The FSCreationClassName property is a string indicating the class of the file system.

string FSName
   Access Type: Read-only
   The FSName property is string indicating the name of the file system.

boolean Hidden
   Access Type: Read-only
   The Hidden property is a boolean value indicating if the file is hidden.

datetime InstallDate
   Access Type: Read-only
   The InstallDate property is datetime value indicating when the object was installed. A lack of a value does not indicate that the object is not installed.

uint64 InUseCount
   Access Type: Read-only
   The InUseCount property is an integer indicating the number of 'file opens' that are currently active against the file.

datetime LastAccessed
   Access Type: Read-only
   The LastAccessed property is a datetime value indicating the time the file was last accessed.

datetime LastModified
   Access Type: Read-only
   The LastModified property is a datetime value indicating the time the file was last modified.

[key] string Name
   Access Type: Read-only
   The Name property is a string representing the inherited name that serves as a key of a logical file instance within a file system. Full path names should be provided. Example: c:\winnt\system\win.ini string Path
   Access Type: Read-only
   The Path property is a string representing the path of the file. This includes leading and trailing backslashes. Example: \windows\system\ boolean Readable
   Access Type: Read-only
   The Readable property is a boolean value indicating if the file can be read.

string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10 boolean System
   Access Type: Read-only
   The system property is a boolean value indicating if the file is a system file.

boolean Writeable
   Access Type: Read-only
   The Writeable property is a boolean value indicating if the file can be written.

Methods
   The CIM_LogicalFile class supports the following methods:

| Method Name | Description |
| --- | --- |
| ChangeSecurityPermissions | The ChangeSecurityPermissions method changes the security permissions for the logical file. |
| ChangeSecurityPermissionsEx | The ChangeSecurityPermissionsEx method changes the security permissions for the logical file. The ChangeSecurityPermissionsEx method is an extended version of the ChangeSecurityPermissions method. |
| Copy | The Copy method copies the logical file or directory. |
| CopyEx | The CopyEx method copies the logical file or directory. CopyEx is an extended version of the Copy method. |
| Compress | The Compress method compresses the logical file (or directory). |
| CompressEx | The CompressEx method compresses the logical file (or directory). CompressEx is an extended version of the Compress method. |
| Delete | The Delete method will delete the logical file (or directory). |
| DeleteEx | The DeleteEx method will delete the logical file (or directory) specified in the object path. DeleteEx is an extended version of the Delete method. |
| GetEffectivePermission | The GetEffectivePermission method determines whether the caller has permissions for the file (or directory). |
| Rename | The Rename method renames the logical file (or directory). |
| TakeOwnerShip | The TakeOwnerShip method obtains ownership of the logical file. |
| TakeOwnerShipEx | The TakeOwnerShipEx method obtains ownership of the logical file. TakeOwnerShipEx is an extended version of the TakeOwnerShip method. |

-continued

| Method Name | Description |
| --- | --- |
| Uncompress | The Uncompress method uncompresses the logical file (or directory). |
| UncompressEx | The UncompressEx method uncompresses the logical file (or directory). UncompressEx is an extended version of the Uncompress method. |

CIM_LogicalIdentity
  Abstract Class
  Association Class
  CIM_LogicalIdentity is an abstract and generic association, indicating that two CIM_LogicalElements represent different aspects of the same underlying entity. This relationship conveys what could be defined with multiple inheritance. It is restricted to the 'logical' aspects of a CIM_ManagedSystemElement. In most scenarios, the Identity relationship is determined by the equivalence of Keys or some other identifying properties of the related Elements. The association should only be used in well-understood scenarios. This is why the association is abstract—allowing more concrete definition and clarification in subclasses. One of the scenarios where this relationship is reasonable is to represent that a Device is both a 'bus' entity and a 'functional' entity. For example, a Device could be both a USB (bus) and a Keyboard (functional) entity.

References

[key] CIM LogicalElement SystemElement
  Access Type: Read-only
  SystemElement represents one aspect of the LogicalElement.

[key] CIM_LogicalElement SameElement
  Access Type: Read-only
  SameElement represents an alternate aspect of the System entity.

CIM_ManagedSystemElement
  Abstract Class
  The CIM_ManagedSystemElement class is the base class for the system element hierarchy. Membership criteria: Any distinguishable component of a system is a candidate for inclusion in this class. Examples: software components, such as files; and devices, such as disk drives and controllers, and physical components such as chips and cards.

Properties string Caption
  Access Type: Read-only
  The Caption property is a short textual description (ore-line string) of the object.
  Maximum Length: 64 string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

string Name
  Access Type: Read-only
  The Name property defines the label by which the object is known. When subclassed, the Name property can be overridden to be a Key property.

string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.
  Values are: "OK", "Error", "Degraded", "Unknown", "Pred Fail", "Starting", "Stopping", "Service"
  Maximum Length: 10

Associations
  CIM_ManagedSystemElement is associated to CIM_ManagedSystemElement as the GroupComponent property of the CIM Component association.
  CIM_ManagedSystemElement is associated to CIM_ManagedSystemElement as the Part Component property of the CIM_Component association.
  CIM_ManagedSystemElement is associated to CIM Setting as the Element property of the CIM_ElementSetting association.
  CIM_ManagedSystemElement is associated to CIM_ManagedSystemElement as the Antecedent property of the CIM_Dependency association.
  CIM_ManagedSystemElement is associated to CIM_ManagedSystemElement as the Dependent property of the CIM_Dependency association.
  CIM_ManagedSystemElement is associated to CIM_StatisticalInformation as the Element property of the CIM_Statistics association. CIM_ManagedSystemElement is associated to MSSQL_Extension as the ExtendedElement property of the MSSQL_Extends association.
  CIM_ManagedSystemElement is associated to CIM_ManagedSystemElement as the Containee property of the MSSQL_Containment association.
  CIM_ManagedSystemElement is associated to CIM_ManagedSystemElement as the Container property of the MSSQL_Containment association.

CIM_Process: CIM_LogicalElement
  Abstract Class
  The CIM_Process class is derived from CIM_LogicalElement. It is intended to represent a program in execution, running under an operating system. Processes are also known as tasks.

Properties string Caption
  Access Type: Read-only
  The Caption property is a short textual description (one-line string) of the object.
  Maximum Length: 64 string CreationClassName
  Access Type: Read-only
  The inherited CreationClassName property indicates the name of the class or the subclass used in the creation of an instance. When used with the other key properties of this class, this property allows all instances of this class and its subclasses to be uniquely identified.

datetime CreationDate
  Access Type: Read-only
  Time that the process began executing string CSCreationClassName
  Access Type: Read-only
  The inherited CSCreationClassName property is a string indicating the class of the computer system.

string CSName
  Access Type: Read-only
  The inherited CSName property is a string indicating the name of the computer system.

string Description
  Access Type: Read-only
  The Description property provides a textual description of the object.

uint16 ExecutionState
  Access Type: Read-only
  Indicates the current operating condition of the process.

| Value | Description |
| --- | --- |
| 0 | Unknown |
| 1 | Other |
| 2 | Ready |
| 3 | Running |
| 4 | Blocked |
| 5 | Suspended Blocked |
| 6 | Suspended Ready | string Handle
  Access Type: Read-only
  A string used to identify the process. A process ID is a process handle.

datetime InstallDate
  Access Type: Read-only
  The InstallDate property is datetime value indicating when the object was installed. A lack of a value does not indicate that the object is not installed.

uint64 KernelModeTime
  Access Type: Read-only
  Time in kernel mode, in milliseconds. If this information is not available, a value of 0 should be used.
  Units: Milliseconds (ms)

string Name
  Access Type: Read-only
  The Name property defines the label by which the object is known. When subclassed, the Name property can be overridden to be a Key property.

string OSCreationClassName
  Access Type: Read-only
  The inherited OSCreationClassName property indicates the name of the class or the subclass used in the creation of an instance. When used with the other key properties of this class, this property allows all instances of this class and its subclasses to be uniquely identified.

string OSName
  Access Type: Read-only
  The inherited OSName property serves as key of an operating system instance within a computer system.

uint32 Priority
  Access Type: Read-only
  Priority indicates the urgency or importance of execution of a process. If a priority is not defined br a process, a value of 0 should be used.

string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
  Values are: "OK", "Error", "Degraded", "Unknown", "Pred Fail", "Starting", "Stopping", "Service"
  Maximum Length: 10 datetime TerminationDate
  Access Type: Read-only
  Time that the process was stopped or terminated.

uint64 UserModeTime
  Access Type: Read-only
  Time in user mode, in milliseconds. If this information is not available, a value of 0 should be used.
  Units: Milliseconds (ms)

uint64 WorkingSetSize
  Access Type: Read-only
  The amount of memory in bytes that a process needs to execute efficiently, for an operating system that uses page-based memory management. If an insufficient amount of memory is available (<working set size), thrashing will occur. If this information is not known, NULL or 0 should be entered. If this data is provided, t could be monitored to understand a process' changing memory requirements as execution proceeds.
  Units: Bytes CIM-Service: CIM_LogicalElement
  Abstract Class
  The CIM_Service class represents a logical element that contains the information necessary to represent and manage the functionality provided by a device and/or software feature. A service is a general-purpose object to configure and manage the implementation of functionality. It is not the functionality itself.

Properties string Caption
  Access Type: Read-only
  The Caption property is a short textual description (one-line string) of the object.
  Maximum Length: 64 string CreationClassName
  Access Type: Read-only
  CreationClassName indicates the name of the class or the subclass used in the creation of an instance. When used with the other key properties of this class, this property allows all instances of this class and its subclasses to be uniquely identified.

string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

[key] string Name
  Access Type: Read-only
  The Name property uniquely identifies the service and provides an indication of the functionality that is managed. This functionality is described in more detail in the object's Description property.

boolean Started
  Access Type: Read-only
  Started is a boolean indicating whether the service has been started (TRUE), or stopped (FALSE).

string StartMode
  Access Type: Read-only
  StartMode is a string value indicating whether the service is automatically started by a operating system, or only started upon request.
  Values are: "Automatic", "Manual"

string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.
  Values are: "OK", "Error", "Degraded", "Unknown", "Pred Fail", "Starting", "Stopping", "Service"
  Maximum Length: 10 string SystemCreationClassName
  Access Type: Read-only
  The type name of the system that hosts this service string SystemName
  Access Type: Read-only
  The name of the system that hosts this service Methods
  The CIM_Service class supports the following methods:

Method Name Description
  StartService The StartService method places the service in the started state.
  StopService The StopService method places the service in the stopped state. *

CIM_Setting
  Abstract Class
  The CIM_Setting class represents configuration-related and operational parameters for one or more CIM_ManagedSystemElement(s). A CIM_ManagedSystemElement may have multiple Setting objects associated with it. The current operational values br an Element's parameters are reflected by properties in the Element itself or by properties in its associations. These properties do not have to be the same values present in the CIM_Setting object. For example, a modem may have a CIM_Setting baud rate of 56 Kb/sec but be operating at 19.2 Kb/sec.

Properties string Caption
  Access Type: Read-only
  A short textual description (one-line string) of the CIM Setting object.
  Maximum Length: 64 string Description
  Access Type: Read-only
  A textual description of the CIM_Setting object.

string SettingID
  Access Type: Read-only
  The identifier by which the CIM_Setting object is known.
  Maximum Length: 256

Associations
  CIM_Setting is associated to CIM_ManagedSystemElement as the Setting property of the CIM_ElementSetting association.

CIM_StatisticalInformation
  Abstract Class
  CIM_StatisticalInformation is a root class for any arbitrary collection of statistical data and/or metrics applicable to one or more managed system elements.

Properties string Caption
  Access Type: Read-only
  A short textual description (one-line string) for the statistic or metric.
  Maximum Length: 64 string Description
  Access Type: Read-only
  A textual description of the statistic or metric.

string Name
  Access Type: Read-only
  The Name property defines the label by which the statistic or metric is known. When subclassed, the property can be overridden to be a Key property.
  Maximum Length: 256

Associations
  CIM_StatisticalInformation is associated to CIM_ManagedSystemElementas the Stats property of the CIM_Statistics association.

CIM_Statistics
  Abstract Class
  Association Class
  CIM_Statistics is an association that relates managed system elements to the statistical group(s) that apply to them.

References
  CIM_ManagedSystemElement Element
    Access Type: Read-only
    The CIM_ManagedSystemElement for which statistical or metric data is defined.
  CIM_StatisticalInformation Stats
    Access Type: Read-only
    The statistical information/object.

CIM_StorageExtent: CIM_LogicalDevice
  Abstract Class
  The CIM_StorageExtent class describes the capabilities and management of the various media that exist to store data and allow data retrieval.

Properties uint16 Access
  Access Type: Read-only
  The Access property describes whether the media is readable, writeable, or both. Unknown can also be returned.

| Value | Description |
| --- | --- |
| 0 | Unknown |
| 1 | Readable |
| 2 | Writeable |
| 3 | Read/Write Supported | uint16 Availability
  Access Type: Read-only
  The availability and status of the device. For example, the Availability property indicates that the device is running and has full power, or is in a warning, test, degraded or power save state. Regarding the power saving states, these are defined as follows: Power Save—Unknown indicates that the device is known to be in a power save mode, but its exact status in this mode is unknown; Power Save-Low Power Mode indicates that the device is in a power save state but still functioning, and may exhibit degraded performance; Power Save-Standby describes that the device is not functioning but could be brought to full power 'quickly'; and Power Save—Warning indicates that the device is in a warning state, though also in a power save mode.

| Value | Description |
| --- | --- |
| 1 | Other |
| 2 | Unknown |
| 3 | Running/Full Power |
| 4 | Warning |
| 5 | In Test |
| 6 | Not Applicable |
| 7 | Power Off |
| 8 | Off Line |
| 9 | Off Duty |
| 10 | Degraded |
| 11 | Not Installed |
| 12 | Install Error |
| 13 | Power Save - Unknown |
| 14 | Power Save - Low Power Mode |
| 15 | Power Save - Standby |
| 16 | Power Cycle |
| 17 | Power Save - Warning | uint64 BlockSize
  Access Type: Read-only
  Size in bytes of the blocks that form this storage extent. If unknown or if a block concept is not valid (for example, for aggregate extents, memory or logical disks), enter a 1.
  Units: Bytes string Caption
  Access Type: Read-only
  The Caption property is a short textual description (one-line string) of the object.
  Maximum Length: 64 uint32 ConfigManagerError Code
  Access Type: Read-only
  Indicates the Win32 Configuration Manager error code.

| Value | Description |
| --- | --- |
| 0 | This device is working properly. |
| 1 | This device is not configured correctly. |
| 2 | Windows cannot load the driver for this device. |
| 3 | The driver for this device might be corrupted, or your system may be running low on memory or other resources. |
| 4 | This device is not working properly. One of its drivers or your registry might be corrupted. |
| 5 | The driver for this device needs a resource that Windows cannot manage. |
| 6 | The boot configuration for this device conflicts with other devices. |
| 7 | Cannot filter. |
| 8 | The driver loader for the device is missing. |
| 9 | This device is not working properly because the controlling firmware is reporting the resources for the device incorrectly. |
| 10 | This device cannot start. |
| 11 | This device failed. |
| 12 | This device cannot find enough free resources that it can use. |
| 13 | This device cannot find enough free resources that it can use. |
| 14 | Windows cannot verify this device's resources. |
| 15 | This device cannot work properly until you restart your computer. |
| 16 | This device is not working properly because there is probably a re-enumeration problem. |
| 17 | Windows cannot identity all the resources this device uses. |
| 18 | This device is asking for an unknown resource type. |
| 19 | Reinstall the drivers for this device. |
| 20 | Your registry might be corrupted. |
| 21 | System failure: Try changing the driver for this device. If that does not work, see your hardware documentation. Windows is removing this device. |
| 22 | This device is disabled. |
| 23 | System failure: Try changing the driver for this device. If that doesn't work, see your hardware documentation. |
| 24 | This device is not present, is not working properly, or does not have all its drivers installed. |
| 25 | Windows is still setting up this device. |
| 26 | Windows is still setting up this device. |
| 27 | This device does not have valid log configuration. |

-continued

| Value | Description |
|---|---|
| 28 | The drivers for this device are not installed. |
| 29 | This device is disabled because the firmware of the device did not give it the required resources. |
| 30 | This device is using an Interrupt Request (IRQ) resource that another device is using. |
| 31 | This device is not working properly because Windows cannot load the drivers required for this device. | boolean ConfigManagerUserConfig

Access Type: Read-only

Indicates whether the device is using a user-defined configuration.

string CreationClassName

Access Type: Read-only

CreationClassName indicates the name of the class or the subclass used in the creation of an instance. When used with the other key properties of this class, this property allows all instances of this class and its subclasses to be uniquely identified.

string Description

Access Type: Read-only

The Description property provides a textual description of the object.

string DeviceID

Access Type: Read-only

DeviceID is an address or other identifying information to uniquely name the logical device.

boolean Error Cleared

Access Type: Read-only

Error Cleared is a boolean property indicating that the error reported in LastError Code property is now cleared.

string ErrorDescription

Access Type: Read-only

ErrorDescription is a free-form string supplying more information about the error recorded in LastError Code property, and information on any corrective actions that may be taken.

string ErrorMethodology

Access Type: Read-only

ErrorMethodology is a free-form string describing the type of error detection and correction supported by this storage extent.

datetime InstallDate

Access Type: Read-only

The InstallDate property is datetime value indicating when the object was installed. A lack of a value does not indicate that the object is not installed.

uint32 LastError Code

Access Type: Read-only

LastError Code captures the last error code reported by the logical device.

[key] string Name

Access Type: Read-only

The Name property defines the label by which the object is known.

uint64 NumberOfBlocks

Total number of consecutive blocks, each block the size of the value contained in the BlockSize property, which form this storage extent. Total size of the storage extent can be calculated by multiplying the value of the BlockSize property by the value of this property. If the value of BlockSize is 1, this property is the total size of the storage extent.

string PNPDeviceID

Access Type: Read-only

Indicates the Win32 Plug and Ray device ID of the logical device. Example: *PNP03 uint16 PowerManagementCapabilities [ ]

Access Type: Read-only

Indicates the specific power-related capabilities of the logical device. The array values, 0="Unknown", 1="Not Supported" and 2="Disabled" are self-explanatory. The value, 3="Enabled" indicates that the power management features are currently enabled but the exact feature set is unknown or the information is unavailable. "Power Saving Modes Entered Automatically" (4) describes that a device can change its power state based on usage or other criteria. "Power State Settable" (5) indicates that the SetPowerState method is supported. "Power Cycling Supported" (6) indicates that the SetPowerState method can be invoked with the PowerState input variable set to 5 ("Power Cycle"). "Timed Power On Supported" (7) indicates that the SetPowerState method can be invoked with the PowerState input variable set to 5 ("Power Cycle") and the Time parameter set to a specific date and time, or interval, for power-on.

Values are: "Unknown", "Not Supported", "Disabled", "Enabled", "Power Saving Modes Entered Automatically", "Power State Settable", "Power Cycling Supported", "Timed Power On Supported"

boolean PowerManagementSupported

Access Type: Read-only

Indicates that the device can be power managed—i.e. can be put into suspend mode, etc. This boolean does not indicate that power management features are currently enabled, only that the logical device is capable of power management.

string Purpose

Access Type: Read-only

A free form string describing the media and/or its use.

string Status

Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10 uint16 StatusInfo

Access Type: Read-only

StatusInfo is a string indicating whether the logical device is in an enabled (value=3), disabled (value=4) or some other (1) or unknown (2) state. If this property does not apply to the logical device, the value, 5 ("Not Applicable"), should be used.

| Value | Description |
|-------|-------------|
| 1 | Other |
| 2 | Unknown |
| 3 | Enabled |
| 4 | Disabled |
| 5 | Not Applicable | string SystemCreationClassName
   Access Type: Read-only
   The scoping system's CreationClassName.

string SystemName
   Access Type: Read-only
   The scoping system's Name.

Methods

The CIM_StorageExtent class supports the following methods:

| Method Name | Description |
|-------------|-------------|
| Reset | Requests a reset of the logical device. |
| SetPowerState | SetPowerState defines the desired power state for a logical device and when a device should be put into that state. |

CIM_System: CIM_LogicalElement
   Abstract Class

The CIM System class represents a logical element that aggregates an enumerable set of managed system elements. The aggregation operates as a functional whole. Within any particular subclass of CIM-System, there is a well-defined list of CIM_ManagedSystemElementclasses whose instances must be aggregated.

Properties string Caption
   Access Type: Read-only
   The Caption property is a short textual description (one-line string) of the object.
   Maximum Length: 64 string CreationClassName
   Access Type: Read-only
   The CreationClassName property indicates the name of the class or the subclass used in the creation of an instance. When used with the other key properties of this class, this property allows all instances of this class and its subclasses to be uniquely identified.

string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

string Name
   Access Type: Read-only
   The inherited Name property serves as key of a CIM_System instance in an enterprise environment.

string NameFormat
   Access Type: Read-only
   The CIM_System object and its derivatives are top level objects of CIM. They provide the scope for numerous components. Having unique system keys is required. A heuristic can be defined in individual system subclasses to attempt to always generate the same system name key. The NameFormat property identifies how the system name was generated, using the subclass' heuristic.

string PrimaryOwnerContact
   Access Type: Read-only
   A string that provides information on how the primary system owner can be reached (e.g. phone number, email address, . . . ).

string PrimaryOwnerName
   Access Type: Read-only
   The name of the primary system owner.

string Roles [ ]
   Access Type: Read/Write
   A collection of strings that specify the roles this system plays in the IT-environment.

string Status
   Access Type: Read-only
   The Status property is a string indicating the current status of the object. Various operational and non operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10

B. MSSQL_Classes

MSSQL_BackupDevice: CIM_StorageExtent

The MSSQL_BackupDevice class represents backup devices known to the SQL Server™ installation.

Properties uint16 Access
   Access Type: Read-only
   The Access property describes whether the media is readable, writeable, or both. Unknown can also be returned.

| Value | Description |
|-------|-------------|
| 0 | Unknown |
| 1 | Readable |
| 2 | Writeable |
| 3 | Read/Write Supported | uint16 Availability

Access Type: Read-only

The availability and status of the device. For example, the Availability property indicates that the device is running and has full power, or is in a warning, test, degraded or power save state. Regarding the power saving states, these are defined as follows: Power Save—Unknown indicates that the device is known to be in a power save mode, but its exact status in this mode is unknown; Power Save—Low Power Mode indicates that the device is in a power save state but still functioning, and may exhibit degraded performance; Power Save—Standby describes that the device is not functioning but could be brought to full power 'quickly'; and Power Save—Warning indicates that the device is in a warning state, though also in a power save mode.

| Value | Description |
| --- | --- |
| 1 | Other |
| 2 | Unknown |
| 3 | Running/Full Power |
| 4 | Warning |
| 5 | In Test |
| 6 | Not Applicable |
| 7 | Power Off |
| 8 | Off Line |
| 9 | Off Duty |
| 10 | Degraded |
| 11 | Not Installed |
| 12 | Install Error |
| 13 | Power Save - Unknown |
| 14 | Power Save - Low Power Mode |
| 15 | Power Save - Standby |
| 16 | Power Cycle |
| 17 | Power Save - Warning | uint64 BlockSize

Access Type: Read-only

Size in bytes of the blocks that form this storage extent. If unknown or if a block concept is not valid (for example, for aggregate extents, memory or logical disks), enter a 1.

Units: Bytes string Caption

Access Type: Read-only

The Caption property is a short textual description (one-line string) of the object.

Maximum Length: 64 uint32 ConfigManagerError Code

Access Type: Read-only

Indicates the Win32 Configuration Manager error code.

| Value | Description |
| --- | --- |
| 0 | This device is working properly. |
| 1 | This device is not configured correctly. |
| 2 | Windows cannot load the driver for this device. |
| 3 | The driver for this device might be corrupted, or your system may be running low on memory or other resources. |
| 4 | This device is not working properly. One of its drivers or your registry might be corrupted. |
| 5 | The driver for this device needs a resource that Windows cannot manage. |
| 6 | The boot configuration for this device conflicts with other devices. |
| 7 | Cannot filter. |
| 8 | The driver loader for the device is missing. |

-continued

| Value | Description |
| --- | --- |
| 9 | This device is not working properly because the controlling firmware is reporting the resources for the device incorrectly. |
| 10 | This device cannot start. |
| 11 | This device failed. |
| 12 | This device cannot find enough free resources that it can use. |
| 13 | This device cannot find enough free resources that it can use. |
| 14 | Windows cannot verify this device's resources. |
| 15 | This device cannot work properly until you restart your computer. |
| 16 | This device is not working properly because there is probably a re-enumeration problem. |
| 17 | Windows cannot identity all the resources this device uses. |
| 18 | This device is asking for an unknown resource type. |
| 19 | Reinstall the drivers for this device. |
| 20 | Your registry might be corrupted. |
| 21 | System failure: Try changing the driver for this device. If that does not work, see your hardware documentation. Windows is removing this device. |
| 22 | This device is disabled. |
| 23 | System failure: Try changing the driver for this device. If that doesn't work, see your hardware documentation. |
| 24 | This device is not present, is not working properly, or does not have all its drivers installed. |
| 25 | Windows is still setting up this device. |
| 26 | Windows is still setting up this device. |
| 27 | This device does not have valid log configuration. |
| 28 | The drivers for this device are not installed. |
| 29 | This device is disabled because the firmware of the device did not give it the required resources. |
| 30 | This device is using an Interrupt Request (IRQ) resource that another device is using. |
| 31 | This device is not working properly because Windows cannot load the drivers required for this device. | boolean ConfigManagerUserConfig

Access Type: Read-only

Indicates whether the device is using a user-defined configuration.

string CreationClassName

Access Type: Read-only

CreationClassName indicates the name of the class or the subclass used in the creation of an instance. When used with the other key properties of this class, this property allows all instances of this class and its subclasses to be uniquely identified.

string Description

Access Type: Read-only

The Description property provides a textual description of the object.

string DeviceID

Access Type: Read-only

DeviceID is an address or other identifying information to uniquely name the logical device.

boolean Error Cleared

Access Type: Read-only

Error Cleared is a boolean property indicating that the error reported in LastError Code property is now cleared.

string ErrorDescription
   Access Type: Read-only
   ErrorDescription is a free-form string supplying more information about the error recorded in LastError Code property, and information on any corrective actions that may be taken.

string ErrorMethodology
   Access Type: Read-only
   ErrorMethodology is a freeform string describing the type of error detection and correction supported by this storage extent.

datetime InstallDate
   Access Type: Read-only
   The InstallDate property is datetime value indicating when the object was installed. A lack of a value does not indicate that the object is not installed.

uint32 LastError Code
   Access Type: Read-only
   LastError Code captures the last error code reported by the logical device.

[key] string Name
   Access Type: Read-only
   The Name property defines the label by which the object is known.

uint64 NumberOfBlocks
   Total number of consecutive blocks, each block the size of the value contained in the BlockSize property, which form this storage extent. Total size of the storage extent can be calculated by multiplying the value of the BlockSize property by the value of this property. If the value of BlockSize is 1, this property is the total size of the storage extent.

string PhysicalLocation
   Access Type: Read/Write
   The PhysicalLocation property indicates the name of the backup device as known to the operating system. For example, the string \\Seattle1\Backups\Northwind.bak specifies a server name, directory, and file name for a backup device. The string\\.\TAPE0 specifies a server and a file device, most likely a tape, as a backup device.

string PNPDeviceID
   Access Type: Read-only
   Indicates the Win32 Plug and Play device ID of the logical device. Example: *PNP03 uint16 PowerManagementCapabilities [ ]
   Access Type: Read-only
   Indicates the specific power-related capabilities of the logical device. The array values, 0="Unknown", 1=" "and 2="Disabled" are self explanatory. The value, 3="Enabled" indicates that the power management features are currently enabled but the exact feature set is unknown or the information is unavailable. "Power Saving Modes Entered Automatically" (4) describes that a device can change its power state based on usage or other criteria. "Power State Settable" (5) indicates that the SetPowerState method is supported. "Power Cycling Supported" (6) indicates that the SetPowerState method can be invoked with the PowerState input variable set to 5 ("Power Cycle"). "Timed Power On Supported" (7) indicates that the SetPowerState method can be invoked with the PowerState input variable set to 5 ("Power Cycle") and the Time parameter set to a specific date and time, or interval, for power-on.

| Value | Description |
|---|---|
| 0 | Unknown |
| 1 | Not Supported |
| 2 | Disabled |
| 3 | Enabled |
| 4 | Power Saving Modes Entered Automatically |
| 5 | Power State Settable |
| 6 | Power Cycling Supported |
| 7 | Timed Power On Supported | boolean PowerManagementSupported
   Access Type: Read-only
   Indicates that the device can be power managed—i.e. can be put into suspend mode, etc. This boolean does not indicate that power management features are currently enabled, only that the logical device is capable of power management.

string Purpose
   Access Type: Read-only
   A free form string describing the media and/or its use.

boolean SkipTapeLabel
   Access Type: Read/Write
   The SkipTapeLabel property indicates whether the verification to check that correct media is loaded is performed. If True, media headers are not written. An existing media header is ignored. If False, media headers are honored.

[key] string SQLServerName
   Access Type: Read-only
   The SQLServerName property indicates the name of the SQL Server™ installation that the object is a part of.
   Maximum Length: 128 string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not al such work is on-line, yet the managed element is neither "OK" nor in one of the other states.
   Values are: "OK", "Error", "Degraded", "Unknown", "Pred Fail", "Starting", "Stopping", "Service"
   Maximum Length: 10 uint16 StatusInfo
   Access Type: Read-only
   StatusInfo is an integer value indicating the status of the logical device.
   If this property does not apply to the logical device, the value, 5 ("Not Applicable"), should be used.

| Value | Description |
|---|---|
| 1 | Other |
| 2 | Unknown |
| 3 | Enabled |

-continued

| Value | Description |
| --- | --- |
| 4 | Disabled |
| 5 | Not Applicable | string SystemCreationClassName
  Access Type: Read-only
  The scoping system's CreationClassName.

string SystemName
  Access Type: Read-only
  The scoping system's name.

boolean SystemObject
  Access Type: Read-only
  The SystemObject property indicates whether the object is owned by Microsoft®. A value of True indicates that the object implementation is owned by Microsoft®.

uint32 Type
  Access Type: Read-only
  The Type property indicates the type of the backup media.

| Value | Description |
| --- | --- |
| 2 | Disk File |
| 3 | File On Removable Media In A: Drive |
| 4 | File On Removable Media In B: Drive |
| 5 | Tape |
| 6 | Named Pipe |
| 7 | CD-ROM |
| 100 | Unknown |

Methods
  The MSSQL_BackupDevice class supports the following methods:

| Method Name | Description |
| --- | --- |
| ReadBackupHeader | The ReadBackupHeader method returns the header information for the data backed up on the backup device. |
| ReadMediaHeader | The ReadMediaHeader method returns an object enumerating the media header information for the backup device. |
| Reset | Requests a reset of the logical device. This method is not implemented for this class. |
| SetPowerState | SetPowerState defines the desired power state for a logical device and when a device should be put into that state. This method is not implemented for this class. |

Associations
  MSSQL_BackupDevice is associated to MSSQL_SQLServer as the Antecedent property of the MSSQL_SQLServerBackupDevice association.

MSSQL_BackupHeader
  Abstract Class
  The MSSQL_BackupHeader class represents the contents of the header record for backup content. The instances of this class are returned as results of the ReadBackupHeader method on the MSSQL_BackupDevice class.

Properties string BackupDescription
  The BackupDescription property describes the contents of the backup.

datetime BackupFinishDate
  The BackupFinishDate property specifies the date and time that the backup operation finished.

string BackupName
  The BackupName property indicates the name of the backup set.
  Maximum Length: 130 uint32 BackupSize
  The BackupSize property specifies the size of the backup in bytes.
  Units: Bytes datetime BackupStartDate
  The BackupStartDate property specifies the date and time that the backup operation began.

uint32 BackupType
  The BackupType property indicates the type of the backup content. The content could be a database, transaction log, file or differential database backup.
  Maximum Length: 256

| Value | Description |
| --- | --- |
| 1 | Database |
| 2 | Transaction Log |
| 4 | File |
| 5 | Differential Database | uint32 CheckpointLsn
  The CheckpointLsn property specifies the log sequence number of the most recent checkpoint at the time the backup was created.

uint32 CodePage
  The CodePage property specifies the server code page or character set used by the server.

uint32 CompatibilityLevel
  The CompatibilityLevel property specifies the compatibility level setting of the database from which the backup was created.

| Value | Description |
| --- | --- |
| 0 | Unknown |
| 60 | SQL Server 6.0 |
| 65 | SQL Server 6.5 |
| 70 | SQL Server 7.0 |
| 80 | SQL Server 2000 | boolean Compressed
  The Compressed property indicates whether the backed up data is compressed. SQL Server™ does not currently support software compression; hence the value of this property is always FALSE.

uint32 DatabaseBackupLsn
  The DatabaseBackupLsn property specifies the log sequence number of the most recent full database backup.

datetime DatabaseCreationDate
　　The DatabaseCreationDate property specifies the date and time the database was created.

string DatabaseName
　　The DatabaseName property specifies the name of the database that was backed up.
　　Maximum Length: 130 uint32 DatabaseVersion
　　The DatabaseVersion property specifies the version of the database from which the backup was created.

uint32 DeviceType
　　The DeviceType property specifies the type of device used for the backup operation.

| Value | Description |
| --- | --- |
| 2 | Temporary disk device |
| 5 | Temporary tape device |
| 6 | Temporary named pipe device |
| 7 | Temporary virtual device |
| 102 | Permanent disk device |
| 105 | Permanent tape device |
| 106 | Permanent named pipe device |
| 107 | Permanent virtual device | datetime ExpirationDate
　　The ExpirationDate property indicates the expiration date for the backup set.

uint32 FirstLsn
　　The FirstLsn property specifies the log sequence number of the first transaction in the backup set. This property is NULL for file backups.

uint32 LastLsn
　　The LastLsn property specifies the log sequence number of the last transaction in the backup set. This property is NULL for file backups.

string MachineName
　　The MachineName property specifies the name of the computer that performed the backup operation.
　　Maximum Length: 130 uint32 Position
　　The Position property indicates the position of the backup set relative to the volume.

string ServerName
　　The ServerName property specifies the name of the server that wrote the backup set.
　　Maximum Length: 130 uint32 SoftwareVendorId
　　The SoftwareVendorId property specifies the software vendor identification number. For SQL Server™, this number is 4608.

uint32 SoftwareVersionBuild
　　The SoftwareVersionBuild property specifies the build number of the server that created the backup set.

uint32 SoftwareVersionMajor
　　The SoftwareVersionMajor property specifies the major version number of the server that created the backup set.

uint32 SoftwareVersionMinor
　　The SoftwareVersionMinor property specifies the minor version number of the server that created the backup set.

uint32 SortOrder
　　The SortOrder property specifies the server sort order. This property is only valid for database backups.

string UserName
　　The UserName property specifies the name of the user that performed the backup operation.
　　Maximum Length: 130

MSSQL_BackupSetting: MSSQL_Setting
　　The MSSQL_BackupSetting class is used to specify the settings for a backup operation. An instance of this class is passed as an argument to the SQLBackup method on the MSSQL_SQLServer class.

Properties string BackupSetDescription
　　Access Type: Read/Write
　　The BackupSetDescription property provides descriptive or identifying text for the result of a backup operation. The BackupSetDescripton property value is limited to 255 characters. There is no default value.
　　Maximum Length: 255 string BackupSetName
　　Access Type: Read/Write
　　The BackupSetName property identifies a unit of backup work. The BackupSetName property value is limited to 128 characters.
　　Maximum Length: 128 sint32 BlockSize
　　Access Type: Read/Write
　　The BlockSize property specifies the formatting size unit for tapes, in bytes, formatted as part of a backup.
　　Units: Bytes string Caption
　　Access Type: Read-only
　　A short textual description (one-line string) of the object.
　　Maximum Length: 64 string Database
　　Access Type: Read/Write
　　The Database identifies the source database for a for backup. The property is a required element and must be set prior to calling the SQLBackup method of the MSSQL_SQLServer class.

string DatabaseFileGroups[ ]
　　Access Type: Read/Write
　　The DatabaseFileGroups property identifies filegroups targeted by a backup or restore operation. Set to an empty string to reset processing and target the entire database.

string DatabaseFiles [ ]
　　Access Type: Read/Write
　　The DatabaseFiles property identifies operating system files storing table or index data as targets of a backup or restore operation. Set to an empty string to reset processing and target the entire database.

string Description
　　Access Type: Read-only
　　A textual description of the object.

string Device [ ]
　　Access Type: Read/Write
　　The Device property specifies one or more backup devices used as a database backup target source. Only one medium type can be specified for any backup or restore operation, but multiple media may be specified. Set the Devices property to specify one or more SQL Server backup devices as the backup medium. Specify more than a single database file to stripe the backup operation.

datetime ExpirationDate
　　Access Type: Read/Write
　　The ExpirationDate property specifies the last valid date for the backup data.

boolean FormatMedia
　　Access Type: Read/Write
　　The FormatMedia property controls tape formatting on a backup operation. The FormatMedia property applies only when the backup medium is tape. The property has no meaning for file or pipe media. If TRUE, the SQL Server™ backup operation attempts to format the tape as an initial step. If FALSE, the SQL Server™ backup operation does not attempt to format the tape.

boolean Initialize
　　Access Type: Read/Write
　　The Initialize property controls backup device append/overwrite behavior for a backup to one or more specified devices. If TRUE, the backup specified becomes the first backup set on the media, overwriting any existing backup sets on the media. The backup media is not overwritten if either of the following conditions is met: All backup sets on the media have not yet expired. The optionally specified backup set name does not match the name on the backup media. Specify backup set name with the BackupSetName property. If FALSE, the backup specified creates a new backup set appended as the last backup set on the media.

string MediaDescription
　　Access Type: Read/Write
　　The MediaDescription property provides informative text to aid in identification of a backup set. The MediaDescription property is written to a tape media when the media is initialized.

string MediaName
　　Access Type: Read/Write
　　The MediaName property provides informative text to aid in identification of a backup set. The MediaName property is are written to a tape media when the media is initialized.

boolean Restart
　　Access Type: Read/Write
　　The Restart property controls Backup object behavior when the backup operation was started and interrupted. If TRUE, SQL Server™ attempts to continue processing on a partial backup operation. If FALSE, SQL Server™ restarts an interrupted backup operation at the beginning of the backup set. Set the Restart property only when a user action or system error interrupts backup processing. When using the Restart property, the backup operation specified by the setting must match the originally specified setting in all particulars. Do not set any other properties for the object when setting the Restart property.

sint32 RetainDays
　　Access Type: Read/Write
　　The RetainDays property specifies the number of days that must elapse before a backup set can be overwritten.

[key] string SettingID
　　Access Type: Read/Write
　　The identifier by which the setting object is known.
　　Maximum Length: 256 boolean SkipTapeHeader
　　Access Type: Read/Write
　　The SkipTapeHeader property enables or disables backup operation logic that verifies that correct media is loaded. If TRUE, a media name recorded on the media is not checked. The backup set is appended to the media. If FALSE (default), a recorded media name is checked.

[key] string SQLServerName
　　Access Type: Read/Write
　　The SQLServerName property indicates the name of the SQL Server™ installation that the object is a part of.
　　Maximum Length: 128 uint32 TargetType
　　Access Type: Read/Write
　　The TargetType property controls the type of backup performed against a Microsoft® SQL Server™ database. SQL Server™ can back up an entire database, that portion of a database changed after the last backup, one or more operating system files containing table or index data, or the transaction log of a database. The value of the TargetType property determines applicability and interpretation of related MSSQL_BackupSetting object properties. For example, when TargetType is Files, either the DatabaseFileGroups or DatabaseFiles property must specify filegroups or files to be backed up.

| Value | Description | Explanation |
| --- | --- | --- |
| 0 | Database | Backup the entire database. |
| 1 | Differential | Back up rows changed after the most recent full database or differential backup. |
| 2 | Files | Back up only specified files. |
| 3 | Log | Back up only the database transaction log. | uint32 TruncateLog
　　Access Type: Read/Write
　　The TruncateLog property controls log file processing during backup operations.

| Value | Description | Explanation |
| --- | --- | --- |
| 0 | Truncate | Default. Transaction log is backed up. Records referencing committed transactions are removed. |
| 1 | No truncate | Transaction log is backed up. Records referencing committed transactions are not removed, providing a point-in-time image of the log. |
| 2 | No Log | Records referencing committed transactions are removed. Transaction log is not backed up. | boolean UnloadTapeAfter
　　Access Type: Read/Write
　　The UnloadTapeAfter property controls tape media handling on completion of a backup or restore operation. If TRUE, the tape media in the tape device(s) is rewound and unloaded when the operation completes. If FALSE (default), no attempt is made to rewind and unload the tape media.

MSSQL_BaseDatatype: CIM_Dependency
　　Association Class
　　The MSSQL_BaseDatatype class represents an association between a user defined datatype and the system datatype from which it is derived.

References

[key] MSSQL_SystemDatatye Antecedent
  Access Type: Read-only
  The Antecedent property references the system datatype from which the user defined datatype is derived.

[key] MSSQL_UserDatatype Dependent
  Access Type: Read-only
  The Dependent property references the user-defined datatype that is derived from the base system data type.

MSSQL_BulkCopySetting: MSSQL_Setting
  The MSSQL_BulkCopySetting class represents the settings for importing or exporting data from a table or a view. It is used as a parameter in the ImportData and ExportData methods in the MSSQL_Table class, and ExportData in the MSSQL_View class.

Properties string Caption
  Access Type: Read-only
  A short textual description (one-line string) of the setting object.
  Maximum Length: 64 sint32 CodePage
  Access Type: Read/Write
  The CodePage property returns the identifier of the character set used by the referenced Microsoft® SQL Server™ installation or is used to interpret data for a bulk-copy operation. A character set (code page) is used to interpret multibyte character data, determining character value, and therefore sort order. Code page settings apply only to multibyte character data, not to Unicode character data. A code page is chosen for a SQL Server™ installation during setup. By default, bulk-copy operations interpret character data assuming the code page used by the SQL Server™ installation that is either the source or the destination for the copied data.

string ColumnDelimiter
  Access Type: Read/Write
  The ColumnDelimiter property specifies one or more characters used to delimit a row of data in a bulk copy data file. The ColumnDelimiter property has meaning only when the DataFileType property is set to Special Delimited Char.

string DataFilePath
  Access Type: Read/Write
  The DataFilePath property indicates the target or source for the bulk copy operation. The operating system file specified by the DataFilePath property is the destination for the data copy performed by the ExportData method of MSSQL_Table and MSSQL_View objects. It is the source file for the ImportData method of MSSQL_Table dejects.

uint32 DataFileType
  Access Type: Read/Write
  Microsoft® SQL Server™ bulk copy operations can copy to or read from files containing data in a number of formats. Use the DataFileType property to indicate the format type of the file desired or in use.

| Value | Description | Explanation |
| --- | --- | --- |
| 1 | Comma Delimited Char | Columns are delimited using a comma character. |
| 2 | Tab Delimited Char | Columns are delimited using a tab character. Each data row is delimited by a carriage return/linefeed character pair. |
| 3 | Special Delimited Char | User-defined by the ColumnDelimiter and RowDelimiter properties. |
| 4 | Native Format | SQL Server ™ bulk copy native format. When DataFileType property is Native Format, use the Use6xCompatible property to specify SQL Server ™ version compatibility. |
| 5 | Use Format File | Bulk copy uses the file identified in the FormatFilePath property. | string Description
  Access Type: Read-only
  A textual description of the setting object.

string ErrorFilePath
  Access Type: Read/Write
  The ErrorFilePath property specifies the full path and full file name of a bulk copy operation error log file. SQL Server™ bulkcopy operation logs errors to a file when an error file is provided at time of bulk copy initialization. When errors occur, the bulk copy operation continues to process rows until a maximum number of allowed errors is reached. If that maximum is reached, the error logging file is closed and the bulk copy operation stops. Set the MaximumErrorsBeforeAbort property to set the limiting number of allowed errors in a bulk copy operation.

boolean ExportWideChar
  Access Type: Read/Write
  The ExportWideChar property controls character set used in the data file when creating a data file by using the ExportData method of the MSSQL_Table and MSSQL_View class. If TRUE, the data file is created as a Unicode text file. If FALSE, the data file is created as a multibyte character text file. The ExportWideChar property is evaluated only when the MSSQL_BulkCopySetting object is used as an argument to the ExportData method, and the bulk-copy operation specifies a character format target file, i.e. the DataFileType property of the MSSQL_BulkCopySetting object is 'Comma Delimited Char', 'Special Delimited Char', or 'Tab Delimited Char'.

sint32 FirstRow
  Access Type: Read/Write
  The FirstRow property is an ordinal value defining the starting point for a bulk data copy. When data is copied from SQL Server™ by using the ExportData method of a MSSQL_Table or MSSQL_View object, the FirstRow property indicates the starting row position in the SQL Server™ table. When data is copied to SQL Server™ by using the ImportData method of a MSSQL_Table object, the FirstRow property indicates the starting row position in the source data file.

string FormatFilePath
  Access Type: Read/Write
  The FormatFilePath property indicates the path and file name of a bulk-copy format file. SQL Server™ bulk copy operations can use a user-specified data format stored in a text file. The property has meaning only when the DataFileType property is set to 'Use Format File'.

sint32 ImportRowsPerBatch
    Access Type: Read/Write
    The ImportRowsPerBatch property specifies the number of rows contained in a bulk copy transaction. The SQL Server™ bulk copy process can copy large amounts of data from an external data file to a SQL Server™ table. By default, a bulk copy data-import operation inserts all rows in the data file in a single transaction. SQL Server™ does not guarantee data integrity until and unless a bulk copy transaction is committed. Use ImportRowsPerBatch to adjust the size of the bulk copy transaction.

boolean IncludeIdentityValues
    Access Type: Read/Write
    The IncludeIdentityValues property controls the handling of existing values for a column with the SQL Server identity property when data is copied to the SQL Server™ table. When TRUE, the SET IDENTITY_INSERT ON statement is executed when the ImportData method of a MSSQL_Table object is called. When FALSE, any data values present for a column with the identity property are ignored. SQL Server™ generates data values for the column by using the column's setting for identity seed and increment. The default is FALSE.

sint32 LastRow
    Access Type: Read/Write
    The LastRow property is an ordinal value defining the end point for a bulk data copy. When data is copied from SQL Server™ by using the ExportData method of a MSSQL_Table or MSSQL_View object, the property indicates the end row position in the SQL Server™ table. When data is copied to SQL Server™ by using the ImportData method of a MSSQL_Table object, the property indicates the end row position in the source data file. The row will be the last one copied to the SQL Server™ table.

string LogFilePath
    Access Type: Read/Write
    The LogFilePath property specifies the full operating system path and file name for a bulk copy log file. A bulk copy log file contains statistics describing the number of rows copied and the processing time. It may also contain any non-bulk copy messages received from SQL Server™ during the bulk copy.

sint32 MaximumErrorsBeforeAbort
    Access Type: Read/Write
    The MaximumErrorsBeforeAbort property specifies the error limit for a bulk copy operation. The default is 10, and a bulk copy operation will stop when ten errors occur. Setting the property to a value greater than 65,535 results in use of the maximum, 65,535. An attempt to set the MaximumErrorsBeforeAbort property to a value less than 1 causes use of the default.

string RowDelimiter
    Access Type: Read/Write
    The RowDelimiter property specifies a character or character sequence that marks the end of a row in a Microsoft® SQL Server™ bulk copy data file. The RowDelimiter property has meaning only when the DataFileType property is 'Special Delimited Char'.

uint32 ServerBCPDataFileType
    Access Type: Read/Write
    The ServerBCPDataFileType property specifies the format for an imported data file. The ServerBCPDataFileType property is interpreted only when importing data and when the UseServerSideBCP property of the MSSQL_BulkCopySetting object is TRUE. When ServerBCPDataFileType is set to 'Char', specify a character set by using the CodePage property.

| Value | Description | Explanation |
|---|---|---|
| 1 | Char | Read a data file as character data. Interpret the data file using the character set specified. This is the default. |
| 2 | Native | Assume bulk copy native data format when reading the data file. |
| 4 | Wide Char | Read a data file as Unicode character data. |
| 8 | Wide Native | Assume bulk copy wide native data format when reading the data file. | boolean ServerBCPKeepIdentity
    Access Type: Read/Write
    The ServerBCPKeepIdentity property controls the handling of existing values for a column with the identity property when importing data into the column. When TRUE, NULL is inserted when missing values are encountered in the data file. The default constraint does not supply a value for the column. When FALSE (default), the default constraint provides a value for any missing values encountered in the data file. The ServerBCPKeepNulls property is interpreted only when importing data and when the UseServerSideBCP property of the MSSQL_BulkCopySetting object is TRUE.

boolean ServerBCPKeepNulls
    Access Type: Read/Write
    The ServerBCPKeepNulls property controls the handling of missing values for all columns accepting NULL and possessing a default value constraint when importing data. When TRUE, NULL is inserted when missing values are encountered in the data file. The default constraint does not supply a value for the column. When FALSE (default), the default constraint provides a value for any missing values encountered in the data file. The ServerBCPKeepNulls property is interpreted only when importing data and when the UseServerSideBCP property of is set to TRUE.

[key] string SettingID
    Access Type: Read/Write
    The identifier by which the setting object is known.
    Maximum Length: 256

[key] string SQLServerName
    Access Type: Read/Write
    The SQLServerName property indicates the name of the SQL Server™ installation that the object is a part of.
    Maximum Length: 128 boolean SuspendIndexing
    Access Type: Read/Write
    The SuspendIndexing property controls indexupdate when the ImportData method of the MSSQL_Table class is used to copy data to SQL Server™. If TRUE, indexes are dropped before the bulk copy operation is started and recreated after the bulk copy operation is completed. If FALSE, no changes are made to indexing. Note: Indexes that enforce referential or data integrity constraints, such as those implemented by SQL Server™ PRIMARY KEY or UNIQUE key constraints, are not dropped even when SuspendIndexing is TRUE.

boolean TableLock
    Access Type: Read/Write
    The TableLock property specifies whether to set tablelevel locking during the execution of a bulk copy import command. If TRUE, the table-level locking is used during the bulk copy import operation. The default is FALSE.

boolean TruncateLog
    Access Type: Read/Write
    The TruncateLog property controls log file processing upon completion of the ImportData method. If TRUE, the log file is truncated on successful completion of the ImportData method. If FALSE, the log file is not truncated regardless of the completion status of the ImportData method.

boolean Use6xCompatible
    Access Type: Read/Write
    The Use6xCompatible property controls interpretation of Microsoft® SQL Server™ bulk copy native format data files. A SQL Server™ bulk copy operation either creates or reads from a data file. SQL Servers bulk copy data files are created in either native (proprietary) or character format. SQL Server™ bulk copy native data file format has changed for SQL Server™ version 7.0. The user must direct version dependent handling of source files when processing native format files created by an earlier version of SQL Server™. If TRUE, a bulk copy operation interprets file data based on the preSQL Server™ 7.0 format for native data files. If FALSE, default, a bulk copy operation interprets file data based on the SQL Server™ 7.0 format.

boolean UseBulkCopyOption
    Access Type: Read/Write
    The UseBulkCopyOption property determines whether the select into/bulkcopy option is turned on automatically when the ImportData method of the MSSQL_Table object is executed. If TRUE, and the select into/bulkcopy database option is off in the target database, the option is turned on before an ImportData bulk copy is started and is turned off after the bulk copy is complete. If FALSE, no adjustments to the database options are made. Important: The select into/bulkcopy database option allows non-logged alteration to the target database. A target database should be backed up after any non-logged actions against it.

boolean UseServerSideBCP
    Access Type: Read/Write
    The UseServerSideBCP property controls the behavior of the bulk copy operation. The operation can be performed using either the bulk copy extensions to ODBC or the Transact-SQL BULK INSERT statement. When TRUE, the row import operation will he implemented by using the BULK INSERT statement. When FALSE (default), the row import or export operation will be implemented using extensions to the SQL Server™ ODBC driver.

MSSQL_CandidateKey: MSSQL_Key
    Abstract Class
    The MSSQL_CandidateKey class represents a candidate key in a SQL Server table. It consists of a set of columns that can uniquely identify a row in a table.

Properties string Caption
    Access Type: Read-only
    The Caption property is a short textual description (one-line string) of the object.
    Maximum Length: 64

[key] string DatabaseName
    Access Type: Read-only
    The DatabaseName property indicates the name of the database that the key is a part of.
    Maximum Length: 128 string Description
    Access Type: Read-only
    The Description property provides a textual description of the object.

datetime InstallDate
    Access Type: Read-only
    The InstallDate property is a datetime value indicating when the object was installed. A lack of a value does not indicate that the object is not installed.

[key] string Name
    Access Type: Read-only
    The Name property defines the label by which the object is known. The name of a key is unique within a database.

[key] string SQLServerName
    Access Type: Read-only
    The SQLServerName property indicates the name of the SQL Server installation that the key is a part of.
    Maximum Length: 128 string Status
    Access Type: Read-only
    The Status property is a string indicating the current status of the 8 object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
    Values are: "OK", "Error", "Degraded", "Unknown", "Pred Fail", "Starting", "Stopping", "Service"
    Maximum Length: 10

[key] string TableName
    Access Type: Read-only
    The TableName property indicates the name of the table that the key is defined in.
    Maximum Length: 128

Associations
    MSSQL_CandidateKey is associated to MSSQL_FileGroup as the Dependent property of the MSSQL_KeyFileGroup association.
    MSSQL_CandidateKey is associated to MSSQL_ForeignKey as the Antecedent property of the MSSQL_ReferencedKey association.
    MSSQL_CandidateKey is associated to MSSQL_Database as the Containee property of the MSSQL_DatabaseCandidateKey association.

MSSQL_Check: MSSQL_Constraint
    The MSSQL_Check class represents the attributes of a SQL Server™ integrity constraint.

Properties string Caption
    Access Type: Read-only
    The Caption property is a short textual description (one-line string) of the object.
    Maximum Length: 64 boolean Checked
    Access Type: Read-only
    The Checked property enables or disables integrity constraint evaluation for an existing integrity constraint. If TRUE, an attempt is made to enforce an integrity constraint when rows are added to the table on which the constraint is defined. If FALSE, no attempt is made to enforce the integrity constraint when rows are added to the table on which the constraint is defined.

[key] string DatabaseName
    Access Type: Read-only
    The DatabaseName property indicates the name of the database that the check is a part of.
    Maximum Length: 128 string Description
    Access Type: Read-only
    The Description property provides a textual description of the object.

datetime InstallDate
    Access Type: Read-only
    The InstallDate property is datetime value indicating when the object was installed. A lack of a value does not indicate that the object is not installed.

[key] string Name
    Access Type: Read-only
    The Name property defines the label by which the object is known.

[key] string SQLServerName
    Access Type: Read-only
    The SQLServerName property indicates the name of the SQL Server™ installation that the object is a part of.
    Maximum Length: 128 string Status
    Access Type: Read-only
    The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
    Values are: "OK", "Error", "Degraded", "Unknown", "Pred Fail", "Starting", "Stopping", "Service"
    Maximum Length: 10

[key] string TableName
    Access Type: Read-only
    The TableName property indicates the name of the table that the check is defined in.
    Maximum Length: 128 string Text
    Access Type: Read/Write
    The Text property indicates the Transact-SQL or other script that defines the object. Note that there is a special requirement for the name of the object is specified in the CREATE statement. The name of the object has to be in the form that includes the name of the owner. For example, in order to create an object named "Some Object", one would need to specify it as [dbo].[Some Object].

Methods
    The MSSQL_Check class supports the following methods:

| Method Name | Description |
| --- | --- |
| Rename | The Rename method is used to rename a check instance. |

Associations
    MSSQL_Check is associated to MSSQL_Table as the Antecedent property of the MSSQL_TableCheck association.

MSSQL_Column: MSSQL_DBMSObject
    The MSSQL_Column class represents columns in a SQL Server™ table.

Properties boolean AllowNulls
    Access Type: Read/Write
    The AllowNulls property indicates the ability of a column to accept NULL as a value. If TRUE, the column can accept NULL as a value. If FALSE, NULL is not allowed.

boolean AnsiPaddingStatus
    Access Type: Read-only
    The AnsiPaddingStatus property returns TRUE if the column is defined to exhibit SQL-92 character padding behavior.

string Caption
    Access Type: Read-only
    The Caption property is a short textual description (one-line string) of the object.
    Maximum Length: 64 string Collation
    Access Type: Read/Write
    The Collation property indicates the current collation of a string data type.

boolean Computed
    Access Type: Read-only
    The Computed property indicates whether the column is computed based on other values in the database.

string ComputedText
    Access Type: Read/Write
    The ComputedText property indicates Transact-SQL expression used to generate the value of a computed column.

[key] string DatabaseName
    Access Type: Read-only
    The DatabaseName property indicates the name of the database that the object is a part of.
    Maximum Length: 128 string Datatype
    Access Type: Read/Write
    The Datatype property indicates the datatype for the column. It has to be the name of a valid system datatype or user defined datatype.

string Description
Access Type: Read-only
The Description property provides a textual description of the object.

boolean FullTextIndex
Access Type: Read/Write
The FullTextIndex property indicates whether the column is participating in Microsoft Search full-text queries. If TRUE, then the column is participating in full-text queries. FullTextIndex must be TRUE in a Table object before any Column object in the Columns collection can be set to TRUE.

boolean Identity
Access Type: Read-only
The Identity property indicates whether the column is the identity column for the table. SQL Server™ allows the row identity property on a single column within a table. Identity, like a primary key, identifies a row uniquely. SQL Server™ implements row identification using a numeric value. As rows are inserted, SQL Server™ generates the row value for an identity column by adding an increment to the existing maximum value.

sint32 IdentityIncrement
Access Type: Read-only
The IdentityIncrement property indicates the value by which the row identity value is incremented when SQL Server™ generates a new identity value. Identity, like a primary key, identifies a row uniquely. SQL Server™ implements row identification using a numeric value. As rows are inserted, SQL Server™ generates the row value for an identity column by adding an increment to the existing maximum value.

sint32 IdentitySeed
Access Type: Read-only
The IdentitySeed property exposes the initial row value for an identity column. Identity, like a primary key, identifies a row uniquely. SQL Server™ implements row identification using a numeric value. As rows are inserted, SQL Server™ generates the row value for an identity column by adding an increment to the existing maximum value.

datetime InstallDate
Access Type: Read-only
The InstallDate property is datetime value indicating when the object was installed. A lack of a value does not indicate that the object is not installed.

sint32 Length
Access Type: Read/Write
The Length property indicates the maximum number of characters or bytes accepted by the column. For columns containing character data types, such as char and nchar, interpret the Length property as a number of characters. For columns containing binary datatypes, such as varbinary, interpret the Length property as a number of bytes.

[key] string Name
Access Type: Read-only
The Name property defines the label by which the object is known.

boolean NotFor Repl
Access Type: Read-only
The NotFor Repl property enables or disables an identity constraint for data inserted by a replication process. If TRUE, the identity constraint is not enforced when data is added to the table by a known replication login. The replication process provides identity values. If FALSE the identity constraint is enforced regardless of the source of the data.

sint32 NumericPrecision
Access Type: Read/Write
The NumericPrecision property specifies the maximum number of digits in a fixed-precision, numeric data type.

sint32 NumericScale
Access Type: Read/Write
The NumericScale property specifies the number of digits to the right of the decimal point in a fixed-precision, numeric data type.

boolean RowGuidCol
Access Type: Read/Write
The RowGuidCol indicates whether the column contains the globally unique identifier GUID for rows in table

[key] string SQLServerName
Access Type: Read-only
The SQLServerName property indicates the name of the SQL Server™ installation that the object is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
Values are: "OK", "Error", "Degraded", "Unknown", "Pred Fail", "Starting", "Stopping", "Service"
Maximum Length: 10

[key] string TableName
Access Type: Read-only
The TableName property indicates the name of the table that the key is defined in.
Maximum Length: 128

Methods
The MSSQL_Column class supports the following methods:

| Method Name | Description |
| --- | --- |
| Rename | The Rename method is used to rename a column instance. |
| UpdateStatisticsWith | The UpdateStatisticsWith method forces data distribution statistics update for a hypothetical index used to support data distribution statistics for the column. |

Associations
MSSQL_Column is associated to MSSQL_Table as the Part Component property of the MSSQL_TableColumn association.

MSSQL_Column is associated to MSSQL_DRIDefault as the Dependent property of the MSSQL_ColumnDRIDefault association.

MSSQL_Column is associated to MSSQL_Datatype as the Dependent property of the MSSQL_ColumnDatatype association.

MSSQL_Column is associated to MSSQL_Index as the Antecedent property of the MSSQL_IndexColumn association.

MSSQL_Column is associated to MSSQL_Key as the Part Component property of the MSSQL_KeyColumn association.

MSSQL_Column is associated to MSSQL_Default as the Dependent property of the MSSQL_ColumnDefault association.

MSSQL_Column is associated to MSSQL_Rule as the Dependent property of the MSSQL_ColumnRule association.

MSSQL_ColumnDefault: CIM_Dependency
  Association Class
  The MSSQL_ColumnDefault class associates a column to the default for the column.

References

[key] MSSQL_Default Antecedent
  Access Type: Read-only
  The Antecedent property references the default that applies to a column in the database.

[key] MSSQL_Column Dependent
  Access Type: Read-only
  The Dependent property references a column in the database.

MSSQL_ColumnDRIDefault: CIM_Dependency
  Association Class
  The MSSQL_ColumnDRIDefault class associates a column to a DRI default.

References

[key] MSSQL_DRIDefault Antecedent
  Access Type: Read-only
  The Antecedent property references a DRIDefault defined for the column.

[key] MSSQL_Column Dependent
  Access Type: Read-only
  The Dependent property references a column in the database.

MSSQL_ColumnRule: CIM_Dependency
  Association Class
  The MSSQL_ColumnRule class represents an association between a column and a rule bound to the column.

References

[key] MSSQL_Rule Antecedent
  Access Type: Read-only
  The Antecedent property references a rule constraint defined in the database.

[key] MSSQL_Column Dependent
  Access Type: Read-only
  The Dependent property references a column in the database.

MSSQL_ColumnDatatype: CIM_Dependency
  Association Class
  The MSSQL_ColumnDatatype class associates a column its data type.

References

[key] MSSQL_Datatype Antecedent
  Access Type: Read-only
  The Antecedent property references the data type of the column.

[key] MSSQL_Column Dependent
  Access Type: Read-only
  The Dependent property references a column in the database.

MSSQL_ConfigValue: MSSQL_Setting
  The MSSQL_ConfigValue class represents the SQL Server™ configuration values. Some SQL Server™ configuration options do not take effect until the SQL Server™ service has been stopped and restarted. You can force the server to immediately accept changes in some options by using the ReconfigureWithOverride method. The DynamicReconfigure property indicates whether the ConfigValue object requires a restart.

Properties string Caption
  Access Type: Read-only
  A short textual description (one-line string) of the object.
  Maximum Length: 64 sint32 CurrentValue
  Access Type: Read/Write
  The CurrentValue property specifies the current configuration parameter value. The MinimumValue and MaximumValue properties provide the range of values acceptable for the CurrentValue property.

string Description
  Access Type: Read-only
  The Description property returns a text description of the configuration value.

boolean DynamicReconfigure
  Access Type: Read-only
  The DynamicReconfigure property indicates modifiability of the configuration value. If TRUE, a modification to the value is effective immediately. If FALSE, modifications are visible only after the SQL Server™ service has been stopped and restarted.

uint32 ID
  Access Type: Read-only
  The Id property returns a unique identifier for the configuration value. The ID is assigned by SQL Server™.

| Value | Description |
| --- | --- |
| 101 | Recovery Interval |
| 102 | Allow Updates |
| 103 | User Connections |
| 106 | Locks |
| 107 | Open Objects |
| 109 | Fill Factor |
| 115 | Nested Triggers |
| 117 | Remote Access |
| 124 | Default Language |
| 125 | Language In Cache |
| 502 | Max Async I/O |
| 503 | Max Worker Threads |
| 505 | Network Packet Size |

-continued

| Value | Description |
|---|---|
| 518 | Show Advanced Option |
| 542 | Remote Proc Trans |
| 543 | Remote Conn Timeout |
| 1110 | Time Slice |
| 1123 | Default Sort order Id |
| 1124 | Unicode Local ID |
| 1125 | Unicode Comparison Style |
| 1126 | Language Neutral |
| 1127 | Two Digit Year Cutoff |
| 1505 | Index Create Mem |
| 1514 | Spin Counter |
| 1517 | Priority Boost |
| 1519 | Remote Login Timeout |
| 1520 | Remote Query Timeout |
| 1531 | Cursor Threshold |
| 1532 | Set Working Set Size |
| 1533 | Resource Timeout |
| 1534 | User Options |
| 1535 | Processor Affinity Mask |
| 1536 | Max Text Repl Size |
| 1537 | Media Retention |
| 1538 | Cost Threshold For Parallelism |
| 1539 | Max Degree Of Parallelism |
| 1540 | Min Memory Per Query |
| 1541 | Query Wait |
| 1542 | VLM Size |
| 1543 | Min Memory |
| 1544 | Max Memory |
| 1545 | Query Max Time |
| 1546 | Lightweight Pooling | sint32 MaximumValue
  Access Type: Read-only
  The MaximumValue property specifies an upper bound for a configuration value.

sint32 MinimumValue
  Access Type: Read-only
  The MinimumValue property specifies a lower bound for a configuration value.

sint32 RunningValue
  Access Type: Read-only
  The RunningValue property returns the setting used by SQL Server™ for the configuration option. Prior to changing a configurable SQL Server™ operating setting, the RunningValue and CurrentValue properties are identical for the ConfigValue object referencing that setting. A change is made to the setting by using the CurrentValue property, and the values will vary as changes are applied.

[key] string SettingID
  Access Type: Read-only
  The identifier by which the setting object is known.
  Maximum Length: 256

[key] string SQLServerName
  Access Type: Read-only
  The SQLServerName property indicates the name of the SQL Server™ installation that the object is a part of.
  Maximum Length: 128

Associations
  MSSQL_ConfigValue is associated to MSSQL_SQLServer as the Setting property of the MSSQL_SQLServerConfigValue association.

MSSQL_Constraint: MSSQL_DBMSObject
  Abstract Class
  The MSSQL_Constraint class represents constraints defined in the Microsoft SQL Server database. There are three types of constraints that can be defined—checks, keys and rules.

Properties string Caption
  Access Type: Read-only
  The Caption property is a short textual description (one-line string) of the object.
  Maximum Length: 64 string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

string Name
  Access Type: Read-only
  The Name property defines the label by which the object is known. When subclassed, the Name property can be overridden to be a Key property.

string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
  Values are: "OK", "Error", "Degraded", "Unknown", "Pred Fail", "Starting", "Stopping", "Service"
  Maximum Length: 10

MSSQL_Containment
  Abstract Class
  Association Class
  The MSSQL_Containment class represents an association between a container and the contained object.

References
  CIM_ManagedSystemElement Containee
  Access Type: Read-only
  The Containee property references a managed system element that is contained within another managed system element.
  CIM_ManagedSystemElement Container
  Access Type: Read-only
  The Container property references a managed system element that contains one or more other managed system elements.

MSSQL_Database: MSSQL_DBMSObject
  The MSSQL_Database class represents instances of SQL Server™ databases.

Properties string Caption
 Access Type: Read-only
 The Caption property is a short textual description (one-line string) of the object.
 Maximum Length: 64 string Collation
 Access Type: Read/Write
 The Collation property specifies the column-level collation of a string datatype in the database. A Collation setting for a Database object overrides the default collation specified in the model database. All tables in the database then inherit the Collation setting.

uint32 CompatibilltyLevel
 Access Type: Read/Write
 The CompatibilityLevel property controls Microsoft® SQL Server™ behavior, setting behavior to match either the current or earlier version (default is 70).

| Value | Description |
|---|---|
| 0 | Unknown |
| 60 | SQL Server 6.0 |
| 65 | SQL Server 6.5 |
| 70 | SQL Server 7.0 |
| 80 | SQL Server 2000 | datetime CreateDate
 Access Type: Read-only
 The CreateDate property indicates the time and date on which the database was created. Note that creation date may be different from the install date in cases where the object is created in one place and then installed elsewhere.

boolean CreateForAttach
 Access Type: Read-only
 The CreateForAttach property controls database file creation and specifies whether a database is attached from an existing set of operating system files.

uint32 DatabaseStatus
 Access Type: Read-only
 The DatabaseStatus property reflects the current operational status on the database. The database is inaccessible when the status is Loading, Offline, Recovering or Suspect.

| Value | Description |
|---|---|
| 0 | Normal |
| 32 | Loading |
| 192 | Recovering |
| 256 | Suspect |
| 512 | Offline |
| 1024 | Standby |
| 32768 | Emergency Mode | string Description
 Access Type: Read-only
 The Description property provides a textual description of the object.

boolean FuHlTextEnabled
 Access Type: Read-only
 The FullTextEnabled property is TRUE when the referenced database has been selected for participation in Microsoft® Search full-text queries.

datetime InstallDate
 Access Type: Read-only
 The InstallDate property is datetime value indicating when the object was installed. A lack of a value does not indicate that tie object is not installed.

[key] string Name
 Access Type: Read-only
 The Name property defines the label by which the object is known.

string PrimaryFilePath
 Access Type: Read-only
 The PrimaryFilePath property returns the path and name of the operating system directory containing the primary file for the database.

sint32 Size
 Access Type: Read-only
 The Size property exposes the total size, in megabytes, of the database.
 Units: MegaBytes sint32 SpaceAvailable
 Access Type: Read-only
 The SpaceAvailable property returns the amount of disk resource allocated in kilobytes and unused in operating system files implementing Microsoft® SQL Server™ database storage.

[key] string SQLServerName
 Access Type: Read-only
 The SQLServerName property indicates the name of the SQL Server™ installation that the database is a part of.
 Maximum Length: 128 string Status
 Access Type: Read-only
 The Status property is a string indicating the current status of the object. Various operational and non-operational statuses can be defined. Operational statuses are "OK", "Degaded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
 Values are: "OK", "Error", "Degraded", "Unknown", "Pred Fail", "Starting", "Stopping", "Service"
 Maximum Length: 10 boolean SystemObject
 Access Type: Read-only
 The SystemObject property indicates whether the object is owned by Microsoft®. A value of TRUE indicates that the object implementation is owned by Microsoft®.

sint32 Version
 Access Type: Read-only
 The Version property returns a system-specified integer identifying the version of Microsoft® SQL Server™ used to create the referenced database.

Methods
 The MSSQL_Database class supports the following methods:

| Method Name | Description |
| --- | --- |
| CheckAllocations | The CheckAllocations method scans all pages of the referenced Microsoft ® SQL Server ™ database, testing pages to ensure integrity. |
| CheckCatalog | The CheckCatalog method tests the integrity of the catalog of the referenced database. |
| CheckIdentityValues | The CheckIdentityValues method verifies the integrity of all identity columns in tables of the referenced database. |
| Checkpoint | The Checkpoint method forces a write of dirty database pages. |
| CheckTables | The CheckTables method tests the integrity of database pages implementing storage for all tables and indexes defined on the tables of the database. |
| CheckTablesDataOnly | The CheckTablesDataOnly method tests the integrity of database pages implementing storage for all tables in the referenced database. |
| Create | The Create method is used to create a new database. |
| DisableFullTextCatalogs | The DisableFullTextCatalogs method suspends Microsoft ® Search full-text catalog maintenance on the database. |
| EnableFullTextCatalogs | The EnableFullTextCatalogs method enables Microsoft ® Search full-text indexing on the referenced Microsoft ® SQL Server ™ database. |
| EnumerateStoredProcedures | The EnumerateStoredProcedures method searches stored procedures and returns those that contain a specified string. |
| ExecuteImmediate | The ExecuteImmediate method allows any SQL Server ™ command to be executed, as long as the command doesn't return result sets. |
| FullTextIndexScript | The FullTextIndexScript method returns a Transact-SQL command batch enabling Microsoft ® Search full-text indexing on a database or table. |
| IsValidKeyDatatype | The IsValidKeyDatatype method returns TRUE when the data type specified can participate in a PRIMARY KEY or FOREIGN KEY constraint. |
| RecalcSpaceUsage | The RecalcSpaceUsage method forces the update of data reporting the disk resource usage of the referenced Microsoft ® SQL Server ™ database. |
| RemoveFullTextCatalogs | The RemoveFullTextCatalogs method drops all Microsoft ® Search full-text catalogs supporting full-text query on a Microsoft ® SQL Server ™ database. |
| Rename | The Rename method is used to rename the database instance. |
| Shrink | The Shrink method attempts to reduce the size of all operating system files maintaining the database. |
| Transfer | The Transfer method copies database schema and/or data from one Microsoft ® SQL Server ™ database to another. |
| UpdateIndexStatistics | The UpdateIndexStatistics method forces data distribution statistics update for all indexes on user-defined tables in the referenced Microsoft ® SQL Server ™ database. |

Associations

MSSQL_Database is associated to MSSQL_SQLServer as the Part Component property of the MSSQL_SQLServerDatabase association.

MSSQL_Database is associated to MSSQL_DatabaseSetting as the Element property of the MSSQL_DatabaseDatabaseSetting association.

MSSQL_Database is associated to MSSQL_FileGroup as the Dependent property of the MSSQL_DatabaseFileGroup association.

MSSQL_Database is associated to MSSQL_DatabaseRole as the ScopingElement property of the MSSQL_DatabaseDatabaseRole association.

MSSQL_Database is associated to MSSQL_Table as the GroupComponent property of the MSSQL_DatabaseTable association.

MSSQL_Database is associated to MSSQL_StoredProcedure as the ScopingElement property of the MSSQL_DatabaseStoredProcedure association.

MSSQL_Database is associated to MSSQL_User as the ScopingElement property of the MSSQL_DatabaseUser association.

MSSQL_Database is associated to MSSQL_View as the GroupComponent property of the MSSQL_DatabaseView association.

MSSQL_Database is associated to MSSQL_Datatype as the ScopingElement property of the MSSQL_DatabaseDatatype association.

MSSQL_Database is associated to MSSQL_Login as the Dependent property of the MSSQL_LoginDefaultDatabase association.

MSSQL_Database is associated to MSSQL_Login as the Dependent property of the MSSQL_DatabaseOwnerLogin association.

MSSQL_Database is associated to MSSQL_User as the Element property of the MSSQL_UserDatabasePermission association.

MSSQL_Database is associated to MSSQL_DatabaseRole as the Element property of the MSSQL_DatabaseRoleDatabasePermission association.

MSSQL_Database is associated to MSSQL_UserDefinedFunction as the ScopingElement property of the MSSQL_DatabaseUserDefinedFunction association.

MSSQL_Database is associated to MSSQL_Rule as the ScopingElement property of the MSSQL_DatabaseRule association.

MSSQL_Database is associated to MSSQL_Default as the ScopingElement property of the MSSQL_DatabaseDefault association.

MSSQL_Database is associated to MSSQL_CandidateKey as the Container property of the MSSQL_DatabaseCandidateKey association.

MSSQL_Database is associated to MSSQL_Login as the Container property of the MSSQL_DatabaseLogin association.

MSSQL_Database is associated to MSSQL_TransactionLog as the Dependent property of the MSSQL_DatabaseTransactionLog association.

MSSQL_DatabaseCandidateKey: MSSQL_Containment Association Class

The MSSQL_DatabaseCandidateKey class represents an association between a database and a candidate key that is present in one of the tables in the database. This association allows an application to perform a single traversal to find the candidate keys in a database.

References

[key] MSSQL_CandidateKey Containee
  Access Type: Read-only
  The Containee property references a candidate key that is contained within the database.

[key] MSSQL_Database Container
  Access Type: Read-only
  The Container property references a database that contains the candidate key referenced by the Containee property.

MSSQL_DatabaseDatabaseRole: MSSQL_Scope
  Association Class
  The MSSQL_DatabaseDatabaseRole class associates database role to the database within which the role is defined.

References

[key] MSSQL_DatabaseRole ScopedElement
  Access Type: Read-only
  The ScopedElement property references a database role that is defined within the scope of the database referenced by the ScopingElement property.

[key] MSSQL_Database ScopingElement
  Access Type: Read-only
  The ScopingElement property references a database in SQL.

MSSQL_DatabaseDatabaseSetting: CIM_ElementSetting
  Association Class
  The MSSQL_DatabaseDatabaseSetting class associates a SQLServer database to an instance of the MSSQL_DatabaseSetting class that contains the settings for the database.

References

[key] MSSQL_Database Element
  Access Type: Read-only
  The Element property references a SQL Server database.

[key] MSSQL_DatabaseSetting Setting
  Access Type: Read-only
  The Setting property references a class that represents the settings for a database.

MSSQL_DatabaseDatatype: MSSQL_Scope
  Association Class
  The MSSQL_DatabaseDatatype class associates a database to the datatypes defined within the database.

References

[key] MSSQL_Datatype ScopedElement
  Access Type: Read-only
  The ScopedElement property references the data type that has been defined within the database.

[key] MSSQL_Database ScopingElement
  Access Type: Read-only
  The ScopingElement property references the database within which the data type has been defined.

MSSQL_DatabaseDefault: MSSQL_Scope
  Association Class
  The MSSQL_DatabaseDefault association associates a database to the defaults defined within the database.

References

[key] MSSQL_Default ScopedElement
  Access Type: Read-only
  The ScopedElement property references a default constraint defined within the database.

[key] MSSQL_Database ScopingElement
  Access Type: Read-only
  The ScopingElement property references a SQL Server™ database.

MSSQL_DatabaseFile: MSSQL_Extension
  The MSSQL_DatabaseFile class is an extension to the CIM_DataFile class. It contains properties that are relevant to an operating system file that is also a file storing SQL Server™ database data.

Properties

[key] string DatabaseName
  Access Type: Read-only
  The DatabaseName property indicates the name of the database that the object is a part of.
  Maximum Length: 128

[key] string FileGroupName
  Access Type: Read-only
  The FileGroupName property indicates the name of the database file group that the database file is a part of.
  Maximum Length: 128 sint32 FileGrowth
  Access Type: Read/Write
  The FileGrowth property indicates the growth increment of the operating system file used to store table, index, or log data. When FileGrowthType is Megabytes, the FileGrowth value represents the number of megabytes of disk space to allocate for incremental file growth. When FileGrowthType is Percent, the value represents a percentage and must be in the range from 1 through 100.

real32 FileGrowthInKB
  Access Type: Read-only
  The FileGrowthInKB property reports the number of kilobytes of disk space allocated when an incremental increase occurs on an operating system file.

uint32 FileGrowthType
  Access Type: Read/Write
  The FileGrowthType property indicates the method of incremental allocation applied when an operating system file is extended.

| Value | Description |
| --- | --- |
| 0 | Megabyte |
| 1 | Percent |
| 99 | Invalid | sint32 MaximumSize
  Access Type: Read/Write
  The MaximumSize property indicates an upper limit for the size of an operating system file containing table and index data, or maintaining a database transaction log.

[key] string Name
  Access Type: Read-only
  The Name property defines the label by which the object is known.
  Maximum Length: 128 string PhysicalName
  Access Type: Read-only

The PhysicalName property specifies the path and file name of the operating system file storing Microsoft® SQL Server™ database or transaction log data.

boolean PrimaryFile
  Access Type: Read-only
  The PrimaryFile property indicates whether the database file is the one that maintains the database specific system tables. A SQL Server™ database can have at most one primary file.

sint32 SpaceAvailableInMB
  Access Type: Read-only
  The SpaceAvailableInMB property returns the amount of disk resource, in megabytes, allocated and unused in operating system files implementing Microsoft® SQL Server™ database and database transaction log storage.
  Units: Megabytes

[key] string SQLServerName
  Access Type: Read-only
  The SQLServerName property indicates the name of the SQL Server™ installation that the object is a part of.
  Maximum Length: 128

Methods
The MSSQL_DatabaseFile class supports the following methods:

| Method Name | Description |
| --- | --- |
| Shrink | The Shrink method attempts to reduce the size of the database file. |

MSSQL_DatabaseFileDataFile: MSSQL_Extends
  Association Class
  The MSSQL_DatabaseFileDataFile class associates a CIM_DataFile class to the MSSQL_DatabaseFile class that contains database file specific properties of an operating system file.

References

[key] CIM_DataFile ExtendedElement
  Access Type: Read-only
  The ExtendedElement property references an operating system file.

[key] MSSQL_DatabaseFile Extension
  Access Type: Read-only
  The Extension property references an instance that contains database file specific extensions to an operating system file.

MSSQL_DatabaseFileGroup: CIM_Dependency
  Association Class
  The MSSQL_DatabaseFileGroup class represents an association between a database and the file group that contains the operating system files that store the data for the database.

References

[key] MSSQL_FileGroup Antecedent
  Access Type: Read-only
  The Antecedent property references the file group that contains the operating system files of the database.

[key] MSSQL_Database Dependent
  Access Type: Read-only
  The Dependent property references a SQL Server™ database.

MSSQL_DatabaseFullTextCatalog: CIM_Dependency
  Association Class
  The MSSQL_DatabaseFullTextCatalog class represents an association between a database and a full-text catalog that stores index data used for full text queries against the database.

References

[key] MSSQL_FullTextCatalog Antecedent
  Access Type: Read-only
  The Antecedent property references a full-text catalog that stores index data used for full-text queries against the database referenced by the Dependent property.

[key] MSSQL_Database Dependent
  Access Type: Read-only
  The Dependent property references a Microsoft® SQL Server™ database.

MSSQL_DatabaseLogin: MSSQL_Containment
  Association Class
  The MSSQL_Containment class represents an association between a database and a login that is mapped to a user-defined in the database. This association allows an application to perform a single traversal to find the logins used by a database.

Properties

[key] string UserName
  Access Type: Read-only
  This property indicates the database user that is mapped to the login.
  Maximum Length: 128

References

[key] MSSQL_Login Containee
  Access Type: Read-only
  The Containee property references a managed system element that is contained within another managed system element.

[key] MSSQL_Database Container
  Access Type: Read-only
  The Container property references a managed system element that contains one or more other managed system elements.

MSSQL_DatabaseOwnerLogin: CIM-Dependency
  Association Class
  The MSSQL_DatabaseOwnerLogin class represents an association between a database and the login mapped to the user that owns the database.

References

[key] MSSQL_Login Antecedent
  Access Type: Read-only
  The Antecedent property references the login mapped to the user that owns the database referenced by the Dependent property.

[key] MSSQL_Database Dependent
  Access Type: Read-only
  The Dependent property references a SQL Server database.

MSSQL_DatabaseRole: MSSQL_Role

The DatabaseRole object represents the properties of a SQL Server™ database role. SQL Server™ database roles establish groups of users with similar security attributes. Database permissions can be granted by role, simplifying database security planning and administration.

Properties boolean AppRole
Access Type: Read-only
The AppRole property indicates the whether the database role has been defined specifically for use by client applications.

string Caption
Access Type: Read-only
The Caption property is a short textual description (one-line string) of the object.
Maximum Length: 64

[key] string DatabaseName
Access Type: Read-only
The DatabaseName property indicates the name of the database that the object is a part of.
Maximum Length: 128 string Description
Access Type: Read-only
The Description property provides a textual description of the object.

boolean FixedRole
Access Type: Read-only
The FixedRole property returns True when the database role referenced is system-defined.

datetime InstallDate
Access Type: Read-only
The InstallDate property is datetime value indicating when the object was installed. A lack of a value does not indicate that the object is not installed.

[key] string Name
Access Type: Read-only
The Name property indicates a label by which the role can be identified.

string Password
Access Type: Write-only
The Password property is used to set the password for an application role. The property cannot be read. It can be written at the time the database role object is created.

[key] string SQLServerName
Access Type: Read-only
The SQLServerName property indicates the name of the SQL Server™ installation that the object is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.
Values are: "OK", "Error", "Degraded", "Unknown", "Pred Fail", "Starting", "Stopping", "Service"
Maximum Length: 10

Associations
MSSQL_DatabaseRole is associated to MSSQL_Database as the ScopedElement property of the MSSQL_DatabaseDatabaseRole association.
MSSQL_DatabaseRole is associated to MSSQL_User as the Antecedent property of the MSSQL_MemberUser association.
MSSQL_DatabaseRole is associated to MSSQL_UserDefinedFunction as the Grantee property of the MSSQL_DatabaseRoleUserDefinedFunctionPermissionassociation.
MSSQL_DatabaseRole is associated to MSSQL_Database as the Grantee property of the MSSQL_DatabaseRoleDatabasePermission association.
MSSQL_DatabaseRole is associated to MSSQL_StoredProcedure as the Grantee property of the MSSQL_DatabaseRoleStoredProcedurePermission association.
MSSQL_DatabaseRole is associated to MSSQL_View as the Grantee property of the MSSQL_DatabaseRoleViewPermission association.
MSSQL_DatabaseRole is associated to MSSQL_Table as the Grantee property of the MSSQL_DatabaseRoleTablePermission association.
MSSQL_DatabaseRole is associated to MSSQL_DatabaseRole as the Antecedent property of the MSSQL_MemberDatabaseRole association.
MSSQL_DatabaseRole is associated to MSSQL_DatabaseRole as the Dependent property of the MSSQL_MemberDatabaseRole association.

MSSQL_DatabaseRoleDatabasePermission: MSSQL_Permission
Association Class
The MSSQL_DatabaseRoleDatabasePermission class represents the permissions that a database role has for the database in which it is defined. The instances of this class represent only the permission that has been explicitly granted or denied to the user object. For example, if a database role has permissions to access a database by virtue of being a member of another database role, then there will not be a permission association instance between the role and the database.

Properties boolean Granted
Access Type: Read/Write
The Granted property indicates whether the permission has been granted or denied. A value of True indicates that the permission has been granted. A value of False indicates that permission has been denied.

[key] uint32 PrivilegeType
Access Type: Read/Write
The PrivilegeType property indicates the type of privilege that has been granted or denied.

| Value | Description |
| --- | --- |
| 0 | Unknown |
| 1 | Permission to query a table |
| 2 | Permission to add rows to a table |

-continued

| Value | Description |
|---|---|
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_Database Element
  Access Type: Read/Write
  The element property references a SQL Server™ database.

[key] MSSQL_DatabaseRole Grantee
  Access Type: Read/Write
  The Grantee property references a database role that has been granted or denied permission to access the database.

MSSQL_DatabaseRoleStoredProcedurePermission: MSSQL_Permission
  Association Class
  The MSSQL_DatabaseRoleStoredProcedurePermission class represents the permissions that a database role has for a stored procedure. The instances of this class represent only the permission that has been explicitly granted or denied to the user object. For example, if a database role has permissions to access the stored procedure by virtue of being a member of another database role, then there will not be a permission association instance between the role and the stored procedure.

Properties boolean Granted
  Access Type: Read/Write
  The Granted property indicates whether the permission has been granted or denied. A value of True indicates that the permission has been granted. A value of False indicates that permission has been denied.

[key] uint32 PrivilegeType
  Access Type: Read/Write
  The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |

-continued

| Value | Description |
|---|---|
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_StoredProcedure Element
  Access Type: Read/Write
  The Element property references a stored procedure in the database.

[key] MSSQL_DatabaseRole Grantee
  Access Type: Read/Write
  The Grantee property references a database role for which the permissions have been defined.

MSSQL_DatabaseRoleTablePermission: MSSQL_Permission
  Association Class
  The MSSQL_DatabaseRoleTablePermission class represents the permissions that a database role has for a table. The instances of this class represent only the permissions that have been explicitly granted or denied to the user object. For example, if a database role has permissions to access the table by virtue of being a member of another database role, then there will not be a permission association instance between the role and the table.

Properties string ColumnName [ ]
  Access Type: Read/Write
  The ColumnName property specifies the columns within the table for which the permission is specified. If this property is null, then the permission applies to all columns in the table, otherwise it applies only to the columns indicated in this property.

boolean Granted
  Access Type: Read/Write
  The Granted property indicates whether the permission has been granted or denied. A value of True indicates that the permission has been granted. A value of False indicates that permission has been denied.

[key] uint32 PrivilegeType
  Access Type: Read/Write
  The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |

-continued

| Value | Description |
|---|---|
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_Table Element
 Access Type: Read-only
 The Element property references a SQL Server™ table.

[key] MSSQL_DatabaseRole Grantee
 Access Type: Read-only
 The Grantee property references a database role for which the permissions have been defined.

MSSQL_DatabaseRoleUserDefinedFunctionPermission: MSSQL_Permission
 Association Class
 The MSSQL_DatabaseRoleUserDefinedFunctionPermission class represents the permissions that a database role has for a table. The instances of this class represent only the permissions that have been explicitly granted or denied to the user object. For example, if a database role has permissions to access the user defined function by virtue of being a member of another database role, then there will not be a permission association instance between the role and the user defined function.

Properties boolean Granted
 Access Type: Read/Write
 The Granted property indicates whether the permission has been granted or denied. A value of True indicates that the permission has been granted. A value of False indicates that permission has been denied.

[key] uint32 PrivilegeType
 Access Type: Read/Write
 The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |

-continued

| Value | Description |
|---|---|
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_UserDefinedFunction Element
 Access Type: Read/Write
 The Element property references a user-defined function.

[key] MSSQL_DatabaseRole Grantee
 Access Type: Read/Write
 The Grantee property references a database role for which the permissions have been defined.

MSSQL_DatabaseRoleViewPermission: MSSQL_Permission
 Association Class
 The MSSQL_DatabaseRoleViewPermission class represents the permissions that a database role has for a view. The instances of this class represent only the permissions that have been explicitly granted or denied to the user object. For example, if a database role has permissions to access the view by virtue of being a member of another database role, then there will not be a permission association instance between the role and the view.

Properties string ColumnName [ ]
 Access Type: Read/Write
 The ColumnName property specifies the columns within the view for which the permission is specified. If this property is null, then the permission applies to all columns in the view, otherwise it applies only to the columns indicated in this property.

boolean Granted
 Access Type: Read/Write
 The Granted property indicates whether the permission has been granted or denied. A value of True indicates that the permission has been granted. A value of False indicates that permission has been denied.

[key] uint32 PrivilegeType
 Access Type: Read/Write
 The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |

-continued

| Value | Description |
|---|---|
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_View Element
  Access Type: Read-only
  The Element property references a SQL Server™ view.

[key] MSSQL_DatabaseRole Grantee
  Access Type: Read-only
  The Grantee property references a database role for which the permissions have been defined.

MSSQL_DatabaseRule: MSSQL_Scope
  Association Class
  The MSSQL_DatabaseRule class represents an association between a database and the rules defined within the database.

References

[key] MSSQL_Rule ScopedElement
  Access Type: Read-only
  The ScopedElement property references a rule defined in the database referenced by the ScopingElement property.

[key] MSSQL_Database ScopingElement
  Access Type: Read-only
  The ScopingElement property references a SQL Server™ database.

MSSQL_DatabaseSetting: MSSQL_Setting
  The MSSQL_DatabaseSetting class represents operational settings for a database.

Properties boolean AssignmentDiag
  Access Type: Read/Write
  The AssignmentDiag property enables SQL-92 standard behavior for NULL in aggregate, data truncation, divide-by-zero, and arithmetic overflow errors.

boolean AutoClose
  Access Type: Read/Write
  The AutoClose property exposes server behavior for databases not accessed by a user. If TRUE, the database is closed and its resources are freed when no user connection accesses the database. If FALSE, the server maintains the database in an open and ready state regardless of user activity.

boolean AutoCreateStat
  Access Type: Read/Write
  The AutoCreateStat property exposes Microsoft® SQL Server™ data distribution statistics creation behavior. If TRUE, the optimizer directs automatic creation of supporting data distribution statistics as required. If FALSE, the optimizer does not direct statistics creation.

boolean AutoShrink
  Access Type: Read/Write
  The AutoShrink property exposes Microsoft® SQL Server™ sizing behavior for operating system files maintaining table and index data If TRUE, operating system files maintaining table and index data are evaluated for downward resizing when the server periodically checks for unused space. If FALSE, the operating system files storing the database are not evaluated during periodic checks for unused space.

boolean AutoUpdateStat
  Access Type: Read/Write
  The AutoUpdateStat property exposes Microsoft® SQL Server™ data distribution statistics creation behavior. If TRUE, the optimizer directs automatic rebuild of supporting data distribution statistics as required. If FALSE, the optimizer does not direct statistics rebuild.

string Caption
  Access Type: Read-only
  A short textual description (one-line string) of the MSSQL_DatabaseSetting object.
  Maximum Length: 64 boolean ColumnsNullByDefault
  Access Type: Read/Write
  The ColumnsNullByDefault property controls column default value behavior when a table is created in the Microsoft® SQL Server™ database. If TRUE, columns in new tables allow NULL. If FALSE, columns in new tables do not allow NULL.

boolean CompareNull
  Access Type: Read/Write
  The CompareNull property controls evaluation of NULL for equality. If TRUE, the expression NULL=NULL evaluates as NULL. If FALSE, the expression NULL=NULL evaluates as TRUE.

boolean ContactNull
  Access Type: Read/Write
  The ContactNull property specifies NULL value handling br catenation. If TRUE, A+NULL, where A is a string, yields NULL. If FALSE, A+NULL, where A is a string, yields A.

boolean Cursor CloseOnCommit
  Access Type: Read/Write
  The Cursor CloseOnCommit property specifies cursor behavior when modifications made within a transaction are committed or rolled back. If TRUE (the default) Microsoft® SQL Server™ cursors are closed when an action ends a transaction. If FALSE, cursors remain open after a transaction-ending action.

real32 DataSpaceUsage
  Access Type: Read-only
  The DataSpaceUsage property indicates the physical disk resource used to maintain the data of a database. The value reflects the amount of space in use and reserved for use. The actual data space used by any given table is reported by the DataSpaceUsed property of the Table object. The value represents an amount in megabytes and is accurate to two decimal places.
  Units: Megabytes boolean DBOUseOnly
  Access Type: Read/Write
  The DBOUseOnly property toggles access rights to a Microsoft® SQL Server™ database. If TRUE, only users with database ownership privilege can access the database. If FALSE, any authorized user can access the database.

boolean DefaultCursor
   Access Type: Read/Write
   The DefaultCursor property controls the visibility of cursors created in Transact-SQL batches. If TRUE, cursors declared in a batch are created with local scope. If FALSE, cursors declared in a batch are created with global scope.

string Description
   Access Type: Read-only
   A textual description of the MSSQL_DatabaseSetting object.

real32 IndexSpaceUsage
   Access Type: Read-only
   The IndexSpaceUsage returns the number of kilobytes assigned to index storage within all operating system files maintaining indexes for the referenced database.
   Units: Kilobytes boolean Offline
   Access Type: Read/Write
   The Offline property controls Microsoft® SQL Server™ database availability. When TRUE, the database is unavailable, or is being made unavailable, for use by authorized users. When FALSE, the database is online, or is being brought online, for use by authorized users.

boolean QuoteDelimiter
   Access Type: Read/Write
   The QuoteDelimiter property controls Microsoft® SQL Server™ interpretation of identifier strings in statements submitted for execution. When TRUE, identifiers can be delimited by double quotation marks and character literal values must be delimited by single quotation marks. When FALSE, identifiers cannot be quoted and must follow all Transact-SQL rules for identifiers. For example, character literal values can be delimited by either single or double quotation marks.

boolean ReadOnly
   Access Type: Read/Write
   The ReadOnly property controls the ability to update a Microsoft® SQL Server™ database. If TRUE, data in the database cannot be changed. If FALSE, updates are allowed to data in the database.

uint32 RecoveryType
   Access Type: Read/Write
   The RecoveryType property specifies the type of recovery model that a database will use. Simple is the default setting for SQL Server Desktop Edition and the data engine, and 'Full' is the default for all other editions.

| Value | Description | Explanation |
| --- | --- | --- |
| 0 | Simple | The database can be recovered only to the last full database backup or last differential backup. |
| 1 | Bulk Logged | Logging for all SELECT INTO, CREATE INDEX, and bulk loading data operations is minimal and therefore requires less log space. In exchange for better performance and less log space usage, the risk of exposure to loss is greater than with full recovery. |
| 2 | Full | Database backups and transaction log backups are used to provide full recoverability from media failure. All operations, including bulk operations such as SELECT INTO, CREATE INDEX, and bulk loading data, are fully logged. |
| 3 | Unknown | The recovery type is not known. | boolean RecursiveTriggers
   Access Type: Read/Write
   The RecursiveTriggers property controls nested call behavior for Microsoft® SQL Server™ triggers. When TRUE, a trigger may fire more than once when statement execution directs more than a single trigger execution. When FALSE, a trigger will execute only once regardless of the actions of itself or other triggers enabled on other tables.

boolean SelectIntoBulkCopy
   Access Type: Read/Write
   The SelectIntoBulkCopy property enables non-logged operation on a Microsoft® SQL Server™ database. If TRUE, non-logged operations are allowed. If FALSE, non-logged operations are not allowed.

[key] string SettingID
   Access Type: Read-only
   The identifier by which the MSSQL_DatabaseSetting object is known.
   Maximum Length: 256 boolean SingleUser
   Access Type: Read/Write
   The SingleUser property exposes one method of constraining user access to a Microsoft® SQL Server™ database. If TRUE, only one user can access the database at any one time. If FALSE, multiple users can access the database at one time.

[key] string SQLServerName
   Access Type: Read-only
   The SQLServerName property indicates the name of the SQL Server™ installation that the object is a part of.
   Maximum Length: 128 boolean TornPageDetection
   Access Type: Read/Write
   The TornPageDetection property enables Microsoft® SQL Server™ logic-enhancing data security in the event of certain types of system failure. If TRUE, SQL Server marks units of a database page prior to attempting a write and checks page marking on every read. If FALSE, database pages are not marked or evaluated.

boolean TruncateLogOnCheckpoint
   Access Type: Read/Write
   The TruncateLogOnCheckpoint property configures automatic transaction log maintenance activity. If TRUE, SQL Server removes log entries referencing committed transactions when activity on the database forces a dirty page write. If FALSE, the forced dirty page writes have no effect on the database transaction log.

Associations
   MSSQL_DatabaseSetting is associated to MSSQL_Database as the Setting property of the MSSQL_DatabaseDatabaseSetting association.

MSSQL_DatabaseStoredProcedure: MSSQL_Scope
   Association Class
   The MSSQL_DatabaseStoredProcedure class represents an association between the database and a stored procedure defined within the database.

References

[key] MSSQL_StoredProcedure ScopedElement
   Access Type: Read-only
   The ScopedElement property references a stored procedure defined within the database referenced by the ScopingElement property.

[key] MSSQL_Database ScopingElement
　Access Type: Read-only
　The ScopingElement property references a SQL Server™ database.

MSSQL_DatabaseTable: CIM_Component
　Association Class
　The MSSQL_DatabaseTable class associates a database to all the tables contained in the database.

References

[key] MSSQL_Database GroupComponent
　Access Type: Read-only
　The parent element in the association

[key] MSSQL_Table Part Component
　Access Type: Read-only
　The child element in the association MSSQL_DatabaseTransactionLog: CIM_Dependency
　Association Class
　The MSSQL_DatabaseTransactionLog class represents an association between the database and the transaction log br the database.

References

[key] MSSQL_TransactionLog Antecedent
　Access Type: Read-only
　Antecedent represents the independent object in this association.

[key] MSSQL_Database Dependent
　Access Type: Read-only
　Dependent represents the object dependent on the Antecedent.

MSSQL_DatabaseUser: MSSQL_Scope
　Association Class
　The MSSQL_DatabaseUser class represents an association between a database and a user defined for the database.

References

[key] MSSQL_User ScopedElement
　Access Type: Read-only
　The ScopedElement property references a user defined within the database referenced by the ScopingElement property.

[key] MSSQL_Database ScopingElement
　Access Type: Read-only
　The ScopingElement property references a database in SQL Server™.

MSSQL_DatabaseUserDefinedFunction: MSSQL_Scope
　Association Class
　The MSSQL_DatabaseUserDefinedFunction class represents an association between a database and a user-defined function defined within the database.

References

[key] MSSQL_UserDefinedFunction ScopedElement
　Access Type: Read-only
　The ScopedElement property references a user-defined function defined within the database referenced by the ScopingElement property.

[key] MSSQL_Database ScopingElement
　Access Type: Read-only
　The ScopingElement property references a database in SQL Server™.

MSSQL_DatabaseView: CIM_Component
　Association Class
　The MSSQL_DatabaseView class associates a database to the view contained within the database.

References

[key] MSSQL_Database GroupComponent
　Access Type: Read-only
　The parent element in the association

[key] MSSQL_View Part Component
　Access Type: Read-only
　The child element in the association MSSQL_Datatype: MSSQL_DBMSObject
　Abstract Class
　The MSSQL_Datatype class represents all the datatypes defined in a SQL Server™ installation. This includes both the user-defined datatypes, as well as the system-defined datatypes.

Properties boolean AllowIdentity
　Access Type: Read-only
　The AllowIdentity property indicates the ability of a data type to participate in a column defined with the identity property. The SQL Server™ identity property is defined for data types that can accept numeric values. A column defined with the identity property is defined with a starting value and a step value. SQL Server™ generates values for the column by querying the last applicable value and adding the step value.

boolean AllowNulls
　Access Type: Read-only
　The AllowNulls property indicates whether the data type has the ability to accept NULL as a value.

string Caption
　Access Type: Read-only
　The Caption property is a short textual description (one-line string) of the object.
　Maximum Length: 64

[key] string DatabaseName
　Access Type: Read-only
　The DatabaseName property indicates the name of the database that the object is a part of.
　Maximum Length: 128 string Description
　Access Type: Read-only
　The Description property provides a textual description of the object.

datetime InstallDate
　Access Type: Read-only
　The InstallDate property is datetime value indicating when the object was installed. A lack of a value does not indicate that the object is not installed.

[key] string Name
　Access Type: Read-only
　The Name property defines the label by which the object is known.

[key] string SQLServerName
　Access Type: Read-only
　The SQLServerName property indicates the name of the SQL Server™ installation that the object is a part of.
　Maximum Length: 128 string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
  Values are: "OK", "Error", "Degraded", "Unknown", "Pred Fail", "Starting", "Stopping", "Service"
  Maximum Length: 10

Associations
  MSSQL_Datatype is associated to MSSQL_Database as the ScopedElement property of the MSSQL_DatabaseDatatype association.
  MSSQL_Datatype is associated to MSSQL_Column as the Antecedent property of the MSSQL_ColumnDatatype association.

MSSQL_DBMSObject: CIM_LogicalElement
  Abstract Class
  The MSSQL_DBMSObject class represents objects in a database system. These objects include storage objects such as databases, tables, keys and constraints.

Properties
string Caption
  Access Type: Read-only
  The Caption property is a short textual description (one-line string) of the object.
  Maximum Length: 64 string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

string Name
  Access Type: Read-only
  The Name property defines the label by which the object is known. When subclassed, the Name property can be overridden to be a Key property.

string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
  Values are: "OK", "Error", "Degraded", "Unknown", "Pred Fail", "Starting", "Stopping", "Service"
  Maximum Length: 10

Associations
  MSSQL_DBMSObject is associated to MSSQL_DBMSUserObject as the Element property of the MSSQL_Permission association.
  MSSQL_DBMSObject is associated to MSSQL_User as the Dependent property of the MSSQL_DBMSObjectOwner association.

MSSQL_DBMSObjectOwner: CIM_Dependency
  Association Class
  The MSSQL_DBMSObjectOwner class represents an association between a SQL Server™ database object and the user who owns the object.

References
[key] MSSQL_User Antecedent
  Access Type: Read-only
  The Antecedent property references the user who owns the database object referenced by the Dependent property.

[key] MSSQL_DBMSObject Dependent
  Access Type: Read-only
  The Dependent property references a SQL Server database object.

MSSQL_Default: MSSQL_DBMSObject
  The MSSQL_Default class represents the attributes of a single Microsoft® SQL Server™ default. SQL Server™ defaults provide data to columns and user-defined data types when no other data is available on an INSERT statement execution.

Properties
string Caption
  Access Type: Read-only
  The Caption property is a short textual description (one-line string) of the object.
  Maximum Length: 64 datetime CreateDate
  Access Type: Read-only
  The CreateDate property indicates the time and date on which the default was created. Note that creation date may be different from the install date in cases where the object is created in one place and then installed elsewhere.

[key] string DatabaseName
  Access Type: Read-only
  The DatabaseName property indicates the name of the database that the object is a part of.
  Maximum Length: 128 string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

[key] string Name
  Access Type: Read-only
  The Name property defines the label by which the object is known.

[key] string SQLServerName
   Access Type: Read-only
   The SQLServerName property indicates the name of the SQL Server™ installation that the object is a part of.
   Maximum Length: 128 string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
   Values are: "OK", "Error", "Degraded", "Unknown", "Pred Fail", "Starting", "Stopping", "Service"
   Maximum Length: 10 string Text
   Access Type: Read/Write
   The Text property indicates the Transact-SQL script that defines the object. Note that there is a special requirement for the name of the object is specified in the CREATE statement. The name of the object has to be in the form that includes the name of the owner. For example, in order to create an object named "Some Object", one would need to specify it as [dbo].[Some Object].

Methods

The MSSQL_Default class supports the following methods:

| Method Name | Description |
| --- | --- |
| Rename | The Rename method is used to rename a default instance. |

Associations

MSSQL_Default is associated to MSSQL_Database as the ScopedElement property of the MSSQL_DatabaseDefault association.

MSSQL_Default is associated to MSSQL_Column as the Antecedent property of the MSSQL_ColumnDefault association.

MSSQL_Default is associated to MSSQL_UserDatatype as the Antecedent property of the MSSQL_UserDatatypeDefault association.

MSSQL_DRIDefault: MSSQL_DBMSObject

The MSSQL_DRIDefault class represents the properties of a Microsoft® SQL Server™ column DEFAULT constraint.

Properties string Caption
   Access Type: Read-only
   The Caption property is a short textual description (one-line string) of the object.
   Maximum Length: 64

[key] string ColumnName
   Access Type: Read-only
   The ColumnName property indicates the name of the column that the DRI default is defined in.
   Maximum Length: 128

[key] string DatabaseName
   Access Type: Read-only
   The DatabaseName property indicates the name of the database that the object is a part of.
   Maximum Length: 128 string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

[key] string Name
   Access Type: Read-only
   The Name property defines the label by which the object is known.

[key] string SQLServerName
   Access Type: Read-only
   The SQLServerName property indicates the name of the SQL Server™ installation that the object is a part of.
   Maximum Length: 128 string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10

[key] string TableName
   Access Type: Read-only
   The TableName property indicates the name of the table that the DRI default is defined in.
   Maximum Length: 128 string Text
   Access Type: Read/Write
   The Text property indicates the Transact-SQL or other script that defines the object. Note that there is a special requirement for the name of the object is specified in the CREATE statement. The name of the object has to be in the form that includes the name of the owner. For example, in order to create an object named "Some Object", one would need to specify it as [dbo].[Some Object].

Associations

MSSQL_DRIDefault is associated to MSSQL_Column as the Antecedent property of the MSSQL_ColumnDRIDefault association.

MSSQL_ErrorLog: CIM_LogicalElement

The MSSQL_ErrorLog class represents the SQL Service error logs.

Properties

[key] string ArchiveID
　Access Type: Read-only
　ArchiveNumber identifies the number of the log. The active log has number 0.
　Maximum Length: 128 string Caption
　Access Type: Read-only
　The Caption property is a short textual description (one-line string) of the object.
　Maximum Length: 64 string Description
　Access Type: Read-only
　The Description property provides a textual description of the object.

datetime InstallDate
　Access Type: Read-only
　The InstallDate property is datetime value indicating when the object was installed. A lack of a value does not indicate that the object is not installed.

datetime LastModified
　Access Type: Read-only
　LastModified indicates the time and date the log was last modified.

[key] string Name
　Access Type: Read-only
　The Name property defines the label by which the object is known. When subclassed, the Name property can be overridden to be a Key property.

string Status
　Access Type: Read-only
　The Status property is a string indicating the current status of the object. Various operational and non-operational statuses can be defined. Operational statuses are "OK", "Degraded" and "Ped Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
　Values are: "OK", "Error", "Degraded", "Unknown", "Pred Fail", "Starting", "Stopping", "Service"
　Maximum Length: 10

Associations

MSSQL_ErrorLog is associated to MSSQL_SQLServer as the Antecedent property of the MSSQL_SQLServerErrorLog association.

MSSQL_ErrorLog is associated to MSSQL_ErrorLogEntry as the GroupComponent property of the MSSQL_ErrorLogErrorLogEntry association.

MSSQL_ErrorLog is associated to CIM_DataFile as the Dependent property of the MSSQL_ErrorLogDataFile association.

MSSQL_ErrorLogDataFile: CIM_Dependency
　Association Class
　The MSSQL_ErrorLogDataFile class represents an association between a SQL Server™ error log, and the operating system file used to store the error log.

References

[key] CIM DataFile Antecedent
　Access Type: Read-only
　The Antecedent property references an operating system file used to store the error log referenced by the Dependent property.

[key] MSSQL_ErrorLog Dependent
　Access Type: Read-only
　The Dependent property references a SQL Server™ error log.

MSSQL_ErrorLogEntry: CIM_LogicalElement
　The MSSQL_ErrorLogEntry class represents the entries in a SQL Service error log.

Properties

[key] string ArchiveID
　Access Type: Read-only
　The ArchiveNumber property identifies the archive number of the log the entry is stored in. The active log has number 0.
　Maximum Length: 128 string Caption
　Access Type: Read-only
　The Caption property is a short textual description (one-line string) of the object.
　Maximum Length: 64 string Description
　Access Type: Read-only
　The Description property provides a textual description of the object.

[key] string EntryID
　Access Type: Read-only
　EntryNumber identifies the number of the entry within a log. Each entry in a log is successively numbered.
　Maximum Length: 128 datetime InstallDate
　Access Type: Read-only
　The InstallDate property is datetime value indicating when the object was installed. A lack of a value does not indicate that the object is not installed.

string Name
　Access Type: Read-only
　The Name property defines the label by which the object is known. When subclassed, the Name property can be overridden to be a Key property.

[key] string SQLServerName
　Access Type: Read-only
　The SQLServerName property indicates the name of the SQL Server™ installation that the object is a part of.
　Maximum Length: 128 string Status
　Access Type: Read-only
　The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"
    Maximum Length: 10
string Text
    Access Type: Read-only
    Text is the descriptive text of the error log entry.
Associations
    MSSQL_ErrorLogEntry is associated to MSSQL_ErrorLog as the Part Component property of the MSSQL_ErrorLogErrorLogEntry association.
MSSQL_ErrorLogErrorLogEntry: CIM_Component
    Association Class
    The MSSQL_ErrorLogErrorLogEntry class represents an association between an error log and an entry in the error log.
References
[key] MSSQL_ErrorLog GroupComponent
    Access Type: Read-only
    The GroupComponent property references a SQL Server™ error log.
[key] MSSQL_ErrorLogEntry Part Component
    Access Type: Read-only
    The Part Component property references an entry in the error log referenced by the GroupComponent property.
MSSQL_Extends
    Abstract Class
    Association Class
    The MSSQL_Extends class is an abstract association class. It associates a class with another class that extends the former class by defining some new properties and methods.
References
    CIM_ManagedSystemElement ExtendedElement
    Access Type: Read-only
    The ExtendedElement property references a managed system element that is being extended.
    MSSQL_Extension Extension
    Access Type: Read-only
    The Extension property references a extension to the managed system element referenced by the ExtendedElement property.
MSSQL_Extension
    Abstract Class
    The MSSQL_Extension class represents extensions made via associations to a managed system element. Extensions are made via associations when it is not possible or desirable to extend a class by subclassing.
Associations
    MSSQL_Extension is associated to CIM_ManagedSystemElementas the Extension property of the MSSQL_Extends association.
MSSQL_FileGroup: CIM_LogicalElement
    The MSSQL_FileGroup class exposes the attributes of a Microsoft® SQL Server™ filegroup.

Properties
string Caption
    Access Type: Read-only
    The Caption property is a short textual description (one-line string) of the object.
    Maximum Length: 64
[key] string DatabaseName
    Access Type: Read-only
    The DatabaseName property indicates the name of the database that the object is a part of.
    Maximum Length: 128
boolean Default
    Access Type: Read/Write
    The Default property indicates the filegroup used when no filegroup is specified as part of table or index creation. If TRUE, the referenced filegroup is used to implement table or index data storage when a table or index is created and no filegroup is specified. If FALSE, the referenced filegroup is not used as the default in table and index creation. The filegroup may be specified by name to direct creation.
string Description
    Access Type: Read-only
    The Description property provides a textual description of the object.
datetime InstallDate
    Access Type: Read-only
    The InstallDate property is datetime value indicating when the object was installed. A lack of a value does not indicate that the object is not installed.
[key] string Name
    Access Type: Read-only
    The Name property defines the label by which the object is known. When subclassed, the Name property can be overridden to be a Key property.
boolean ReadOnly
    Access Type: Read/Write
    The ReadOnly property controls the ability to update a Microsoft® SQL Server™ database or database filegroup. If TRUE, data in the database or database filegroup cannot be changed. If FALSE, updates are allowed to data in the database or database filegroup
sint32 Size
    Access Type: Read-only
    The Size property exposes the total size, in megabytes, of the filegroup.
[key] string SQLServerName
    Access Type: Read-only
    The SQLServerName property indicates the name of the SQL Server™ installation that the object is a part of.
    Maximum Length: 128
string Status
    Access Type: Read-only
    The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work.

Not all such work is online, yet the managed element is neither "OK" nor in one of the other sates.

Values are: "OK", "Error", "Degraded", "Unknown", "Pred Fail", "Starting", "Stopping", "Service"

Maximum Length: 10 uint32 Type

This property indicates the type of the file group. The file group can be of three types. It is either a user defined fib group, a primary file group, or a filegroup defined on files maintained on read-only media. When a database is created, it is created on exactly one filegroup named PRIMARY. This is the primary file group. After database creation, filegroups can be added to the database. These are the user defined file groups.

| Value | Description |
| --- | --- |
| 0 | User Defined |
| 8 | On Read-Only Media |
| 16 | Primary |

Methods

The MSSQL_FileGroup class supports the following methods:

| Method Name | Description |
| --- | --- |
| CheckFilegroup | The CheckFilegroup method scans and tests the integrity of database pages maintained in operating system files implementing the referenced filegroup. |
| CheckFilegroupDataOnly | The CheckFilegroupDataOnly method scans and tests the integrity of database pages that are used to maintain table data in the operating system files implementing the referenced filegroup. |
| EnumStoredObjects | The EnumStoredObjects method enumerates the names of the indexes, tables and statistical mechanisms stored in the filegroup. |

Associations

MSSQL_FileGroup is associated to MSSQL_Database as the Antecedent property of the MSSQL_DatabaseFileGroup association.

MSSQL_FileGroup is associated to MSSQL_Table as the Antecedent property of the MSSQL_TableFileGroup association.

MSSQL_FileGroup is associated to MSSQL_Table as the Antecedent property of the MSSQL_TableTextFileGroup association.

MSSQL_FileGroup is associated to MSSQL_Index as the Antecedent property of the MSSQL_IndexFileGroup association.

MSSQL_FileGroup is associated to MSSQL_CandidateKey as the Antecedent property of the MSSQL_KeyFileGroup association.

MSSQL_FileGroup is associated to MSSQL_DatabaseFile as the GroupComponent property of the MSSQL_FileGroupDatabaseFile association.

MSSQL_FileGroupDatabaseFile: CIM_Component Association Class

The MSSQL_FileGroupDatabaseFile class associates a database file group to the operating system files that are part of the group.

References

[key] MSSQL_FileGroup GroupComponent
　　Access Type: Read-only
　　The parent element in the association

[key] MSSQL_DatabaseFile Part Component
　　Access Type: Read-only
　　The child element in the association MSSQL_ForeignKey: MSSQL_Key
　　The MSSQL_ForeignKey class represents the foreign keys defined for a SQL Server™ database table.

Properties string Caption
　　Access Type: Read-only
　　The Caption property is a short textual description (one-line string) of the object.
　　Maximum Length: 64 boolean Checked
　　Access Type: Read/Write
　　The Checked property enables or disables foreign constraint evaluation for an existing foreign key constraint. If True, an attempt is made to enforce a foreign key constraint when rows are added to the table on which the constraint is defined. If False, no attempt is made to enforce the foreign constraint when rows are added to the table on which the constraint is defined.

[key] string DatabaseName
　　Access Type: Read-only
　　The DatabaseName property indicates the name of the database that the key is a part of.
　　Maximum Length: 128 string Description
　　Access Type: Read-only
　　The Description property provides a textual description of the object.

boolean ExcludeReplication
　　Access Type: Read-only
　　The ExcludeReplication property controls foreign key constraint enforcement when replicated data is inserted into the columns on which the foreign key constraint is defined datetime InstallDate
　　Access Type: Read-only
　　The InstallDate property is datetime value indicating when the object was installed. A lack of a value does not indicate that the object is not installed.

[key] string Name
　　Access Type: Read-only
　　The Name property defines the label by which the object is known. The name of a key is unique within a database.

[key] string SQLServerName
　　Access Type: Read-only
　　The SQLServerName property indicates the name of the SQL Server™ installation that the key is a part of.
　　Maximum Length: 128 string Status
　　Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.

Values are: "OK", "Error", "Degraded", "Unknown", "Pred Fail", "Starting", "Stopping", "Service"

Maximum Length: 10

[key] string TableName

Access Type: Read-only

The TableName property indicates the name of the table that the key is defined in.

Maximum Length: 128

Methods

The MSSQL_ForeignKey class supports the following methods:

| Method Name | Description |
| --- | --- |
| Create | The Create method is used to create a new foreign key. |
| Rename | The Rename method is used to rename the foreign key instance. |

Associations

MSSQL_ForeignKey is associated to MSSQL_CandidateKey as the Dependent property of the MSSQL_ReferencedKey association.

MSSQL_ForeignKey is associated to MSSQL_Table as the Dependent property of the MSSQL_ReferencedTable association.

MSSQL_FullTextCatalog: CIM_LogicalElement

The MSSQL_FullTextCatalog class represents a single Microsoft® Search persistent data store. Microsoft Search enables full-text queries on data maintained by Microsoft® SQL Server™. The service both builds the indexes providing full-text query capability and participates in query resolution by providing result data during a full-text query. Index data is maintained within a full-text catalog.

Properties string Caption

Access Type: Read-only

The Caption property is a short textual description (one-line string) of the object.

Maximum Length: 64

[key] string DatabaseName

Access Type: Read-only

The DatabaseName property indicates the name of the database that the full text catalog is a part of.

Maximum Length: 128 string Description

Access Type: Read-only

The Description property provides a textual description of the object.

uint32 ErrorLogSize

Access Type: Read-only

The ErrorLogSize property returns the size, in bytes, of a Microsoft® Search full-text catalog error log.

Units: Bytes boolean FullTextIndexedTables

Access Type: Read-only

The FullTextIndexedTables property reports Microsoft® Search full-text catalog use. When TRUE, at least one table uses the full-text catalog for index data storage. When FALSE, the full-text catalog is not currently used for index data storage.

uint32 FullTextIndexSize

Access Type: Read-only

The FullTextIndexSize property returns the size, in megabytes, of the full-text catalog.

Units: Megabytes datetime InstallDate

Access Type: Read-only

The InstallDate property is datetime value indicating when the object was installed. A lack of a value does not indicate that the object is not installed.

uint32 ItemCount

Access Type: Read-only

The ItemCount property returns the number of entries contained in a Microsoft® Search full-text catalog. For each table indexed in the full text catalog, an entry is made for the table and an entry is made for each row in the table.

[key] string Name

Access Type: Read/Write

The Name property is a label used to uniquely identify the object.

uint32 PopulateCompletionAge

Access Type: Read-only

The PopulateCompletionAge property returns the number of seconds between the time of the most recent, successful Microsoft® Search full-text catalog population and a system-defined date and time. A value of zero represents the base date and time, 12:00:00 AM, Jan. 1, 1990.

Units: Seconds datetime PopulateCompletionDate

Access Type: Read-only

The PopulateCompletionDate property returns the most recent date and time at which an update was made to the full-text catalog.

uint32 PopulateStatus

Access Type: Read-only

The PopulateStatus property returns the population state of a Microsoft® Search full-text catalog. The property can have one of the following values: Idle—No action is being performed against the referenced full-text catalog. In Progress—Full index population is in progress for the referenced full-text catalog. Paused—Lack of available resource, such as disk space, has caused an interruption. Throttled—Microsoft® Search service has paused the referenced full-text index population. Recovering—Interrupted population on the referenced full text catalog is resuming. Shutdown—Referenced full-text catalog is being deleted or is otherwise not accessible. Incremental—Incremental index population is in progress for the referenced full-text catalog. Updating Index—Referenced full-text catalog is being assembled by the Microsoft® Search service. Assemblage is the final step in full-text catalog population.

Values are: "Idle", "In Progress", "Paused", "Throttled", "Recovering", "Shutdown", "Incremental", "Updating Index"

string RootPath

Access Type: Read/Write

The RootPath property specifies an operating system directory used as the primary path for Microsoft® Search full-text catalog storage. If the RootPath property is an empty string when creating a Microsoft®) Search full-text catalog, the default data path, set for the Microsoft® Search service, is used.

[key] string SQLServerName

Access Type: Read-only

The SQLServerName property indicates the name of the SQL Server™ installation that the full-text catalog is a part of.

Maximum Length: 128 string Status

Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10 uint32 UniqueKeyCount

Access Type: Read-only

The UniqueKeyCount property returns an approximate number of words uniquely addressable in a Microsoft® Search full-text catalog.

Methods

The MSSQL_FullTextCatalog class supports the following methods:

| Method Name | Description |
| --- | --- |
| Rebuild | The Rebuild method re-creates the Microsoft Search full-text catalog. |
| StartFullTextPopulation | The StartFullTextPopulation method starts Microsoft Search full-text table population. |
| StopFullTextPopulation | The StopFullTextPopulation method stops full-text population. |

Associations

MSSQL_FullTextCatalog is associated to MSSQL_Database as the Antecedent property of the MSSQL_Database-FullTextCatalog association.

MSSQL_FullTextCatalogService: CIM_Service

The MSSQL_FullTextCatalogService class represents the Microsoft® Search full-text indexing service. The Microsoft® Search full-text indexing service enables full-text queries on data maintained by SQL Server. Microsoft® Search both builds the indexes providing full-text query capability and participates in query resolution by providing result data during a full-text query.

Properties string Caption

Access Type: Read-only

The Caption property is a short textual description (one-line string) of the object.

Maximum Length: 64 sint32 ConnectTimeout

Access Type: Read/Write

The ConnectTimeout property specifies a time interval used by the Microsoft® Search service when attempting a connection to a Microsoft® SQL Server installation enabled for full-text search.

string CreationClassName

Access Type: Read-only

CreationClassName indicates the name of the class or the subclass used in the creation of an instance. When used with the other key properties of this class, this property allows all instances of this class and its subclasses to be uniquely identified.

string DefaultPath

Access Type: Read-only

The DefaultPath property returns the operating system path naming a directory used as a root for Microsoft® Search full-text catalog implementation if no user-specified path is supplied during full-text catalog creation.

string Description

Access Type: Read-only

The Description property provides a textual description of the object.

datetime InstallDate

Access Type: Read-only

The InstallDate property is datetime value indicating when the object was installed. A lack of a value does not indicate that the object is not installed.

boolean IsFullTextInstalled

Access Type: Read-only

The IsFullTextInstalled property returns True when the Microsoft® Search service has been successfully installed on a server running Microsoft® SQL Server™.

[key] string Name

Access Type: Read-only

The Name property uniquely identifies the service and provides an indication of the functionality that is managed. This functionality is described in more detail in the object's Description property. The default value of this property is "MSSearch".

sint32 ResourceUsage

Access Type: Read/Write

The ResourceUsage property specifies a relative operating system execution priority setting for the Microsoft® Search service. Use the ResourceUsage property to raise or lower execution priority for a running Microsoft® Search service. By default, ResourceUsage is 3, interpreted as normal priority for the service. Set ResourceUsage to 2 or 1 to lower the execution priority for the Microsoft® Search service. Set ResourceUsage to 4 or 5 to raise the execution priority. Note that a value of 5 represents dedicated priority for the Microsoft® Search service. Setting the ResourceUsage property to a value higher than 3 can have unintended consequences and should be considered only after evaluating the possible effects on other services running on the computer.

uint32 ServiceStatus
   Access Type: Read-only
   The ServiceStatus property reports the execution state of the service.

| Value | Description |
|---|---|
| 0 | Unknown |
| 1 | Running |
| 2 | Paused |
| 3 | Stopped |
| 4 | Starting |
| 5 | Stopping |
| 6 | Pausing | boolean Started
   Access Type: Read-only
   Started is a boolean indicating whether the service has been started (TRUE), or stopped (FALSE).

string StartMode
   Access Type: Read-only
   StartMode is a string value indicating whether the service is automatically started by a operating system, or only started upon request.
   Values are: "Automatic", "Manual"

string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10 string SystemCreationClassName
   Access Type: Read-only
   The type name of the system that hosts this service.

string SystemName
   Access Type: Read-only
   The name of the system that hosts this service.

Methods
   The MSSQL_FullTextCatalogService class supports the following methods:

| Method Name | Description |
|---|---|
| CleanUp | The CleanUp method directs the Microsoft ® Search service to locate and remove full-text catalog resources in the file system. |
| StartService | The StartService method starts the Search service. |
| StopService | The StopService method stops the Search service. |

Associations
   MSSQL_FullTextCatalogService is associated to Win32 Service as the SameElement property of the MSSQL_FullTextWin32Service association.

MSSQL_FullTextWin32Service: CIM_LogicalIdentity
   Association Class
   The MSSQL_FullTextWin32Service represents an association between an instance of MSSQL_FullTextCatalogService and the corresponding instance of the Win32_Service.

References

[key] Win32_Service SystemElement
   Access Type: Read-only
   The SystemElement property references a Win32 service.

[key] MSSQL_FullTextCatalogService SameElement
   Access Type: Read-only
   The SameElement property references the full text catalog service.

MSSQL_Index: MSSQL_DBMSObject
   The MSSQL_Index class represents an index for a SQL Server™ table. A SQL Server™ index optimizes access to data in SQL Server™ tables. Indexes are also used to enforce some constraints, such as UNIQUE and PRIMARY KEY constraints.

Properties string Caption
   Access Type: Read-only
   The Caption property is a short textual description (one-line string) of the object.
   Maximum Length: 64

[key] string DatabaseName
   Access Type: Read-only
   The DatabaseName property indicates the name of the database that the object is a part of.
   Maximum Length: 128 string Description
   Access Type: Read-only
   The Description property provides a textual description of the object.

sint32 FillFactor
   Access Type: Read-only
   The FillFactor property indicates the percent of each page used to store index data when the index is created.

datetime InstallDate
   Access Type: Read-only
   The InstallDate property is datetime value indicating when the object was installed. A lack of a value does not indicate that the object is not installed.

boolean IsFullTextKey
   Access Type: Read-only
   The IsFullTextKey property identifies the index used by Microsoft® Search to support row identification. When TRUE, the referenced index is used by Microsoft® Search for row identification. When FALSE, the referenced index is not used by Microsoft® Search. Microsoft® Search requires that a single column identify rows participating in an index supporting full-text query. The column designated must contain unique, non-NULL values and must participate in a PRIMARY KEY or UNIQUE key constraint. A table containing a PRIMARY KEY constraint does not require a separate unique index for Microsoft® Search configuration. Use UniqueIndexForFullText in the MSSQL_Table class to configure Microsoft® Search full-text index key column use.

[key] string Name
    Access Type: Read-only
    The Name property defines the label by which the object is known.

boolean NoRecompute
    Access Type: Read-only
    The NoRecompute property controls statistics generation when the MSSQL_Index class is used to create a Microsoft® SQL Server™ index. When TRUE, SQL Server™ does not perform automatic data distribution statistics update on the created index. When FALSE (default), automatic data-distribution statistics update is performed. Use the UpdateIndexStatistics, UpdateStatistics, or UpdateStatisticsWith methods to force an update of index statistics for SQL Server™ indexes not configured for automatic update. Use the UpdateStatisticsWith method of the MSSQL_Table object to enable or disable automatic update of data-distribution statistics for an existing index.

sint32 SpaceUsed
    Access Type: Read-only
    The SpaceUsed property returns the amount of disk resource used, in kilobytes, to store data that implements the index.
    Units: Kilobytes

[key] string SQLServerName
    Access Type: Read-only
    The SQLServerName property indicates the name of the SQL Server™ installation that the object is a part of.
    Maximum Length: 128 boolean StatisticsIndex
    Access Type: Read-only
    The StatisticsIndex property has a value of TRUE when the index maintains data distribution statistics. SQL Server™ query optimization relies, in part, on data distribution statistics maintained on indexes. To aid query optimization, SQL Server™ can generate data distribution statistics for one or more columns in a table without imposing overhead associated with index maintenance.

string Status
    Access Type: Read-only
    The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one at the other states.
    Values are: "OK", "Error", "Degraded", "Unknown", "Pred Fail", "Starting", "Stopping", "Service"
    Maximum Length: 10

[key] string TableName
    Access Type: Read-only
    The TableName property indicates the name of the table that the key is defined in.
    Maximum Length: 128 uint32 Type
    Access Type: Read-only

The Type property specifies the type of the index. If none of the bits are set, it implies that it is a non-clustered index. This is the default type for the index. If DRI Primary Key or DRI Unique Key is set, it implies that that the index is used to maintain a DRI constraint. The bits for Default, Ignore Duplicate Key, Clustered, Pad Index, Drop Exist are bits that can be used at time of index creation.

| Bit Position | Description | Explanation |
|---|---|---|
| 0 | Ignore Duplicate Key | Controls error generation when an INSERT or UPDATE operation could cause a constraint violation and the index implements a PRIMARY KEY or UNIQUE constraint. |
| 1 | Unique | Index implements a UNIQUE constraint. |
| 4 | Clustered | The index is clustered. SQL Server ™ supports a single clustered index on any table. |
| 5 | Hypothetical | Redirects index creation, mapping index object manipulation to CREATE STATISTICS and DROP STATISTICS statements. |
| 8 | Pad Index | Pad the index nodes using fill factor. |
| 11 | DRI Primary Key | The index implements a PRIMARY KEY constraint. |
| 12 | DRI Unique Key | The index implements a UNIQUE constraint on a table not constrained by primary key. |
| 15 | Drop Exist | Optimizes index creation when an existing index is rebuilt. |
| 24 | No Recompute | Index created with statistics computation off. For more information, see NoRecompute property. |

Methods
    The MSSQL_Index class supports the following methods:

| Method Name | Description |
|---|---|
| CheckIndex | The CheckIndex method tests the integrity of database pages implementing storage for the referenced index. |
| Create | The Create method is used to create a new instance of an index. |
| GetIndexedColumnDESC | The GetIndexedColumnDESC method specifies whether the sort order of a column in an index is descending. |
| Rebuild | The Rebuild method re-creates the index. |
| RecalcSpaceUsage | The RecalcSpaceUsage method forces the update of data reporting the disk resource usage of the index. |
| Rename | The Rename method is used to rename an instance of an index. |
| SetIndexedColumnDESC | The SetIndexedColumnDESC method specifies a column to sort in descending order as part of an index. |
| UpdateStatistics | The UpdateStatistics method forces data distribution statistics update for the index. |
| UpdateStatisticsWith | The UpdateStatisticsWith method forces data distribution statistics update for a hypothetical index used to support data distribution statistics for the index. |

Associations
    MSSQL_Index is associated to MSSQL_FileGroup as the Dependent property of the MSSQL_IndexFileGroup association.
    MSSQL_Index is associated to MSSQL_Table as the Antecedent property of the MSSQL_TableIndex association.

MSSQL_Index is associated to MSSQL_Column as the Dependent property of the MSSQL_IndexColumn association.

MSSQL_Index is associated to MSSQL_IndexTableInformation as the Element property of the MSSQL_IndexStatistics association.

MSSQL_IndexColumn: CIM Dependency
Association Class
The MSSQL_IndexColumn class represents an association between an index and a column that participates in the index.

Properties boolean DescendingSortOrder
　Access Type: Read-only
　This property indicates whether the sort order of a column in an index is descending. A value of TRUE implies that it is descending.

References

[key] MSSQL_Column Antecedent
　Access Type: Read-only
　The Antecedent property references a column that participates in the index referenced by the Dependent property.

[key] MSSQL_Index Dependent
　Access Type: Read-only
　The Dependent property references an index in a SQL Server™ table.

MSSQL_IndexFileGroup: CIM_Dependency
Association Class
The MSSQL_IndexFileGroup class represents an association between an index and a file group that stores the index.

References

[key] MSSQL_FileGroup Antecedent
　Access Type: Read-only
　The Antecedent property references the file group that stores the index referenced by the Dependent property.

[key] MSSQL_Index Dependent
　Access Type: Read-only
　The Dependent property references an index in SQL Server.

MSSQL_IndexStatistics: CIM_Statistics
Association Class
The MSSQL_IndexStatistics class represents an association between an index and the statistical information stored with the index.

References

[key] MSSQL_Index Element
　Access Type: Read-only
　The Element property references a SQL Server index.

[key] MSSQL_IndexTableInformation Stats
　Access Type: Read-only
　The Stats property references the statistical information stored with the index referenced by the Element property.

MSSQL_IndexTableInformation: CIM_StatisticalInformation
The MSSQL_IndexTableInformation class represents the information regarding the age and structure of the index statistical information.

Properties real32 AverageKeyLength
　Access Type: Read-only
　The AverageKeyLength property represents the average length of an index row.

string Caption
　Access Type: Read-only
　A short textual description (one-line string) for the statistic or metric.
　Maximum Length: 64

[key] string DatabaseName
　Access Type: Read-only
　The DatabaseName property indicates the name of the database that the object is a part of.
　Maximum Length: 128 real32 Density
　Access Type: Read-only
　The Density property indicates the selectivity of the index. All indexes have distribution statistics that describe the selectivity and distribution of the key values in the index. Selectivity is a property that relates to how many rows are typically identified by a key value.

string Description
　Access Type: Read-only
　A textual description of the statistic or metric.

datetime LastUpdate
　Access Type: Read-only
　The LastUpdate property indicates the date and time of most recent update of the statistical information.

[key] string Name
　Access Type: Read-only
　The Name property defines the label by which the object is known.
　Maximum Length: 256 uint64 Rows
　Access Type: Read-only
　The Rows property indicates the number of rows in the table.

uint64 RowsSampled
　Access Type: Read-only
　The RowsSampled property indicates the number of rows sampled for statistics data.

[key] string SQLServerName
　Access Type: Read-only
　The SQLServerName property indicates the name of the SQL Server™ installation that the index is a part of.
　Maximum Length: 128 uint32 Steps
　Access Type: Read-only
　The Steps property indicates the number of histogram values in the current distribution statistics.

[key] string TableName
　Access Type: Read-only
　The TableName property indicates the name of the table in which the index is defined.
　Maximum Length: 128

Associations
MSSQL_IndexTableInformation is associated to MSSQL_Index as the Stats property of the MSSQL_IndexStatistics association.

MSSQL_IntegratedSecuritySetting: MSSQL_Setting

The MSSQL_IntegratedSecuritySetting class represents the integrated security settings when WMI interacts with SQL Server?.

Properties uint32 AuditLevel
   Access Type: Read/Write
   The AuditLevel property exposes SQL Server™ Authentication logging behavior.

| Value | Description | Explanation |
|---|---|---|
| 0 | None | Do not log authentication attempts. |
| 1 | Audit Login Success | Log successful authentication. |
| 2 | Audit Login Failure | Log failed authentication. |
| 3 | Audit All | Log all authentication attempts regardless of success or failure. | string Caption
   Access Type: Read-only
   A short textual description (one-line string) of the MSSQL_IntegratedSecuritySetting object.
   Maximum Length: 64 string Description
   Access Type: Read-only
   A textual description of the MSSQL_IntegratedSecuritySetting object.

boolean ImpersonateClient
   Access Type: Read/Write
   The ImpersonateClient property exposes the security context for non administrative users executing xp_cmdshell. If TRUE, xp_cmdshell runs in the security context of the client connection. If FALSE, xp_cmdshell runs in the security context of SQL Server Agent. The default is False.

uint32 SecurityMode
   Access Type: Read/Write
   The SecurityMode property directs the authentication mode used by a Microsoft® SQL Server™ installation.

| Value | Description | Explanation |
|---|---|---|
| 0 | Normal | Allow SQL Server Authentication only |
| 1 | Integrated | Allow Windows NT Authentication only |
| 2 | Mixed | Allow Windows NT or SQL Server Authentication |

[key] string SettingID
   Access Type: Read-only
   The identifier by which the MSSQL_IntegratedSecuritySetting object is known.
   Maximum Length: 256

Associations
   MSSQL_IntegratedSecuritySetting is associated to MSSQL_SQLServer as the Setting property of the MSSQL_SQLServerIntegratedSecuritySetting association.

MSSQL_Key: MSSQL_Constraint
   Abstract Class
   The MSSQL_Key class represents the keys defined for a SQL Server™ table.

Properties string Caption
   Access Type: Read-only
   The Caption property is a short textual description (one-line string) of the object.
   Maximum Length: 64

[key] string DatabaseName
   Access Type: Read-only
   The DatabaseName property indicates the name of the database that the key is a part of.
   Maximum Length: 128 string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

[key] string Name
   Access Type: Read-only
   The Name property defines the label by which the object is known. The name of a key is unique within a database.

[key] string SQLServerName
   Access Type: Read-only
   The SQLServerName property indicates the name of the SQL Server installation that the key is a part of.
   Maximum Length: 128 string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
   Values are: "OK", "Error", "Degraded", "Unknown", "Pred Fail", "Starting", "Stopping", "Service"
   Maximum Length: 10

[key] string TableName
   Access Type: Read-only
   The TableName property indicates the name of the table that the key is defined in.
   Maximum Length: 128

Associations
   MSSQL_Key is associated to MSSQL_Table as the Antecedent property of the MSSQL_TableKey association.
   MSSQL_Key is associated to MSSQL_Column as the GroupComponent property of the MSSQL_KeyColumn association.

MSSQL_KeyColumn: CIM Component
   Association Class
   The MSSQL_KeyColumn class represents an association between a key and a column that is part of the key.

References

[key] MSSQL_Key GroupComponent
  Access Type: Read-only
  The GroupComponent property references a key in a SQL Server database.

[key] MSSQL_Column Part Component
  Access Type: Read-only
  The Part Component property references a column that is part of the key referenced by the GroupComponent property.

MSSQL_KeyFileGroup: CIM-Dependency
  Association Class
  The MSSQL_KeyFileGroup class represents an association between a key and the file group used to store the key.

References

[key] MSSQL_FileGroup Antecedent
  Access Type: Read-only
  The Antecedent property references the file group that stores the key referenced by the Dependent property.

[key] MSSQL_CandidateKey Dependent
  Access Type: Read-only
  The Dependent property references a candidate key in SQL Server™.

MSSQL_LanguageSetting: MSSQL_Setting
  The MSSQL_LanguageSetting class exposes the properties of an installed Microsoft® SQL Server™ language record. SQL Server™ language record identifiers categorize system messages so that error and status information can be presented as localized text.

Properties string Alias
  Access Type: Read-only
  The Alias property identifies an alternate name for a SQL Server™language. For localized versions of SQL Server™, the Alas property is an English name for the language record. For all other versions, Alias is the localized language name.

string Caption
  Access Type: Read-only
  A short textual description (one-line string) of the MSSQL_LanguageSetting object.
  Maximum Length: 64 string Description
  Access Type: Read-only
  A textual description of the MSSQL_LanguageSetting object.

uint32 FirstDayOfWeek
  Access Type: Read-only
  The FirstDayOfWeek property returns the calendar start day of the week for a language record. A SQL Server™ language record records the names of the days of the week localized to the language. To enable system selection of the correct day name, the day name string is stored so that the localized name for Monday appears first. For some locales, Monday is not the starting calendar weekday.

string LangDateFormat
  Access Type: Read-only
  The LangDateFormat property is a three-character string describing the position of the day, month, and year members of a date. The LangDateFormat property reports day, month, and year positions using the characters d, m, and y respectively. For example, a SQL Server™ language displaying dates in month/day/year order reports "mdy" in the LangDateFormat property.

[key] string SettingID
  Access Type: Read-only
  The identifier by which the MSSQL_LanguageSetting object is known.
  Maximum Length: 256

[key] string SQLServerName
  Access Type: Read-only
  The SQLServerName property indicates the name of the SQL Server™ installation that the object is a part of.
  Maximum Length: 128 string Days [ ]
  Access Type: Read-only
  The Days property identifies the names of the days of the week for a SQL Server™ language record. The Days property string array contains seven members. The first member is the day name for Monday. The locale start of the calendar week is set using the FirstDayOfWeek property. For example, the string array "Montag, Dienstag, Mittwoch, Donnerstag, Freitag, Samstag, Sonntag" is the Days property for the German (Deutsch) language record. For the language record, the FirstDayOfWeek property is 1, indicating that Monday (Montag) is the start of the calendar week.

string Months [ ]
  Access Type: Read-only
  The Months property returns an array containing unabbreviated month names. The month names are ordered, beginning with January and ending with December.

string ShortMonths [ ]
  Access Type: Read-only
  The ShortMonths property returns an array containing a list of month name abbreviations for a language. The list is ordered from month 1 (January) through month 12 (December). Month names ae represented as a three-character abbreviation.

Associations
  MSSQL_LanguageSetting is associated to MSSQL_SQLServer as the Setting property of the MSSQL_SQLServerLanguageSetting association.

MSSQL_Login: MSSQL_DBMSUserObject
  The MSSQL_Login class represents the login authentication records present in a SQL Server™ installation.

Properties string Caption
  Access Type: Read-only
  The Caption property is a short textual description (one-line string) of the object.
  Maximum Length: 64 boolean DenyNTLogin
  Access Type: Read/Write
  The DenyNTLogin property indicates the ability to access to a SQL Server™ installation for login records identifying Windows NT users or groups. When True, any Windows NT authenticated connection attempt specifying the user or group name fails authentication. When False, the Windows NT user or group is allowed access to the SQL Server™ installation on which the login is defined. Use DenyNTLogin to specifically deny access to Windows NT users and groups.

string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

string Language
   Access Type: Read/Write
   The Language property indicates the language used for a client connection using the login.

[key] string Name
   Access Type: Read-only
   The Name property defines the label by which the object is known. In order to use Windows NT authentication, the name of the login must be a valid NT account name in the form ServerNameUserName.

[key] string SQLServerName
   Access Type: Read-only
   The SQLServerName property indicates the name of the SQL Server™ installation that the object is a part of.
   Maximum Length: 128 string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.
   Values are: "OK", "Error", "Degraded", "Unknown", "Pred Fair", "Starting", "Stopping", "Service"
   Maximum Length: 10 boolean SystemObject
   Access Type: Read-only
   The SystemObject property indicates whether the object is owned by Microsoft®. A value of True indicates that the object implementation is owned by Microsoft®.

uint32 Type
   Access Type: Read/Write
   The Type property indicates the type of authentication used. The authentication can be NT authentication, or SQL Server™ authentication. For NT authentication, the login can use the name of a user or a group.

| Value | Description |
| --- | --- |
| 0 | Other NT User Authentication |
| 1 | NT Group Authentication |
| 2 | SQL Server ™ Authentication |

Methods
   The MSSQL_Login class supports the following methods:

| Method Name | Description |
| --- | --- |
| GetUserName | The GetUserName method returns the database user used by the referenced login, when a connection using that login accesses the specified database. |
| SetPassword | The SetPassword method is used to set the password for a login that uses SQL Server ™ authentication. |

Associations
   MSSQL_Login is associated to MSSQL_SQLServer as the ScopedElement property of the MSSQL_SQLServerLogin association.
   MSSQL_Login is associated to MSSQL_SQLServerRole as the Dependent property of the MSSQL_MemberLogin association.
   MSSQL_Login is associated to MSSQL_Database as the Antecedent property of the MSSQL_LoginDefaultDatabase association.
   MSSQL_Login is associated to Win32 UserAccount as the Dependent property of the MSSQL_LoginWin32UserAccount association.
   MSSQL_Login is associated to MSSQL_Database as the Antecedent property of the MSSQL_DatabaseOwnerLogin association.
   MSSQL_Login is associated to MSSQL_User as the Antecedent property of the MSSQL_UserLogin association.
   MSSQL_Login is associated to Win32 Group as the Dependent property of the MSSQL_LoginWin32Group association.
   MSSQL_Login is associated to MSSQL_Database as the Containee property of the MSSQL_DatabaseLogin association.

MSSQL_LoginDefaultDatabase: CIM Dependency
   Association Class
   The MSSQL_LoginDefaultDatabase class represents an association between a login and the default database for the login.

References

[key] MSSQL_Login Antecedent
   Access Type: Read-only
   The Antecedent property references a SQL Server™ login record.

[key] MSSQL_Database Dependent
   Access Type: Read-only
   The Dependent property references the default database to connect to for the login referenced by the Antecedent property.

MSSQL_LoginWin32Group: CIM_Dependency
   Association Class
   The MSSQL_LoginWin32Group class represents an association between a login and the Win32 user group used for authentication by the login.

References

[key] Win32 Group Antecedent
   Access Type: Read-only
   The Antecedent property references the Win32 user group used for authenticating the login referenced by the Dependent property.

[key] MSSQL_Login Dependent
   Access Type: Read-only
   The Dependent property references a SQL Server™ login record.

MSSQL_LoginWin32UserAccount: CIM_Dependency
   Association Class
   The MSSQL_LoginWin32UserAccount class represents an association between a login and the Win32 user account used for authentication by the login.

References

[key] Win32-UserAccount Antecedent
   Access Type: Read-only The Antecedent property references the Win32 user account used for authenticating the login referenced by the Dependent property.

[key] MSSQL_Login Dependent
   Access Type: Read-only
   The Dependent property references a SQL Server™ login record.

MSSQL_MediaHeader
   Abstract Class
   The MSSQL_MediaHeader class represents the contents of the header record on a media. The instances of this class are returned as results of the ReadMediaHeader method on the MSSQL_BackupDevice class. A database backup performed by Microsoft® SQL Server™ can target multiple devices of a single type and can span multiple media maintained by the device. To organize media used in backup, SQL Server™ defines the media set and media family. A media label, or header record, maintains data about a media's location within a media set and media family.

Properties datetime CreateDate
   Access Type: Read-only
   The CreateDate property indicates the time and date on which the media header was created. Note that creation date may be different from the install date in cases where the object is created in one place and then installed elsewhere.

uint32 FamilyCount
   Access Type: Read-only
   The FamilyCount property indicates the number of families within the media set.

uint32 FamilySequenceNumber
   Access Type: Read-only
   The FamilySequenceNumber property indicates the ordinal position of the family within the entire media set.

string MediaDescription
   Access Type: Read-only
   The MediaDescription gives a text description of the media.

string MediaFamilyId
   Access Type: Read-only
   The MediaFamilyId indicates the system generated unique identifier for the media family.

boolean MediaLabelPresent
   Access Type: Read-only
   The MediaDescription property indicates whether the media has a label present. If TRUE, the media has a label. If FALSE, the media has no label.

string MediaName
   Access Type: Read-only
   The MediaName property indicates the name of the media.

uint32 MediaSequenceNumber
   Access Type: Read-only
   The MediaSequenceNumber property indicates the ordinal position of the media within its family.

string MediaSetId
   Access Type: Read-only
   The MediaSetId property indicates a system generated unique identifier for the media set. NULL when the media contains only a single media set.

string SoftwareName
   Access Type: Read-only
   The SoftwareName property indicates the name of the product creating the media header.

string SoftwareVendorId
   Access Type: Read-only
   The SoftwareVendorId property indicates the unique identifier of the manufacturer of the product creating the media header.

MSSQL_MemberDatabaseRole: CIM_Dependency
   Association Class
   The MSSQL_MemberDatabaseRole class associates two database roles, one being a member of the other.

References

[key] MSSQL_DatabaseRole Antecedent
   Access Type: Read/Write
   This property is a reference to the database role that contains the member.

[key] MSSQL_DatabaseRole Dependent
   Access Type: Read/Write
   This property is a reference to the database role that is the member.

MSSQL_MemberLogin: CIM-Dependency
   Association Class
   The MSSQL_MemberLogin class represents an association between a SQL Server™ role and a login that is a member of the role.

References

[key] MSSQL_SQLServerRole Antecedent
   Access Type: Read/Write
   The Antecedent property references a SQL Server™ role.

[key] MSSQL_Login Dependent
   Access Type: Read/Write
   The Dependent property references a login record that is a member of the SQL Server™ role referenced by the Antecedent property.

MSSQL_MemberUser: CIM Dependency
   Association Class
   The MSSQL_MemberUser class represents an association between a database role and a user that is a member of the role.

References

[key] MSSQL_DatabaseRole Antecedent
   Access Type: Read-only
   The Antecedent property references a database role.

[key] MSSQL_User Dependent
   Access Type: Read-only

The Antecedent property references the Win32 user that is a member of the database role referenced by the Dependent property.

MSSQL_MethodRtnVal

Abstract Class

The MSSQL_MethodRtnVal class is an object returned by many methods available with the WMI SQL Server™ Administration provider. The object contains information about the success or failure of the API the provider called within SQL Server™ to execute the method. This information is separate from the success or failure results of the WMI API called by the client application.

Given this information, it is possible for the calling application to determine, if a method call fails, whether the failure occurred in the provider or in SQL Server™ and the reason for the failure. The calling application should always check the ReturnValue property of this object after executing a method to verify success.

Properties string Description

Access Type: Read-only

The Description property contains a textual description of the error code reported in the ReturnValue property.

uint32 ReturnValue

Access Type: Read-only

The ReturnValue property reports the success or failure of the method execution within SQL Server™. ReturnValue will contain 0 if the method was executed successfully. If an error occurred, the error reported by the SQL Server™ API that was called will be returned.

string Source

Access Type: Read-only

The Source property contains a string reporting which subsystem within SQL Server™ returned the error.

MSSQL_Permission

Abstract Class

Association Class

The MSSQL_Permission class represents the permissions granted or denied to a user object, for access to a database object. The instances of this class represent only the permission that has been explicitly granted or denied to the user object. For example, if a user has permissions to access a table by virtue of being a member of a certain database role, then there will not be a permission association instance between the user and the table.

Properties boolean Granted

Access Type: Read-only

The Granted property indicates whether the permission has been granted or denied. A value of True indicates that the permission has been granted. A value of False indicates that permission has been denied.

uint32 PrivilegeType

Access Type: Read-only

The PrivilegeType property indicates the type of privilege that has been granted or denied.

| Value | Description |
| --- | --- |
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

MSSQL_DBMSObject Element

Access Type: Read-only

The Element property references a database object such as a database or a table for which the permission are defined.

MSSQL_DBMSUserObject Grantee

Access Type: Read-only

The Grantee property references a database user object such as a user or a login for whom the permissions are defined.

MSSQL_PrimaryKey: MSSQL_CandidateKey

The MSSQL_PrimaryKey class represents a primary key of a table. A primary key must also be a candidate key of the table.

Properties string Caption

Access Type: Read-only

The Caption property is a short textual description (one-line string) of the object.

Maximum Length: 64 boolean Clustered

Access Type: Read-only

The Clustered property indicates whether a clustered index has been used for the primary key. Clustered indexes sort and store the data rows in the table based on their key values. Non-clustered indexes have a structure that is completely separate from the data rows.

[key] string DatabaseName

Access Type: Read-only

The DatabaseName property indicates the name of he database that the key is a part of.

Maximum Length: 128 string Description

Access Type: Read-only

The Description property provides a textual description of the object.

sint32 FillFactor

Access Type: Read-only

The FillFactor property indicates the percent of each page used to store index data when the index for the key is created.

datetime InstallDate

Access Type: Read-only

The InstallDate property is datetime value indicating when the object was installed. A lack of a value does not indicate that the object is not installed.

[key] string Name
Access Type: Read-only
The Name property defines the label by which the object is known. The name of a key is unique within a database.

[key] string SQLServerName
Access Type: Read-only
The SQLServerName property indicates the name of the SQL Server™ installation that the key is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.
Values are: "OK", "Error", "Degraded", "Unknown", "Pred Fail", "Starting", "Stopping", "Service"
Maximum Length: 10

[key] string TableName
Access Type: Read-only
The TableName property indicates the name of the table that the key is defined in.
Maximum Length: 128

Methods
The MSSQL_PrimaryKey class supports the following methods:

| Method Name | Description |
| --- | --- |
| Create | The Create method is used to create a new primary key instance. |
| RebuildIndex | The RebuildIndex method re-creates an index for a candidate key constraint. |
| Rename | The Rename method is used to rename a primary key instance. |

MSSQL_Process: CIM_Process
The MSSQL_Process class represents SQL Server processes. Note that these are not the same as an operating system's notion of a process. These are the processes identified by the SQL Server™ and assigned a SQL Server™ process ID by SQL Server.

Properties uint32 BlockedProcessID
Access Type: Read-only
The BlockedProcessID property represents the id of a process that is being blocked by the process.

string Caption
Access Type: Read-only
The Caption property is a short textual description (one-line string) of the object.
Maximum Length: 64 string ClientName
Access Type: Read-only
The ClientName property indicates the name of the client application that started the SQL Server™ process.

string Command
Access Type: Read-only
The Command property indicates the abbreviated indicator of current command. When no command is current, it has a value of AWAITING COMMAND.

uint32 CPUTime
Access Type: Read-only
The CPUTime property indicates the cumulative CPU usage time of the process.

string CreationClassName
Access Type: Read-only
The inherited CreationClassName property indicates the name of the class or the subclass used in the creation of an instance. When used with the other key properties of this class, this property allows all instances of this class and its subclasses to be uniquely identified.

datetime CreationDate
Access Type: Read-only
Time that the process began executing string CSCreationClassName
Access Type: Read-only
The inherited CSCreationClassName property is a string indicating the class of the computer system.

string CSName
Access Type: Read-only
The inherited CSName property is a string indicating the name of the computer system.

string DatabaseName
Access Type: Read-only
The DatabaseName property represents the database that is currently being used by the process.

string Description
Access Type: Read-only
The Description property provides a textual description of the object.

uint16 ExecutionState
Access Type: Read-only
Indicates the current operating condition of the process.

| Value | Description |
| --- | --- |
| 0 | Unknown |
| 1 | Other |
| 2 | Ready |
| 3 | Running |
| 4 | Blocked |
| 5 | Suspended Blocked |
| 6 | Suspended Ready |

[key] string Handle
Access Type: Read-only
A string used to identify the process. A process ID is a process handle.

string HostName
Access Type: Read-only
The HostName property indicates the name of the client workstation that started the SQL Server™ process.

datetime InstallDate
    Access Type: Read-only
    The InstallDate property is datetime value indicating when the object was installed. A lack of a value does not indicate that the object is not installed.

uint64 KernelModeTime
    Access Type: Read-only
    Time in kernel mode, in milliseconds. If this information is not available, a value of 0 should be used.
    Units: Milliseconds string Login
    Access Type: Read-only
    The Login property represents the login used by the process to connect to SQL Server™.

uint32 MemoryUsage
    Access Type: Read-only
    The MemoryUsage property indicates the number of pages in the procedure cache that are currently allocated to this process. A negative number indicates that the process is freeing memory allocated by another process.

string Name
    Access Type: Read-only
    The Name property defines the label by which the object is known.

string OSCreationClassName
    Access Type: Read-only
    The inherited OSCreationClassName property indicates the name of the class or the subclass used in the creation of an instance. When used with the other key properties of this class, this property allows all instances of this class and its subclasses to be uniquely identified.

string OSName
    Access Type: Read-only
    The inherited OSName property serves as key of an operating system instance within a computer system.

uint32 Priority
    Access Type: Read-only
    Priority indicates the urgency or importance of execution of a process. If a priority is not defined for a process, a value of 0 should be used.

[key] string SQLServerName
    Access Type: Read-only
    The SQLServerName property indicates the name of the SQL Server™ installation in which the process exists.
    Maximum Length: 128 string State
    Access Type: Read-only
    The State property indicates whether the process is running or sleeping.

string Status
    Access Type: Read-only
    The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
    Values are: "OK", "Error", "Degraded", "Unknown", "Pred Fail", "Starting", "Stopping", "Service"
    Maximum Length: 10 datetime TerminationDate
    Access Type: Read-only
    Time that the process was stopped or terminated.

uint64 UserModeTime
    Access Type: Read-only
    Time in user mode, in milliseconds. If this information is not available, a value of 0 should be used.
    Units: Milliseconds uint64 WorkingSetSize
    Access Type: Read-only
    The amount of memory in bytes that a process needs to execute efficiently, for an operating system that uses page-based memory management. If an insufficient amount of memory is available (<working set size), thrashing will occur. If this information is not known, NULL or 0 should be entered. If this data is provided, it could be monitored to understand a process' changing memory requirements as execution proceeds.
    Units: Bytes Methods
    The MSSQL_Process class supports the following methods:

| Method Name | Description |
| --- | --- |
| ProcessInputBuffer | The ProcessInputBuffer method returns the contents of the memory used by a Microsoft ® SQL Server ™ process for input. |
| ProcessOutputBuffer | The ProcessOutputBuffer method returns the contents of the memory used by a Microsoft ® SQL Server ™ process for output. |

MSSQL_ProviderStatus: _ExtendedStatus
    Abstract Class
    The MSSQL_ProviderStatus class represents the error status information returned by the WMI SQL Server™ Administration provider.

Properties string Description
    Access Type: Read-only
    The Description property contains a textual description of the returned status information.

string Object
    Access Type: Read-only
    The Object property indicates the object that the provider was working on when the failure occurred.

string Operation
    Access Type: Read-only
    The Operation property indicates the operation that the provider was performing on when the failure occurred.

string ParameterInfo
    Access Type: Read-only
    The ParameterInfo property identifies one or more parameters that were involved in the error or status change.

string Property
   Access Type: Read-only
   The Property property indicates the property that the provider was working on when the failure occurred.

string ProviderName
   Access Type: Read-only
   The ProviderName property identifies the provider that caused or reported the error or status change. If a provider was not involved, this string is set to "Windows Management".

string Routine
   Access Type: Read-only
   The Routine property indicates the routine in which the failure occurred.

string Source
   Access Type: Read-only
   The Source property indicates the COM source for the error.

uint32 StatusCode
   Access Type: Read-only
   The StatusCode property contains an error or information code for an operation. This can be any user-defined code, but the value 0 is usually reserved to indicate success.

MSSQL_ReferencedKey: CIM_Dependency
   Association Class
   The MSSQL_ReferencedKey class represents an association between a foreign key and the candidate key that the foreign key references.

References

[key] MSSQL_CandidateKey Antecedent
   Access Type: Read-only
   The Antecedent property references a candidate key in the SQL Server™ database.

[key] MSSQL_ForeignKey Dependent
   Access Type: Read-only
   The Dependent property references a foreign key that references the candidate key referenced by the Antecedent property.

MSSQL_ReferencedTable: CIM_Dependency
   Association Class
   The MSSQL_ReferencedTable class represents an association between a foreign key and the table that contains the primary key referenced by the foreign key.

References

[key] MSSQL_Table Antecedent
   Access Type: Read-only
   The Antecedent property references a table in the SQL Server™ database.

[key] MSSQL_ForeignKey Dependent
   Access Type: Read-only
   The Dependent property references a foreign key that references a candidate key contained in the table referenced by the Antecedent property.

MSSQL_RegistrySetting: MSSQL_Setting
   The MSSQL_RegistrySetting class represents the installation and run-time parameters of SQL Server™ stored in the registry.

Properties string ADSP
   Access Type: Read-only
   The ADSP property specifies an AppleTalk (ADSP) service object name on a computer running Microsoft® SQL Server™.

string AgentLogFile
   Access Type: Read/Write
   The AgentLogFile property specifies the path and file name for the SQL Server™ Agent log.

boolean AutostartDTC
   Access Type: Read/Write
   The AutostartDTC property controls Microsoft) Distributed Transaction Coordinator service (MSDTC) behavior on computer start. If TRUE, the MSDTC service is started when the computer starts. If FALSE, the MSDTC service must be started manually.

boolean AutostartLicensing
   Access Type: Read/Write
   The AutostartLicensing property indicates the license logging service behavior for Microsoft® SQL Server™. If TRUE, the license logging service is started when SQL Server™ starts. If FALSE, license logging must be started manually.

boolean AutoStartMail
   Access Type: Read/Write
   The AutoStartMail property indicates whether the post office is stared automatically when SQL Server™ starts. If TRUE, an attempt to start the SQL Server™ workgroup post office is made when SQL Server™ starts. If FALSE, no attempt is made to start the post office when SQL Server starts. SQL Server™ mail has to be started manually.

string BackupDirectory
   Access Type: Read/Write
   The BackupDirectory property specifies the backup directory.

string Caption
   Access Type: Read-only
   A short textual description (one-line string) of the MSSQL_RegistrySetting object.
   Maximum Length: 64 boolean CaseSensitive
   Access Type: Read-only
   The CaseSensitive property indicates the comparison method for multibyte character data is case sensitive or not. If TRUE, a character comparison for equality and order is case-sensitive. For example, A is less than a. If FALSE, character comparison for equality and order is not case-sensitive.

string CharacterSet
   Access Type: Read-only
   The CharacterSet property identifies the code page used by the Microsoft® SQL Server™ installation to interpret multibyte character data.

string Description
   Access Type: Read-only
   A textual description of the MSSQL_RegistrySetting object.

string ErrorLogPath
   Access Type: Read/Write
   The ErrorLogPath property specifies the operating system path and file name to be used for the Microsoft® SQL Server™ error log. The value of ErrorLogPath by itself is not the name of the operating system file. SQL Server™ appends an integer to the value specified by ErrorLogPath, as an extension to indicate the current error log file.

string MailAccountName
    Access Type: Read/Write
    The MailAccountName property specifies the Microsoft® Exchange client account used by SQL Mail.

string MailPassword
    Access Type: Read/Write
    The MailPassword property specifies the Microsoft® Exchange client account password for SQL Mail.

string MasterDBPath
    Access Type: Read/Write
    The MasterDBPath property specifies the full path and file name of the operating system file containing the master database.
    string NP
    Access Type: Read-only
    The NP property specifies the pipe name when using named pipe protocol on an instance of Microsoft® SQL Server.

boolean NTEventLogging
    Access Type: Read-only
    The NTEventLogging property specifies whether Microsoft® SQL Server™ uses the Microsoft® Windows NT application log. If TRUE, SQL Server™ sends all events to the Windows NT application log and the SQL Server™ error log. If FALSE, SQL Server™ sends events only to the SQL Server error log.

sint32 NumberOfProcessors
    Access Type: Read-only
    The NumberOfProcessors property returns the number of computer processing units (CPUs) available to Microsoft) SQL Server™ on the server.

uint32 PerfMonMode
    Access Type: Read/Write
    The PerfMonMode property controls Windows NT Performance Monitor polling behavior when the monitor is launched. A value of Continuous indicates that performance monitor polls for statistics using the operating system default time slice. A value of On Demand indicates that performance monitor polls for statistics when directed to do so by the user.

| Value | Description |
|---|---|
| 0 | Continuous |
| 1 | On Demand | string RegisteredOrganization
    Access Type: Read-only
    The RegisteredOrganization property returns the company name supplied by the installer during Microsoft® SQL Server™ installation.

string RegisteredOwner
    Access Type: Read-only
    The RegisteredOwner property returns the installer name supplied during Microsoft® SQL Server™ installation.

boolean ReplicationInstalled
    Access Type: Read-only
    The ReplicationInstalled property returns TRUE when components supporting replication are installed on a server running Microsoft® SQL Server™.

boolean RPCencrypt
    Access Type: Read-only
    The RpcEncrypt property specifies whether Microsoft®® Windows NT® RPC encryption is enabled (using the Multiprotocol Net-Library) on a computer running Microsoft® SQL Server™.

string RPClist
    Access Type: Read-only
    The RpcList property returns a Microsoft® Windows NT RPC protocol list.

uint32 RPCmaxCalls
    Access Type: Read-only
    The RpcMaxCalls property specifies the maximum number of Microsoft® Windows NT RPC connections that can be active.

uint32 RPCminCalls
    Access Type: Read-only
    The RpcMinCalls property specifies the maximum number of Microsoft® Windows NT RPC connections that can be active.

[key] string SettingID
    Access Type: Read-only
    The identifier by which the object is known.
    Maximum Length: 256 boolean SNMP
    Access Type: Read-only
    The SNMP property indicates whether Simple Network Management Protocol (SNMP) is installed on an instance of Microsoft® SQL Server™.

string SNMPCurrentVersion
    Access Type: Read-only
    The SNMPCurrentVersion property specifies the version of Simple Network Management Protocol (SNMP) currently installed on an instance of Microsoft® SQL Server™.

string SNMPExtensionAgentsData
    Access Type: Read-only
    The SNMPExtensionAgentsData property retrieves or sets the value of the SNMPExtensionAgents property. To set the SNMPExtensionAgentsData property, you must be a member of the sysadmin fixed server role.

string SortOrder
    Access Type: Read-only
    The SortOrder property returns a string describing the character set used and ordering applied for a Microsoft® SQL Server™ installation.

boolean SpxFlag
    Access Type: Read-only
    The SpxFlag property indicates whether an NWLink IPX/SPX flag is set on an instance of Microsoft® SQL Server™.

uint32 SpxPort
    Access Type: Read-only
    The SpxPort property specifies the NWLink IPX/SPX port number on an instance of Microsoft® SQL Server™.

string SpxServiceName
    Access Type: Read-only
    The SpxServiceName property specifies the name of the NWLink IPX/SPX service on an instance of Microsoft® SQL Server.

string SQLDataRoot
    Access Type: Read/Write
    The SQLDataRoot property identifies the default operating-system directory implementing storage for Microsoft® SQL Server™ system user-defined databases.

string SQLRootPath
    Access Type: Read/Write
    The SQLRootPath property identifies the operating system directory specified as the root directory for Microsoft® SQL Server™ installation.

boolean SuperSocketEncrypt
    Access Type: Read-only
    The SuperSocketEncrypt property specifies whether Super Sockets Net-Library encryption is enabled on an instance of Microsoft® SQL Server™.
    SQL Server™ 2000 only string SuperSocketList [ ]
    Access Type: Read-only
    The SuperSocketList property returns a super socket protocol list.
    SQL Server™ 2000 only sint32 TapeLoadWaitTime
    Access Type: Read/Write
    The TapeLoadWaitTime property specifies a number of minutes a Microsoft® SQL Server™ backup or restore operation will wait, before timing out, when trying to write to or read from an indicated tape media. A value of −1 indicates that the backup or restore operation will not time out. A value of 0 indicates that the backup or restore operation will attempt to access the tape device exactly one time. Any positive integer indicates the number of minutes for which the backup or restore operation will attempt to access the tape device.

boolean TcpFlag
    Access Type: Read-only
    The TcpFlag property specifies whether the TCP/IP Sockets Net Libraries hide flag is set on a computer running an instance of Microsoft® SQL Server™.
    SQL Server™ 2000 only string TcpPort
    Access Type: Read/Write
    The TcpPort property specifies the TCP/IP Sockets Net-Libraries port number on an instance of Microsoft® SQL Server.
    SQL Server™ 2000 only string VinesGroupName
    Access Type: Read-only
    The VinesGroupName property specifies the Banyan Vines Net-Library group name on a computer running Microsoft) SQL Server™.
    SQL Server™ 2000 only string VinesItemName
    Access Type: Read-only
    The VinesItemName property specifies the Banyan Vines Net-Library item name on a computer running Microsoft® SQL Serve™.
    SQL Server™ 2000 only string VinesOrgName
    Access Type: Read-only
    The VinesOrgName property specifies the Banyan Vines Net-Library organization name on a computer running Microsoft® SQL Server™.
    SQL Server™ 2000 only string WSProxyAddress
    Access Type: Read-only
    The WSProxyAddress property specifies the WinSock proxy server address on a computer running Microsoft® SQL Server™.
    SQL Server™ 2000 only uint32 WSProxyPort
    Access Type: Read-only
    The WSProxyPort property specifies the WinSock proxy server port number on a computer running Microsoft® SQL Server.
    SQL Server™ 2000 only Associations
    MSSQL_RegistrySetting is associated to MSSQL_SQLServer as the Setting property of the MSSQL_SQLServerRegistry association.

MSSQL_RestoreSetting: MSSQL_Setting
    The MSSQL_RestoreSetting class is used to specify the behavior of a restore operation for a SQL Server database or log. The class is also used to specify the behavior of the verify operation for a SQL Server backup. An instance of this class is passed as an argument to the SQLRestore method and the SQLVerify method of the MSSQL_SQLServer class.

Properties string BackupDevice [ ]
    Access Type: Read/Write
    The BackupDevice property specifies one or more backup devices used as a database restore source. Only one medium type can be specified for any restore operation, but multiple media may be specified. Set the BackupDevice property to specify one or more SQL Server™ backup devices as the backup medium.

string BackupSetName
    Access Type: Read/Write
    The BackupSetName property identifies a unit of backup work. The BackupSetName property value is limited to 128 characters.
    Maximum Length: 128 string Caption
    Access Type: Read-only
    A short textual description (one-line string) of the setting object.
    Maximum Length: 64 string DatabaseFiles [ ]
    Access Type: Read/Write
    The DatabaseFiles property identifies operating system files storing table or index data as targets of a restore operation. Setting DatabaseFiles directs restore processing to include only those operating system files listed. To specify an operating system file, use its logical name as visible to SQL Server™, not its physical CT operating system name.

string DatabaseFileGroups [ ]
    Access Type: Read/Write
    The DatabaseFileGroups property identifies filegroups targeted by a restore operation.

string DatabaseName
    Access Type: Read/Write
    The DatabaseName identifies the target database for a restore. The property is a required element and must be set prior to calling the SQLRestore method of the MSSQL_SQLServer class.

string Description
    Access Type: Read-only
    A textual description of the object.

uint32 FileNumber
    Access Type: Read/Write

The FileNumber property identifies a backup set by ordinal location on the backup medium.

boolean LastRestore
  Access Type: Read/Write
  The LastRestore property identifies the last transaction log unit in a chain of log backups. When more than one log unit exists for restoration, it is imperative that the administrator specify that more than one log unit will be restored. After SQL Server™ processes the last log unit in the chain, no log backups made after that unit can be applied. Set the LastRestore property to False when restoring a backup unit that is not the last in a backup chain. Set the LastRestore property to TRUE when restoring a backup unit that is the last in the chain.

boolean LoadHistory
  Access Type: Read/Write
  The LoadHistory property controls the behavior of the operation that verifies the integrity of a SQL Server backup. If TRUE, msdb backup history tables are updated with backup set data when the SQLVerify method of the MSSQL_SQLServer object directs backup set verification. If FALSE, history tables are not altered when SQLVerify is used.

string MediaName
  Access Type: Read/Write
  The MediaName property provides informative text to a id in identification of a backup set. Th e MediaName property is written to a tape media when the media is initialized.

string RelocateFile [ ]
  Access Type: Read/Write
  The RelocateFile property specifies database logical file names and operating system physical file names used to redirect database storage when a SQL Server™ database is restored to a new physical location.

boolean ReplaceDatabase
  Access Type: Read/Write
  The ReplaceDatabase property directs a restore operation when a new image of the restored database is needed. If True, anew image of the database is created. The image is created regardless of the presence of an existing database with the same name. If False (default), a new image of the database is not created by the restore operation. The database targeted by the restore operation must exist on the Microsoft® SQL Server™ installation.

boolean Restart
  Access Type: Read/Write
  The Restart property controls restore operation behavior when the restore operation specified by the object was started and interrupted. If TRUE, Microsoft® SQL Server™ attempts to continue processing on a partial backup or restore operation. If FALSE, SQL Server™ restarts an interrupted backup or restore operation at the beginning of the backup set.

datetime RestoreTillTime
  Access Type: Read/Write
  The RestoreTillTime property sets an end-point for database log restoration. The RestoreTillTime setting is evaluated only when restoring to recover a database transaction log.

[key] string SettingID
  Access Type: Read/Write
  The identifier by which the object is known.
  Maximum Length: 256

[key] string SQLServerName
  Access Type: Read/Write
  The SQLServerName property indicates the name of the SQL Server™ installation that the object is a part of.
  Maximum Length: 128 string StandbyFile
  Access Type: Read/Write
  The StandbyFile property specifies the name of an undo file used as part of a SQL Server™ installation imaging strategy.

uint32 TargetType
  Access Type: Read/Write
  The TargetType property controls the type of restore operation to be performed. SQL Server can restore a database, one or more operating system files containing table or index data, or part or all of the transaction log of a database. The value of the TargetType property determines applicability and interpretation of related MSSQL_RestoreSetting object properties. For example, when TargetType is Files, either the DatabaseFileGroups or DatabaseFiles property must specify filegroups or files to be restored.

| Value | Description | Explanation |
| --- | --- | --- |
| 0 | Database | Restore the entire database. |
| 1 | Files | Restore only specified files. |
| 2 | Logs | Restore only the database transaction log. | boolean UnloadTapeAfter
  Access Type: Read/Write
  The UnloadTapeAfter property controls tape media handling on completion of a restore operation. If TRUE, the tape media in the tape device(s) is rewound and unloaded when the operation completes. If FALSE (default), non-attempt is made to rewind and unload the tape media.

MSSQL_Role: MSSQL_DBMSUserObject
  Abstract Class
  The MSSQL_Role class represents a database role or a SQL Server role. Roles are used to establish groups of users with similar security attributes. Permissions can be granted by role, simplifying security planning and administration.

Properties string Caption
  Access Type: Read-only
  The Caption property is a short textual description (one-line string) of the object.
  Maximum Length: 64 string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

string Name
  Access Type: Read-only
  The Name property defines the label by which the object is known. When subclassed, the Name property can be overridden to be a Key property.

string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
Values are: "OK", "Error", "Degraded", "Unknown", "Pred Fail", "Starting", "Stopping", "Service"
Maximum Length: 10

MSSQL_Rule: MSSQL_Constraint

The MSSQL_Rule class represents a single Microsoft® SQL Server™ data integrity rule. SQL Server™ offers several mechanisms for ensuring data integrity. A SQL Server™ rule is a TransactSQL condition_expression syntax element that defines a data-integrity constraint. A rule can be bound to a column or user-defined data type.

Properties string Caption
Access Type: Read-only
The Caption property is a short textual description (one-line string) of the object.
Maximum Length: 64 datetime CreateDate
Access Type: Read-only
The CreateDate property indicates the time and date on which the rule was created. Note that creation date may be different from the install date in cases where the object is created in one place and then installed elsewhere.

[key] string DatabaseName
Access Type: Read-only
The DatabaseName property indicates the name of the database that the object is a part of.
Maximum Length: 128 string Description
Access Type: Read-only
The Description property provides a textual description of the object.

datetime InstallDate
Access Type: Read-only
The InstallDate property is datetime value indicating when the object was installed. A lack of a value does not indicate that the object is not installed.

[key] string Name
Access Type: Read-only
The Name property defines the label by which the object is known.

[key] string SQLServerName
Access Type: Read-only
The SQLServerName property indicates the name of the SQL Server™ installation that the rule is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
Values are: "OK", "Error", "Degraded", "Unknown", "Pred Fail", "Starting", "Stopping", "Service"
Maximum Length: 10 string Text
Access Type: Read/Write
The Text property indicates the Transact-SQL script validating data integrity for the columns bound by the rule. Note that there is a special requirement for the name of the object is specified in the CREATE statement. The name of the object has to be in the form that includes the name of the owner. For example, in order to create an object named "Some Object", one would need to specify it as [dbo].[Some Object].

Methods

The MSSQL_Rule class supports the following methods:

| Method Name | Description |
| --- | --- |
| Rename | The Rename method is used to rename a rule instance. |

Associations

MSSQL_Rule is associated to MSSQL_Database as the ScopedElement property of the MSSQL_DatabaseRule association.

MSSQL_Rule is associated to MSSQL_Column as the Antecedent property of the MSSQL_ColumnRule association.

MSSQL_Rule is associated to MSSQL_UserDatatype as the Antecedent property of the MSSQL_UserDatatypeRule association.

MSSQL_Scope
Abstract Class
Association Class
The MSSQL_Scope class represents an association between a two logical elements, where one is scoped within the other. Scope implies that the name of the scoped element has to be unique within the scope of the scoping element.

References

CIM_LogicalElement ScopedElement
Access Type: Read-only
The ScopedElement references the logical element that is scoped within the element referenced by the ScopingElement.

CIM_LogicalElement ScopingElement
Access Type: Read-only
The ScopingElement references the logical element that acts as the scope for the element referenced by the ScopedElement.

MSSQL_Setting: CIM_Setting
Abstract Class

The MSSQL_Setting class represents the settings that are used to configure a SQL Server™ installation.

Properties string Caption
  Access Type: Read-only
  A short textual description (one-line string) of the setting object.
  Maximum Length: 64 string Description
  Access Type: Read-only
  A textual description of the setting object.

string SettingID
  Access Type: Read-only
  The identifier by which the setting object is known.
  Maximum Length: 256

MSSQL_SQLServer: CIM_LogicalElement
  The MSSQL_SQLServer class represents instances of Microsoft® SQL Server™.

Properties string Caption
  Access Type: Read-only
  The Caption property is a short textual description (one-line string) of the object.
  Maximum Length: 64 boolean Clustered
  Access Type: Read-only
  The Clustered property indicates whether the SQL Server™ installation is part of a cluster of SQL Server™ instances.

sint32 CodePage
  Access Type: Read-only
  The CodePage property returns the identifier of the character set used by the referenced Microsoft® SQL Server™ installation. A character set (code page) is used to interpret multibyte character data, determining character value, and therefore sort order. Code page settings apply only to multibyte character data, not to Unicode character data. A code page is chosen for a SQL Server™ installation during setup.

string Collation
  Access Type: Read-only
  The Collation property specifies the column-level collation of a string data type in the database. Collation is a read-only property, and is used to retrieve the current collation for string data types.

string Description
  Access Type: Read-only
  The Description property provides a textual description of the object.

boolean FullTextInstalled
  Access Type: Read-only
  The IsFullTextInstalled property returns TRUE when the Microsoft Search service has been successfully installed on an instance of Microsoft® SQL Server™.

datetime InstallDate
  Access Type: Read-only
  The InstallDate property is datetime value indicating when the object was installed. A lack of a value does not indicate that the object is not installed.

string Language
  Access Type: Read/Write
  The Language property indicates the language used by a server running Microsoft® SQL Server™. SQL Server™ language records direct display of error and status messages by choosing localized text for messages and localized formatting for date values. Set the Language property of the SQLServer object to alter the default language record used by all users on the referenced server.

[key] string Name
  Access Type: Read-only
  The Name property defines the label by which the object is known.

uint32 Package
  Access Type: Read-only
  The Package property is a long integer value identifying the Microsoft® SQL Server™ product installed on the referenced server running SQL Server™.

| Value | Description |
| --- | --- |
| 0 | Unknown |
| 1 | Office |
| 2 | Standard |
| 3 | Enterprise |
| 4 | Microsoft ® Data Engine | string Status
  Access Type: Read-only
  The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
  Values are: "OK", "Error", "Degraded", "Unknown", "Pred Fail", "Starting", "Stopping", "Service"
  Maximum Length: 10 string TrueLogin
  Access Type: Read-only
  The TrueLogin property indicates the name of the login used by the current connection. When a connection relies on Microsoft® Windows NT user or group name mapping for authentication, the TrueLogin property returns the SQL Server™ login used by the connection regardless of the login specified when the connection was established.

string TrueName
  Access Type: Read-only
  The TrueName property indicates the name of the SQL Server™ installation. By default, the SQL Server™ installation receives the network name of the server running SQL Server.

uint32 UserProfile
  Access Type: Read-only
  The UserProfile property returns a high-level role description for the login used by the current connection.

| Value | Description |
|---|---|
| 0 | No Privileges |
| 1 | System Administrator Privileges |
| 2 | Permission to Create Database |
| 4 | Permission to execute Extended Stored Procedures |
| 7 | All permissions | sint32 VersionMajor

Access Type: Read-only

The VersionMajor property returns the portion of a component version identifier to the left of the first decimal point in the identifier.

sint32 VersionMinor

Access Type: Read-only

The VersionMinor property returns the portion of a component version identifier to the right of the first decimal point in the identifier.

string VersionString

Access Type: Read-only

Version of the SQL Server. This is the value returned by the Microsoft® SQL Server™ scalar function @@VERSION.

Methods

The MSSQL_SQLServer class supports the following methods:

| Method Name | Description |
|---|---|
| AddStartParameter | The AddStartParameter method appends a Microsoft® SQL Server™ service startup option to those currently used by the service. |
| AttachDB | The AttachDB method makes a database visible to a Microsoft® SQL Server™ installation. |
| AttachDBWithSingleFile | The AttachDB WithSingleFile method makes a database visible to a Microsoft® SQL Server™ installation. |
| DetachDB | The DetachDB method makes a database invisible to a Microsoft® SQL Server™ installation. |
| ExecuteImmediate | The ExecuteImmediate method allows any SQL Server™ command to be executed, as long as the command doesn't return result sets. |
| KillDatabase | The KillDatabase method drops a database from the Microsoft® SQL Server™ installation referenced, regardless of the status or availability of the database. |
| KillProcess | The KillProcess method terminates the Microsoft® SQL Server™ process identified. |
| ListCollations | The ListCollations method returns all valid Microsoft® SQL Server™ collation names. |
| ServerLoginMode | The ServerLoginMode method returns the default login mode for the specified server. |
| SQLBackup | The SQLBackup method starts the backup operation for the SQL Server™ installation. |
| SQLRestore | The SQLRestore method starts the restore operation for the SQL Server™ installation. |
| SQLVerify | The SQLVerify method checks the backup media specified, ensuring that a backup set is readable and complete. |
| Start | The Start method starts the SQL Server™ service. |

-continued

| Method Name | Description |
|---|---|
| Stop | The Stop method halts execution of the SQL Server™ service immediately. |
| UnloadODSDLL | The UnloadODSDLL method frees a dynamic-link library (DLL) loaded into Microsoft® SQL Server™ memory. |

Associations

MSSQL_SQLServer is associated to MSSQL_Database as the GroupComponent property of the MSSQL_SQLServerDatabase association.

MSSQL_SQLServer is associated to MSSQL_IntegratedSecuritySetting as the Element property of the MSSQL_SQLServerIntegratedSecuritySetting association.

MSSQL_SQLServer is associated to MSSQL_Login as the ScopingElement property of the MSSQL_SQLServerLogin association.

MSSQL_SQLServer is associated to MSSQL_ConfigValue as the Element property of the MSSQL_SQLServerConfigValue association.

MSSQL_SQLServer is associated to MSSQL_SQLServerRole as the ScopingElement property of the MSSQL_SQLServerServerRole association.

MSSQL_SQLServer is associated to MSSQL_RegistrySetting as the Element property of the MSSQL_SQLServerRegistry association.

MSSQL_SQLServer is associated to MSSQL_SQLServerConnectionSetting as the Element property of the MSSQL_SQLServerSQLServerConnectionSetting association.

MSSQL_SQLServer is associated to MSSQL_BackupDevice as the Dependent property of the MSSQL_SQLServerBackupDevice association.

MSSQL_SQLServer is associated to MSSQL_LanguageSetting as the Element property of the MSSQL_SQLServerLanguageSetting association.

MSSQL_SQLServer is associated to MSSQL_ErrorLog as the Dependent property of the MSSQL_SQLServerErrorLog association.

MSSQL_SQLServer is associated to MSSQL_User as the Container property of the MSSQL_SQLServerUser association.

MSSQL_SQLServerBackupDevice: CIM_Dependency Association Class

The MSSQL_SQLServerBackupDevice class represents an association between a SQL Server™ installation and a backup device known to SQL Server™.

References

[key] MSSQL_BackupDevice Antecedent

Access Type: Read-only

The Antecedent property references a backup device known to SQL Server™.

[key] MSSQL_SQLServer Dependent

Access Type: Read-only

The Dependent property references a SQL Server™ installation.

MSSQL_SQLServerConfigValue: CIM_ElementSetting Association Class

The MSSQL_SQLServerConfigValue class represents an association between a SQL Server™ installation and the configured value settings for the installation.

References

[key] MSSQL_SQLServer Element
  Access Type: Read-only
  The Element property references a SQL Server™ installation.

[key] MSSQL_ConfigValue Setting
  Access Type: Read-only
  The Setting property references configuration settings far the SQL Server™ installation.

MSSQL_SQLServerConnectionSetting: MSSQL_Setting
  The MSSQL_SQLServerConnectionSetting class represents the default connection settings used by the WMI provider to connect to SQL DMD. These default settings are used by the WMI provider when the appropriate parameters in the WMI context object are not set. The settings are stored as static instances in the repository.

Properties boolean AnsiNulls
  Access Type: Read/Write
  The AnsiNulls property reports the NULL acceptance behavior for new columns. By default, SQL Server™ creates columns that do not accept NULL when the user does not explicitly declare the ability to accept NULL. Further, SQL Server™ returns TRUE when evaluating the expression NULL=NULL. These default behaviors are nonstandard. When AnsiNulls is TRUE, new columns accept NULL by default and any comparison of NULL to any other value, including NULL, returns NULL. The AnsiNulls property affects NULL handling behaviors for the user's connection only and overrides any database specific settings for column creation and NULL comparison.
  SQL Server™ Default value: FALSE string ApplicationName
  Access Type: Read/Write
  The ApplicationName property identifies the client application connected to Microsoft® SQL Server™. The ApplicationName property is visible on the SQL Server™ installation when tools such as SQL Server Profiler are used to investigate server activity.
  SQL Server™ Default value: A unique string generated by SQL Server™ boolean AutoReConnect
  Access Type: Read/Write
  The AutoReConnect property controls SQL Server™ behavior when the provider loses its connection to a SQL Server™ installation. If TRUE, the provider attempts to reconnect if it loses its connection at any time. If FALSE, the provider does not attempt to reconnect a lost connection.
  SQL Server™ Default value: TRUE sint32 BlockingTimeout
  Access Type: Read/Write
  The BlockingTimeout property specifies a timeout interval for resource requests that are blocked due to conflicting resource lock requests.
  Units: Milliseconds
  SQL Server™ Default value: 10000 (10 seconds)

string Caption
  Access Type: Read-only
  A short textual description (one-line string) of the object.
  Maximum Length: 64 string CommandTerminator
  Access Type: Read/Write
  The CommandTerminator property specifies the TransactSQL batch delimiter. The default batch delimiter is GO.
  SQL Server™ Default value: "GO"

string Description
  Access Type: Read-only
  A textual description of the object.

boolean EnableBcp
  Access Type: Read/Write
  The EnableBcp property enables the use of bulk copy operations. If TRUE, bulk copy operations are available on the Microsoft® SQL Server™ connection. If FALSE, bulk copy operations are not available on the SQL Server™ connection.
  SQL Server™ Default value: FALSE string Login
  Access Type: Read/Write
  The Login property specifies a username for connecting when SQL Server™ Authentication is used to connect to a server running SQL Server™.
  SQL Server™ Default value: none boolean LoginSecure
  Access Type: Read/Write
  The LoginSecure property specifies the authentication mode to use when the provider attempts to connect to a SQL Server™. If TRUE, the provider uses Windows NT Authentication Mode. If FALSE, the provider uses SQL Server™ Authentication. For SQL Server™ authentication, the Login and Password properties are used to specify authentication information.
  SQL Server™ Default value: TRUE sint32 LoginTimeout
  Access Type: Read/Write
  The LoginTimeout property specifies the number of seconds to wait for a connection attempt to succeed. By default, the LoginTimeout property has a value of −1, which is interpreted currently as 60 seconds.
  Units: Seconds
  SQL Server™ Default value: −1 (60 seconds)

sint32 NetPacketSize
  Access Type: Read/Write
  The NetPacketSize property specifies the size of a network packet used to transmit a block of data between the provider ard Microsoft® SQL Server™. The value of the property must have a value from 128 through 65535. SQL Server™ uses a default network packet size of 4096 bytes. Setting NetPacketSize to 0 enables the default size, 4096 bytes.
  Units: Bytes
  SQL Server™ Default value: 0 (4096 bytes)

boolean ODBCPrefix
  Access Type: Read/Write
  The ODBCPrefix property controls error and status message text formatting. When TRUE, descriptive error text is prefixed by the indicators of the error source. When FALSE, the error source indicators are stripped out and only the error message text is returned.
  SQL Server™ Default value: TRUE string Password
  Access Type: Read/Write
  The Password property indicates a password for a Microsoft® SQL Server™ login record. It is used for SQL Server™ authentication.
  SQL Server™ Default value: none sint32 QueryTimeout
Access Type: Read/Write
The QueryTimeout property specifies the number of seconds that must elapse before a time-out error is reported on an attempted statement execution.
Units: Seconds
SQL Server™ Default value: −1 (no timeout)

boolean QuotedIdentifier
Access Type: Read/Write
The QuotedIdentifier property controls Microsoft® SQL Server™ interpretation of identifier strings in statements submitted for execution. When TRUE, identifiers can be delimited by double quotation marks and character literal values must be delimited by single quotation marks. When FALSE, identifiers cannot be quoted and must follow all Transact-SQL rules for identifiers. For example, character literal values can be delimited by either single or double quotation marks.
SQL Server Default value: FALSE

[key] string SettingID
Access Type: Read/Write
The SettingId should contain the name of the instance of SQL Server™ these connection settings should apply to. This value should be identical to the Name property in the corresponding MSSQL_SQLServer instance.
Maximum Length: 256 boolean TranslateChar
Access Type: Read/Write
The TranslateChar property exposes the Microsoft® SQL Server™ ODBC driver statement attribute SQL_COPT_SS_TRANSLATE. SQL_COPT_SS_TRANSLATE causes the driver to translate characters between the client and server code pages as MBCS data is exchanged. The attribute affects only data stored in SQL Server™ char, varchar, and text columns. If TRUE, the connection behaves as defined for value SQL_XL_ON. This is the default behavior. The driver translates characters from one code page to another in character data exchanged between the client and the server. The driver automatically configures the character translation, determining the code page installed on the server and that in use by the client. If FALSE, the connection behaves as defined for value SQL_XL_OFF. The driver does not translate characters from one code page to another in character data exchanged between the client and he server.
SQL Server™ Default value: TRUE Associations
MSSQL_SQLServerConnectionSetting is associated to MSSQL_SQLServer as the Setting property of the MSSQL_SQLServerSQLServerConnectionSetting association.

MSSQL_SQLServerDatabase: CIM Component
Association Class
The MSSQL_SQLServerDatabase class represents an association between a SQL Server™ installation and a database that is part of the installation.

References

[key] MSSQL_SQLServer GroupComponent
Access Type: Read-only
The GroupComponent property references a SQL Server™ installation.

[key] MSSQL_Database Part Component
Access Type: Read-only
The Part Component property references a database that is part of the SQL Server™ installation referenced by the GroupComponent property.

MSSQL_SQLServerErrorLog: CIM_Dependency
Association Class
The MSSQL_SQLServerErrorLog represents an association between a SQL Server™ installation and the error log used by the installation.

References

[key] MSSQL_ErrorLog Antecedent
Access Type: Read-only
The Antecedent property references an error log used by the SQL Server™ installation.

[key] MSSQL_SQLServer Dependent
Access Type: Read-only
The Dependent property references a SQL Server™ installation.

MSSQL_SQLServerIntegratedSecuritySetting: CIM_ElementSetting
Association Class
The MSSQL_SQLServerIntegratedSecuritySetting class represents an association between a SQL Server™ installation and its security settings.

References

[key] MSSQL_SQLServer Element
Access Type: Read-only
The Element property references a SQL Server™ installation.

[key] MSSQL_IntegratedSecuritySetting Setting
Access Type: Read-only
The Setting property references the security settings used by the SQL Server™ installation.

MSSQL_SQLServerLanguageSetting: CIM_ElementSetting
Association Class
The MSSQL_SQLServerLanguageSetting class represents an association between a SQL Server™ installation and its language settings.

References

[key] MSSQL_SQLServer Element
Access Type: Read-only
The Element property references a SQL Server™ installation.

[key] MSSQL_LanguageSetting Setting
Access Type: Read-only
The Setting property references the language settings used by the SQL Server™ installation.

MSSQL_SQLServerLogin: MSSQL_Scope
Association Class
The MSSQL_SQLServerLogin class represents an association between a SQL server™ and a login defined within the SQL Server.

References

[key] MSSQL_Login ScopedElement
Access Type: Read-only
The ScopedElement property references a login defined within the SQL Server™ installation.

[key] MSSQL_SQLServer ScopingElement
Access Type: Read-only

The ScopingElement property references a SQL Server™ installation.

MSSQL_SQLServerRegistry: CIM_ElementSetting
Association Class
The MSSQL_SQLServerRegistry class represents an association between a SQL Server installation and its registry setting.

References

[key] MSSQL_SQLServer Element
Access Type: Read-only
The Element property references a SQL Server™ installation.

[key] MSSQL_RegistrySetting Setting
Access Type: Read-only
The Setting property references the registry settings of the SQL Server™ installation.

MSSQL_SQLServerRole: MSSQL_Role
The MSSQL_SQLServerRole class represents a SQL Server™ security role not constrained to operation within a single database. Roles are used to establish groups of users, in order to make it convenient to set permissions for a group of users.

Properties string Caption
Access Type: Read-only
The Caption property is a short textual description (one-line string) of the object.
Maximum Length: 64 string Description
Access Type: Read-only
The Description property returns a text describing the role.

string FullName
Access Type: Read-only
The FullName property returns a descriptive title for the role.

datetime InstallDate
Access Type: Read-only
The InstallDate property is datetime value indicating when the object was installed. A lack of a value does not indicate that the object is not installed.

[key] string Name
Access Type: Read-only
The Name property is a label that uniquely identifies the SQL Server™ role.

[key] string SQLServerName
Access Type: Read-only
The SQLServerName property indicates the name of the SQL Server™ installation that the object is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
Values are: "OK", "Error", "Degraded", "Unknown", "Pred Fail", "Starting", "Stopping", "Service"
Maximum Length: 10

Associations
MSSQL_SQLServerRole is associated to MSSQL_SQLServer as the ScopedElement property of the MSSQL_SQLServerServerRole association.
MSSQL_SQLServerRole is associated to MSSQL_Login as the Antecedent property of the MSSQL_MemberLogin association.

MSSQL_SQLServerServerRole: MSSQL_Scope
Association Class
The MSSQL_SQLServerServerRole class represents an association between a SQL Server™ and a server roles defined within the SQL Server™.

References

[key] MSSQL_SQLServerRole ScopedElement
Access Type: Read-only
The ScopedElement property references a system defined server role defined within the SQL Server™ installation.

[key] MSSQL_SQLServer ScopingElement
Access Type: Read-only
The ScopingElement property references a SQL Server installation.

MSSQL_SQLServerSQLServerConnectionSetting: CIM_ElementSetting
Association Class
The MSSQL_SQLServerSQLServerConnectionSetting class represents an association between a SQL Server installation and the settings used by the WMI SQL Server™ Administration provider to connect to the SQL Server™.

References

[key] MSSQL_SQLServer Element
Access Type: Read-only
The Element property references a SQL Server™ installation.

[key] MSSQL_SQLServerConnectionSetting Setting
Access Type: Read-only
The Setting property references the settings used by the SQL Server™ provider to connect to the SQL Server.

MSSQL_SQLServerUser: MSSQL_Containment
Association Class
The MSSQL_SQLServerUser class represents an association between a SQL Server™ and a database user. This association allows an application to perform a single traversal to find the database users in a SQL Server™ and the login that they are mapped to.

Properties

[key] string DatabaseName
Access Type: Read-only
The DatabaseName property indicates the database that the user is defined in.
Maximum Length: 128

[key] string LoginName
Access Type: Read-only
The LoginName property indicates the login that the user is mapped to.

Maximum Length: 128

References

[key] MSSQL_User Containee
   Access Type: Read-only
   The Containee property references a user defined within the databases in the SQL Server installation.

[key] MSSQL_SQLServer Container
   Access Type: Read-only
   The Container property references a SQL Server™ installation.

MSSQL_StoredProcedure: MSSQL_DBMSObject
   The MSSQL_StoredProcedure class represents standard as well as extended stored procedure defined in a SQL Server™ database. SQL Server™ stored procedures can contain input and output parameters and can return the results of one or more SELECT statements or a single long integer. In order to create an instance of a new stored procedure, the Text properties need to be specified along with the key properties of the class. The Text property specifies the Transact-SQL script that defines the stored procedure.

Properties boolean AnsiNullsStatus
   Access Type: Read-only
   The AnsiNullsStatus property returns TRUE when the stored procedure depends on a table exhibiting SQL-92 NULL handling behavior. By default, SQL Server™ creates columns that do not accept NULL when the user does not explicitly declare the ability to accept NULL. Further, SQL Server™ returns TRUE when evaluating the expression NULL=NULL. These default behaviors are nonstandard. Database and client connection options override default SQL Server™ behavior. When the default is overridden, tables created exhibit SQL-92 standard NULL handling and objects that depend upon those tables function as specified by SQL-92.

string Caption
   Access Type: Read-only
   The Caption property is a short textual description (one-line string) of the object.
   Maximum Length: 64 datetime CreateDate
   Access Type: Read-only
   The CreateDate property indicates the time and date on which the stored procedure was created. Note that creation date may be different from the install date in cases where the object is created in one place and then installed elsewhere.

[key] string DatabaseName
   Access Type: Read-only
   The DatabaseName property indicates the name of the database that the object is a part of.
   Maximum Length: 128 string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

[key] string Name
   Access Type: Read/Write
   The Name property defines the label by which the object is known boolean QuotedIdentifierStatus
   Access Type: Read-only
   The QuotedIdentifierStatus property controls Microsoft® SQL Server™ interpretation of identifier strings in statements submitted for execution. When TRUE, identifiers can be delimited by double quotation marks and character literal values must be delimited by single quotation marks. When FALSE, identifiers cannot be quoted and must follow all Transact-SQL rules for identifiers. For example, character literal values can be delimited by either single or double quotation marks.

[key] string SQLServerName
   Access Type: Read-only
   The SQLServerName property indicates the name of the SQL Server™ installation that the object is a part of.
   Maximum Length: 128 boolean Startup
   Access Type: Read/Write
   The Startup property indicates whether the stored procedure is executed automatically when SQL Server™ service is started. If TRUE when the stored procedure is executed automatically when the SQL Server™ service starts.

string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10 boolean SystemObject
   Access Type: Read-only
   The SystemObject property indicates whether the object is owned by Microsoft®. A value of TRUE indicates that the object implementation is owned by Microsoft®.

string Text
   Access Type: Read/Write
   The Text property indicates the Transact-SQL or other script that defines the stored procedure. Note that there is a special requirement for the name of the object is specified in the CREATE statement. The name of the object has to be in the form that includes the name of the owner. For example, in order to create an object named "Some Object", one would need to specify it as [dbo].[Some Object].

uint32 Type
   Access Type: Read/Write
   The Type property indicates the configured attributes of the stored procedure.

| Value | Description | Explanation |
|---|---|---|
| 0 | Unknown | The value is invalid and the type is unknown. |
| 1 | Standard | The object is a standard SQL Server ™ stored procedure. |
| 2 | Extended | The object is an extended stored procedure. |
| 3 | Macro | This value is reserved for future use. |
| 4 | Replication Filter | This value is reserved for future use. |

Methods

The MSSQL_StoredProcedure class supports the following methods:

| Method Name | Description |
|---|---|
| Rename | The Rename method is used to rename the stored procedure instance. |

Associations

MSSQL_StoredProcedure is associated to MSSQL_Database as the ScopedElement property of the MSSQL_DatabaseStoredProcedure association.

MSSQL_StoredProcedure is associated to MSSQL_User as the Element property of the MSSQL_UserStoredProcedurePermission association.

MSSQL_StoredProcedure is associated to MSSQL_DatabaseRole as the Element property of the MSSQL_DatabaseRoleStoredProcedurePermission association.

MSSQL_StoredProcedure is associated to MSSQL_StoredProcedureParameter as the ScopingElement property of the MSSQL_Stored ProcedureStoredProcedureParameter association.

MSSQL_StoredProcedureParameter

The MSSQL_StoredProcedureParameterclass represents the input and output parameters of a SQL Server™ stored procedure.

Properties uint32 ColId
    Access Type: Read-only
    The ColId property indicates the ordinal position of the parameter.

[key] string DatabaseName
    Access Type: Read-only
    The DatabaseName property indicates the name of the database that the object is a part of.
    Maximum Length: 128 string Datatype
    Access Type: Read-only
    The Datatype property indicates the data type of the stored procedure parameter.

uint32 Length
    Access Type: Read-only
    The Length property indicates the length of the SQL Server™ parameter, in bytes.
    Units: Bytes

[key] string Name
    Access Type: Read-only
    The Name property defines the label by which the object is known.
    Maximum Length: 128 boolean Output
    Access Type: Read-only
    The output property indicates if the parameter is an input parameter, output parameter or both input and output. A value of TRUE indicates that the parameter is output parameter, or an input and output parameter. A value of FALSE indicates that the parameter is an input parameter.

[key] string SQLServerName
    Access Type: Read-only
    The SQLServerName property indicates the name of the SQL Server™ installation that the object is a part of.
    Maximum Length: 128

[key] string StoredProcedureName
    Access Type: Read-only
    The StoredProcedureName property indicates the name of the SQL Server™ stored procedure.
    Maximum Length: 128

Associations

MSSQL_StoredProcedureParameter is associated to MSSQL_StoredProcedure as the ScopedElement property of the MSSQL_Stored ProcedureStoredProcedureParameterassociation.

MSSQL_StoredProcedureStoredProcedureParameter: MSSQL_Scope
    Association Class
    The MSSQL_StoredProcedureStoredProcedureParameter class associates a stored procedure to a parameter used in the stored procedure.

References

[key] MSSQL_StoredProcedureParameter ScopedElement
    Access Type: Read-only
    The ScopedElement property references a parameter used by the stored procedure referenced by the ScopingElement property.

[key] MSSQL_StoredProcedure ScopingElement
    Access Type: Read-only
    The ScopingElement property references a stored procedure.

MSSQL_SystemDatatype: MSSQL_Datatype
    The MSSQL_SystemDatatype class represents base data type defined in Microsoft® SQL Server™.

Properties boolean AllowIdentity
    Access Type: Read-only
    The AllowIdentity property indicates the ability of a data type to participate in a column defined with the identity property. The SQL Server™ identity property is defined for data types that can accept numeric values. A column defined with the identity property is defined with a starting value and a step value. SQL Server™ generates values for the column by querying the last applicable value and adding the step value.

boolean AllowLength
    Access Type: Read-only
    The AllowLength property indicates the ability to qualify a data type using a length parameter. AllowLength is TRUE for data types that accept a length qualification. For example, the property is TRUE for the SystemDatatype object referencing the varchar data type.

boolean AllowNulls
　　Access Type: Read-only
　　The AllowNulls property indicates whether the data type has the ability to accept NULL as a value.

string Caption
　　Access Type: Read-only
　　The Caption property is a short textual description (one-line string) of the object.
　　Maximum Length: 64 string Collation
　　Access Type: Read-only
　　The Collation property indicates the current collation of a string data type.

[key] string DatabaseName
　　Access Type: Read-only
　　The DatabaseName property indicates the name of the database that the object is a part of.
　　Maximum Length: 128 string Description
　　Access Type: Read-only
　　The Description property provides a textual description of the object.

datetime InstallDate
　　Access Type: Read-only
　　The InstallDate property is datetime value indicating when the object was installed. A lack of a value does not indicate that the object is not installed.

sint32 MaximumChar
　　Access Type: Read-only
　　The MaximumChar property indicates the maximum number of characters used when a value of the data type is converted to a character string. The MaximumChar property returns a character count, not the number of bytes required to store a string of that length.

sint32 MaximumLength
　　Access Type: Read-only
　　The MaximumLength property returns the greatest length of a data type in bytes, or the precision of the type. For binary and character data types, the MaximumLength property returns the greatest number of bytes required to store a string of the type. For the fixed-precision, numeric data types, the MaximumLength property returns the maximum precision of the type. For all other referenced data types, the MaxSize property returns the number of bytes required to store a value of the type in a structure representing the type.

[key] string Name
　　Access Type: Read-only
　　The Name property defines the label by which the object is known.

boolean Numeric
　　Access Type: Read-only
　　The Numeric property indicates whether the system data type referenced is an exact, numeric data type. Exact numeric data types are scaled integer values represented as strings. When defining a column using an exact numeric data type, precision and scale are specified.

[key] string SQLServerName
　　Access Type: Read-only
　　The SQLServerName property indicates the name of the SQL Server™ installation that the object is a part of.
　　Maximum Length: 128 string Status
　　Access Type: Read-only
　　The Status property is a string indicating the current status or the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
　　Values are: "OK", "Error", "Degraded", "Unknown", "Pred Fail", "Starting", "Stopping", "Service"
　　Maximum Length: 10 boolean VariableLength
　　Access Type: Read-only
　　The VariableLength property specifies data length handling for a data type. A value of True indicates that the data type supports variable length.

Associations
　　MSSQL_SystemDatatype is associated to MSSQL_UserDatatype as the Antecedent property of the MSSQL_BaseDatatype association.

MSSQL_Table: MSSQL_DBMSObject
　　The MSSQL_Table class represents a table in the SQL Server™ database.

Properties boolean AnsiNullsStatus
　　Access Type: Read-only
　　The AnsiNullsStatus property returns TRUE when the table exhibits SQL-92 NULL handling behavior. By default, SQL Server™ creates columns that do not accept NULL when the user does not explicitly declare the ability to accept NULL. Further, SQL Server™ returns TRUE when evaluating the expression NULL=NULL. These default behaviors are nonstandard. Database and client connection options override default SQL Server™ behavior. When the default is overridden, tables created exhibit SQL-92 standard NULL handling and objects that depend upon those tables behave as specified by SQL-92.

uint32 Attributes
　　Access Type: Read-only
　　The Attributes property indicates the various aspects of the table. The property indicates that the table can be one or more of the following: Identity—table has a column exposing the identity property. System Object—table is a system object defined by SQL Server™. Foreign Key—table has at least one foreign key. Referenced—table is referenced by at least one other table's foreign key. Published—table is published for replication. Replicated—table is actively subscribed to a Publisher. Check—table has at least one integrity constraint. Replica—at least one Subscriber has referenced the table's publication. Primary Key—table has a primary key. Unique—table has at least one UNIQUE constraint. Default—table has at least one DRI default defined. Replication Check—table has at least one integrity constraint not fired when replicated data is inserted.

| Bit Position | Description |
|---|---|
| 0 | Identity |
| 1 | System Object |
| 2 | Foreign Key |
| 3 | Referenced |
| 5 | Published |
| 6 | Replicated |
| 7 | Check |
| 8 | Replica |
| 9 | Primary Key |
| 10 | Unique |
| 11 | Default |
| 12 | Replication Check |

NOTE:
If one or more of bit positions 2, 7, 10, 11, or 12 are set, the table has at least one DRI constraint defined.

string Caption
 Access Type: Read-only
 The Caption property is a short textual description (one-line string) of the object.
 Maximum Length: 64 datetime CreateDate
 Access Type: Read-only
 The CreateDate property indicates the time and date on which the table was created. Note that creation date may be different from the install date in cases where the object is created in one pace and then installed elsewhere.

[key] string DatabaseName
 Access Type: Read-only
 The DatabaseName property indicates the name of the database that the object is a part of.
 Maximum Length: 128 sint32 DataSpaceUsed
 Access Type: Read-only
 The DataSpaceUsed property reports the storage space, in kilobytes, used by the rows of the table.
 Units: Kilobytes string Description
 Access Type: Read-only
 The Description property provides a textual description of the object.

boolean FakeSystemTable
 Access Type: Read-only
 The FakeSystemTable property returns TRUE when the table is a SQL Server™ system-defined table not implemented as a base or view table.

string FullTextCatalogName
 Access Type: Read/Write
 The FullTextCatalogName property specifies the Microsoft® Search full-text catalog supporting full-text query for the table. FullTextCatalogName is an empty string for tables not participating in full-text indexing.

boolean FullTextIndexActive
 Access Type: Read/Write
 The FullTextIndexActive property controls Microsoft®Search service activity for a table. If TRUE, the table is configured for participation in Microsoft® Search full-text indexing. The Microsoft® Search service will gather index data from the designated columns and populate the index as directed. If FALSE, Microsoft® Search will not gather index data from the table regardless of configuration for full-text indexing participation. Full-text indexing must be properly configured for the table prior to setting FullTextIndexActive. The proper configuration involves setting of the FullTextCatalogName property, FullTextIndex property, and UniqueIndexForFullText property. If FullTextIndexActive is TRUE, setting it to TRUE generates an error. An error is also generated on attempts to set FullTextIndexActive to TRUE win full-text indexing has not been properly configured. If FullTextindexActive is TRUE, setting it to FALSE simply removes the referenced table from participation in full-text index build and query. Setting the property does not affect the established configuration.

sint32 FullTextKeyColumn
 Access Type: Read-only
 The FullTextKeyColumn property returns the identifier of the column selected for row identification for Microsoft) Search. Microsoft® Search requires that a single column identify rows participating in an index that supports full-text query. The column designated must contain unique, non-NULL values and must participate in a table's PRIMARY KEY constraint or UNIQUE index.

uint32 FullTextPopulateStatus
 Access Type: Read-only
 The FullTextPopulateStatus property returns the population state of a Microsoft® Search full-text table. The FullTextPopulateStatus property returns one of the following values: Full-Full population of the table index is in progress for the full-text catalog. Incremental—Incremental population of the table index is in progress for the full-text catalog. None—No population of the table index is in progress for the full-text catalog.
 Values are: "None", "Full", "Incremental"

sint32 IndexSpaceUsed
 Access Type: Read-only
 The IndexSpaceUsed property returns the number of kilobytes of disk resource used to store indexes built on the referenced Microsoft® SQL Server™ table.
 Units: Kilobytes datetime InstallDate
 Access Type: Read-only
 The InstallDate property is datetime value indicating when the object was installed. A lack of a value does not indicate that the object is not installed.

[key] string Name
 Access Type: Read-only
 The Name property defines the label by which the object is known.

boolean QuotedIdentifierStatus
 Access Type: Read-only
 The QuotedIdentifierStatus property controls Microsoft® SQL Server™ interpretation of identifier strings in statements submitted for execution. When TRUE, identifiers can be delimited by double quotation marks and character literal values must be delimited by single quotation marks. When FALSE, identifiers cannot be quoted and must follow all Transact-SQL rules for identifiers. For example, character literal values can be delimited by either single or double quotation marks.

sint32 Rows
 Access Type: Read-only
 The Rows property returns the number of rows in the table.

[key] string SQLServerName
 Access Type: Read-only

The SQLServerName property indicates the name of the SQL Server™ installation that the object is a part of.

Maximum Length: 128 string Status

Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10 boolean SystemObject

Access Type: Read-only

The SystemObject property indicates whether the object is owned by Microsoft®. A value of TRUE indicates that the object implementation is owned by Microsoft®.

boolean TableFullTextChangeTrackingOn

Access Type: Read/Write

The TableFullTextChangeTrackingOn property specifies whether to enable the tracking and propagation of changes to a table for a full-text image index. When set to TRUE, the TableFullTextChangeTrackingOn property begins an incremental tracking of changes to a full-text search index if the table has a timestamp column to support the full-text tracking process. When set to FALSE, TableFullTextChangeTrackingOn stops tracking changes to the table. Set TableFullTextChangeTrackingOn to TRUE to enable the tracking and propagation of changes to a table for a full-text image index referenced by the Microsoft® Search service. TableFullTextChangeTrackingOn must be set to TRUE before an application can set the TableFullTextUpdateIndexOn property or call the FullTextUpdateIndex method to propagate the changes. Changes can be propagated to the index on a scheduled basis using a SQL Server™ Agent, or as they occur, using the TableFullTextUpdateIndexOn property, or on demand, using the FullTextUpdateIndex method.

boolean TableFullTextUpdateIndexOn

Access Type: Read/Write

The TableFullTextUpdateIndexOn property specifies whether to start or stop propagating tracked changes to the Microsoft® Search service automatically. Set the TableFullTextUpdateIndexOn property to TRUE to track index changes to the Microsoft® Search service as an automatic background operation. A list of all changes to the indexed data is propagated to the index as the changes occur. If TableFullTextUpdateIndexOn is set to FALSE, an application must call the FullTextUpdateIndex method to propagate the changes. Note that using TableFullTextUpdateIndexOn can have a significant impact on server performance, and should be used in an environment that has a CPU and memory configuration that allows propagation to keep pace with the index change rate.

string UniqueIndexForFullText

Access Type: Read/Write

The UniqueIndexForFullText property specifies the index used by Microsoft® Search to identify rows uniquely in a full-text indexed table.

boolean UsesFullTextIndex

Access Type: Read/Write

The UsesFullTextIndex property indicates whether the table is participating in Microsoft Search full-text queries. If TRUE, the table participates in full-text queries. UsesFullTextIndex must be TRUE in MSSQL_Table before the FullTextIndex property for the contained MSSQL_Column objects can be set to TRUE. If FALSE, the table does not participate in full-text queries.

Methods

The MSSQL_Table class supports the following methods:

| Method Name | Description |
| --- | --- |
| CheckIdentityValue | The CheckIdentityValue method verifies the integrity of an identity column in the table. |
| CheckTable | The CheckTable method tests the integrity of database pages implementing storage for the table and indexes defined on it. |
| CheckTableDataOnly | The CheckTableDataOnly method tests the integrity of database pages implementing storage for the table. |
| Create | The Create method is used to create a new table instance. |
| ExportData | The ExportData method is used to copy data to a data file. |
| FullTextIndexScript | The FullTextIndexScript method returns a Transact-SQL command batch enabling Microsoft ® Search full-text indexing on the table. |
| FullTextUpdateIndex | The FullTextUpdateIndex method propagates the current set of tracked changes to Microsoft ® Search. |
| ImportData | The ImportData method is used to copy bulk copy data from a data file. |
| RebuildIndexes | The RebuildIndexes method re-creates all indexes defined on the table. |
| RecalcSpaceUsage | The RecalcSpaceUsage method forces the update of data reporting the disk resource usage of the table. |
| ReCompileReferences | The ReCompileReferences method causes recompilation, prior to the next execution, of any stored procedure or trigger that depend on the table. |
| Rename | The Rename method is used to rename a table instance. |
| StartFullTextPopulation | The StartFullTextPopulation method starts Microsoft ® Search full-text table population. |
| StopFullTextPopulation | The StopFullTextPopulation method stops Microsoft ® Search full-text table population. |
| TruncateData | The TruncateData method deletes all rows from the table as a non-logged operation. |
| UpdateStatistics | The UpdateStatistics method forces data distribution statistics update for all indexes defined on the table. |
| UpdateStatisticsWith | The UpdateStatisticsWith method forces data distribution statistics update for a indexes defined on the table. |

Associations

MSSQL_Table is associated to MSSQL_FileGroup as the Dependent property of the MSSQL_TableFileGroup association.

MSSQL_Table is associated to MSSQL_FileGroup as the Dependent property of the MSSQL_TableTextFileGroup association.

MSSQL_Table is associated to MSSQL_Database as the Part Component property of the MSSQL_DatabaseTable association.

MSSQL_Table is associated to MSSQL_Column as the GroupComponent property of the MSSQL_TableColumn association.

MSSQL_Table is associated to MSSQL_Index as the Dependent property of the MSSQL_TableIndex association.

MSSQL_Table is associated to MSSQL_Key as the Dependent property of the MSSQL_TableKey association.

MSSQL_Table is associated to MSSQL_Trigger as the Dependent property of the MSSQL_TableTrigger association.

MSSQL_Table is associated to MSSQL_User as the Element property of the MSSQL_UserTablePermission association.

MSSQL_Table is associated to MSSQL_DatabaseRole as the Element property of the MSSQL_DatabaseRoleTablePermission association.

MSSQL_Table is associated to MSSQL_ForeignKey as the Antecedent property of the MSSQL_ReferencedTable association.

MSSQL_Table is associated to MSSQL_Check as the Dependent property of the MSSQL_TableCheck association.

MSSQL_TableCheck: CIM-Dependency
  Association Class
  The MSSQL_TableCheck class represents an association between a table and the checks defined for the table.

References

[key] MSSQL_Check Antecedent
  Access Type: Read-only
  The Antecedent property references a check defined for the table referenced by the Dependent property.

[key] MSSQL_Table Dependent
  Access Type: Read-only
  The Dependent property references a table in SQL Server.

MSSQL_TableColumn: CIM_Component
  Association Class
  The MSSQL_TableColumn class represents an association between a table and a column contained in the table.

References

[key] MSSQL_Table GroupComponent
  Access Type: Read-only
  The GroupComponent property represents a table in a SQL Server database.

[key] MSSQL_Column Part Component
  Access Type: Read-only
  The Part Component property references a column that is part of the table referenced by the GroupComponent property.

MSSQL_TableFileGroup: CIM_Dependency
  Association Class
  The MSSQL_TableFileGroup class represents an association between a table and the file groups used to store the table.

References

[key] MSSQL_FileGroup Antecedent
  Access Type: Read-only
  The Antecedent property references a file group defined for the table referenced by the Dependent property.

[key] MSSQL_Table Dependent
  Access Type: Read-only
  The Dependent property references a table in SQL Server™.

MSSQL_TableIndex: CIM-Dependency
  Association Class
  The MSSQL_TableIndex class represents an association between a table and an index defined for the table.

References

[key] MSSQL_Index Antecedent
  Access Type: Read-only
  The Antecedent property references a index defined for the table referenced by the Dependent property.

[key] MSSQL_Table Dependent
  Access Type: Read-only
  The Dependent property references a table in SQL Server.

MSSQL_TableKey: CIM_Dependency
  Association Class
  The MSSQL_TableKey class represents an association between a table and a key defined for the table.

References

[key] MSSQL_Key Antecedent
  Access Type: Read-only
  The Antecedent property references a key defined for the table referenced by the Dependent property.

[key] MSSQL_Table Dependent
  Access Type: Read-only
  The Dependent property references a table in SQL Server.

MSSQL_TableTextFileGroup: CIM-Dependency
  Association Class
  The MSSQL_TableTextFileGroup class associates a table with the file group that is used to store the variable length data in the table.

References

[key] MSSQL_FileGroup Antecedent
  Access Type: Read-only
  The Antecedent property references a file group defined to store text data for the table referenced by the Dependent property.

[key] MSSQL_Table Dependent
  Access Type: Read-only
  The Dependent property references a table in SQL Server™.

MSSQL_TableTrigger: CIM_Dependency
  Association Class
  The MSSQL_TableTrigger class represents an association between a table and a trigger defined for the table.

References

[key] MSSQL_Trigger Antecedent
  Access Type: Read-only
  The Antecedent property references a trigger defined for the table referenced by the Dependent property.

[key] MSSQL_Table Dependent
  Access Type: Read-only
  The Dependent property references a table in SQL Server.

MSSQL_TransactionLog: CIM_LogicalElement
  The MSSQL_TransactionLog class represents the transaction log of a Microsoft® SQL Server™ database. A SQLServer™ transaction log maintains a record of modifications to the operating system files containing the data of an SQL Server™ database. The transaction log provides data recovery assistance in the event of system failure and an SQL Server™ database has at least one operating system file that stores transaction log records. A transaction log can be written to more than one operating system file. Each SQL Server database maintains its own transaction log and the operating system file or files that store log records cannot be shared with another database.

Properties string Caption
   Access Type: Read-only
   The Caption property is a short textual description (one-line string) of the object.
   Maximum Length: 64 datetime CreateDate
   Access Type: Read-only
   The CreateDate property indicates the time and date on which the transaction log was created. Note that creation date may be different from the install date in cases where the object is created in one place and then installed elsewhere.

string Description
   Access Type: Read-only
   The Description property provides a textual description of the object.

uint32 InitialSize
   Access Type: Read-only
   The InitialSize property returns the initial size of file for the transaction log. This property is used to specify the size of the file at time of creating the transaction log.

datetime InstallDate
   Access Type: Read-only
   The InstallDate property is datetime value indicating when the object was installed. A lack of a value does not indicate that the object is not installed.

datetime LastBackup
   Access Type: Read-only
   The LastBackup property returns the most recent date and time at which a backup operation was performed against the transaction log.

[key] string Name
   Access Type: Read-only
   The Name property defines the label by which the object is known.

real32 SpaceAvailableInMB
   Access Type: Read-only
   The SpaceAvailableInMB property returns the amount of disk resource allocated, but unused, in operating system files implementing SQL Server database and database transaction log storage. The figure is accurate to two decimal places.
   Units: Megabytes

[key] string SQLServerName
   Access Type: Read-only
   The SQLServerName property indicates the name of the SQL Server™ installation that the object is a part of.
   Maximum Length: 128 string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
   Values are: "OK", "Error", "Degraded", "Unknown", "Pred Fail", "Starting", "Stopping", "Service"
   Maximum Length: 10

Methods
   The MSSQL_TransactionLog class supports the following methods:

Method Name Description
   Truncate The Truncate method archive-marks Transaction log records.

Associations
   MSSQL_TransactionLog is associated to CIM_DataFile as the GroupComponent property of the MSSQL_TransactionLogDataFile association.
   MSSQL_TransactionLog is associated to MSSQL_Database as the Antecedent property of the MSSQL_DatabaseTransactionLog association.

MSSQL_TransactionLogDataFile: CIM_Component
   Association Class
   The MSSQL_TransactionLogDataFile class represents an association between SQL Server™ transaction log and the operating system file that is used to store the log.

References

[key] MSSQL_TransactionLog GroupComponent
   Access Type: Read-only
   The GroupComponent property references a transaction log.

[key] CIM DataFile Part Component
   Access Type: Read-only
   The Part Component property references an operating system file that is used to store the transaction log.

MSSQL_TransferSetting: MSSQL_Setting
   The MSSQL_TransferSetting class represents the settings used to control the data elements moved from one Microsoft® SQL Server™ database to another. This class has only static instances. An instance of this class is used as a parameter for the Transfer method of the MSSQL_Database class.

Properties string Caption
   Access Type: Read-only
   A short textual description (one-line string) of the object.
   Maximum Length: 64 boolean CopyAllDefaults
   Access Type: Read/Write
   The CopyAllDefaults property controls the transfer of Microsoft® SQL Server™ default definitions from the source to the target database. If TRUE, all SQL Server™ default definitions in the source database are copied to the target. If FALSE, only default definitions indicated by the DefaultName property are copied.

boolean CopyAllFunctions
   Access Type: Read/Write
   The CopyAllFunctions property controls the transfer of SQL Server™ user-defined functions from the source to the target database. If TRUE, all SQL Server™ user-defined function definitions in the source database are copied to the target.)]

boolean CopyAllObjects
   Access Type: Read/Write
   The CopyAllObjects property controls the transfer of defaults, rules, stored procedures, tables, triggers, user-defined data types, and views from the source to the target database. If TRUE, all SQL Server™ database objects in the source database are copied to the target. If FALSE, only database objects indicated by the properties such as CopyAllTables, TableName and DefaultName property are copied.

boolean CopyAllRules
   Access Type: Read/Write
   The CopyAllRules property controls the transfer of Microsoft® SQL Server™ rule definitions from the source to the target database. If TRUE, all SQL Server™ rule definitions in the source database are copied to the target. If FALSE, only rule definitions indicated by the RuleName property are copied.

boolean CopyAllStoredProcedures
   Access Type: Read/Write
   The CopyAllStoredProcedures property controls the transfer of Microsoft® SQL Server™ stored procedure definitions from the source to the target database. If TRUE, all SQL Server™ stored procedures definitions in the source database are copied to the target. If FALSE, only stored procedures definitions indicated by the StoredProcedureName property are copied.

boolean CopyAllTables
   Access Type: Read/Write
   The CopyAllTables property controls the transfer of Microsoft® SQL Server™ table definitions from the source to the target database. If TRUE, all SQL Server™ table definitions in the source database are copied to the target. If FALSE, only table definitions indicated by the TableName property are copied.

boolean CopyAllTriggers
   Access Type: Read/Write
   The CopyAllTriggers property controls the transfer of Microsoft® SQL Server™ trigger definitions from the source to the target database. If TRUE, all SQL Server™ trigger definitions in the source database are copied to the target. If FALSE, only trigger definitions indicated by the TriggerName property are copied.

boolean CopyAllUserDefinedDatatypes
   Access Type: Read/Write
   The CopyAllUserDefinedDatatypes property controls the transfer of Microsoft® SQL Server™ user defined datatype definitions from the source to the target database. If TRUE, all SQL Server™ user defined datatype definitions in the source database are copied to the target. If FALSE, only use defined datatype definitions indicated by the DatatypeName are copied.

boolean CopyAllViews
   Access Type: Read/Write
   The CopyAllViews property controls the transfer of Microsoft® SQL Server™ view definitions from the source to the target database. If TRUE, all SQL Server™ view definitions in file source database are copied to the target. If FALSE, only view definitions indicated by the ViewName property are copied.

uint32 CopyData
   Access Type: Read/Write
   The CopyData property controls data transfer from a source to a target database. Append—data copied will be appended to existing tables. FALSE—data will not be copied. Only schema will be copied. Replace—existing data will be replaced by data copied.
   Values are: "False", "Replace", "Append"

boolean CopySchema
   Access Type: Read/Write
   The CopySchema property controls table creation on data transfer. If TRUE, transfer processing creates tables prior to attempting to copy data. If FALSE, tables are not created prior to data copying. All tables indicated in the transfer operation must existing the target database.

[key] string DatabaseName
   Access Type: Read/Write
   The DatabaseName property identifies the name of the database that the transfer setting has been defined for.
   Maximum Length: 128 string DatatypeName [ ]
   Access Type: Read/Write
   The DatatypeName property indicates the names of the datatypes to be transferred.

string DefaultName [ ]
   Access Type: Read/Write
   The DefaultName property indicates the names of the defaults to be transferred. Note that the name should be in the format of owner.name, since in SQL Server™ the owner of a database object forms part of the identifier for the object.

string Description
   Access Type: Read-only
   A textual description of the object.

string DestDatabase
   Access Type: Read/Write
   The DestDatabase property specifies the target database for the transfer.

string DestLogin
   Access Type: Read/Write
   The DestLogin property provides a login identifier used to connect to the target server for the transfer.

string DestPassword
   Access Type: Read/Write
   The DestPassword property provides a password used to connect to a transfer target server.

string DestServer
   Access Type: Read/Write
   The DestServer property identifies the Microsoft®SQL Server™ installation that contains the target database for a transfer operation.

boolean DestTranslateChar
   Access Type: Read/Write
   The DestTranslateChar property controls behavior of character data translation on a destination server during a transfer operation. Performing character data translation during a transfer operation can significantly impact server performance if a large amount of data must be translated. Set DestTranslateChar to TRUE to perform character translation on the destination server. Set SourceTranslateChar to TRUE to resume character translation on the source server. DestTranslateChar is set to FALSE by default.

boolean DestUseTrustedConnection

Access Type: Read/Write

The DestUseTrustedConnection property requests Windows NT Authentication for the connection of the Transfer object to the target server. If TRUE, Windows NT Authentication is used in an attempt to connect to the target server. If FALSE, SQL Server™ Authentication is used in the connection attempt. The DestLogin and DestPassword properties provide login authentication parameters.

boolean DropDestObjectsFirst

Access Type: Read/Write

The DropDestObjectsFirst property is used to control the data transfer operation. If TRUE, the transfer attempts to drop a database object from the target database before copying the object from the source database. If FALSE, the transfer copies database objects. Note that the value of the DropDestObjectsFirst property applies only when database objects are copied in the transfer. To copy database objects, the CopySchema property value must be TRUE.

boolean IncludeDB

Access Type: Read/Write

The IncludeDB property specifies whether to create a database on the destination server during a data transfer operation. With the IncludeDB property set to TRUE, a database need not already exist at a destination server before database objects can be copied during a transfer operation. The IncludeDB property generates a destination database creation statement at the beginning of script execution during a transfer operation. The default is FALSE.

boolean IncludeDependencies

Access Type: Read/Write

The IncludeDependencies property controls the addition of dependent database objects to a user-defined list of SQL Server™ database objects in a transfer operation. If TRUE, the transfer automatically copies the SQL Server™ database objects on which user-selected database objects depend. If FALSE, only the user-selected objects are copied.

boolean IncludeLogins

Access Type: Read/Write

The IncludeLogins property controls handling of system administrator-created logins in a transfer operation. If TRUE, all system administrator-created logins in the source server's master database are created in the target server's master database as part of the transfer. If FALSE, no logins are created on the transfer target server.

boolean IncludeUsers

Access Type: Read/Write

The IncludeUsers property controls handling of SQL Server™ database user records in a transfer operation. If TRUE, all users in the source database are created in the target database as part of the transfer operation. If FALSE, no users are created in the target database.

string RuleName [ ]

Access Type: Read/Write

The RuleName property indicates the names of the rules to be transferred. Note that the name should be in the format of owner.name, since in SQL Server™ the owner of a database object forms part of the identifier for the object.

uint32 Script2Type

The Script2Type property configures the TransactSQL script generated and used to copy database schema in a transfer of schema from one database to another. The following are the possible bits that can be set on the Script2Type property. By default, none of these bits are set.

| Bit Position | Description | Explanation |
| --- | --- | --- |
| 0 | ANSI Padding | Generate Transact-SQL SET ANSI_PADDING ON and SET ANSI_PADDDING OFF statements before and after CREATE TABLE statements in the generated script. Applies only when scripting references an SQL Server ™ table. |
| 1 | ANSI File | Generated script file uses multibyte characters. Code page 1252 is used to determine character meaning. |
| 2 | Unicode File | Generated script output file is a Unicode-character text file. |
| 4 | No FG | Generated script does not include "ON <filegroup>" clause directing filegroup use. Applies only when scripting references an SQL Server ™ table. |
| 7 | Encrypt PWD | Encrypt passwords with script. When specified, Unicode File must be specified as well. |
| 9 | No What If Indexes | Do not script hypothetical indexes used to implement the CREATE STATISTICS statement. Applies only when scripting references an SQL Server ™ table. |
| 10 | Agent Notify | When scripting an alert, generate script creating notifications for the alert. |
| 11 | Agent Alert Job | Generate Transact-SQL script creating SQL Server ™ Agent jobs and alerts. |
| 19 | Full Text Index | Generated script includes statements defining Microsoft ® Search full-text indexing. Applies only when scripting references an SQL Server ™ table. |
| 20 | Login SID | Include security identifiers for logons scripted. |
| 21 | Full Text Cat | Command batch includes Transact-SQL statements creating Microsoft ® Search full-text catalogs. |
| 22 | Extended Property | Include extended property scripting as part of object scripting. Note that this bit is used only in Microsoft SQL Server ™ 2000. |
| 23 | No Collation | Do not script the collation clause if source is an instance of SQL Server ™ version 7.0 or later. The default is to generate collation. Note that this bit is used only in Microsoft SQL Server ™ 2000. | uint32 ScriptType

Access Type: Read/Write

The ScriptType property configures the TransactSQL script generated and used to copy database schema in a transfer of schema from one database to another. The Primary Object, Drops, Bindings, Clustered Indexes, Non Clustered Indexes, Triggers, To File Only, Object Permissions, Database Permissions, Include Headers, Aliases, Include If Not Exists and Owner Qualify bits are set by default. Set the Database Permissions and Object Permissions bits to include all permissions in the transfer. Set the Clustered Index, Non Clustered Index and DRI Index bits to include all the indexes in the transfer. Set the Primary Key, Foreign Key and Unique Key bits to include all keys in the transfer. Set the Checks, Defaults, Foreign Keys, Primary Keys and Unique Keys bits to include all constraints in the transfer. Set the Primary Key, Foreign Key, Unique Key, Checks, Defaults, Foreign Keys, Primary Keys and Unique Keys bits to include all constraints and keys in the transfer.

The following bits may be set for the ScriptType property:

| Bit Position | Description | Explanation |
|---|---|---|
| 0 | Drops | Generate Transact-SQL to remove referenced component. Script tests for existence prior attempt to remove component. |
| 1 | Object Permissions | Include Transact-SQL privilege defining statements when scripting database objects. |
| 2 | Primary Object | Generate Transact-SQL creating the referenced component. |
| 3 | Clustered Indexes | Generate Transact-SQL defining clustered indexes. Applies only when scripting references an SQL Server ™ table. |
| 4 | Triggers | Generate Transact-SQL defining triggers. Applies only when scripting references an SQL Server ™ table. |
| 5 | Database Permissions | Generate Transact-SQL database privilege defining script. Database permissions grant or deny statement execution rights. |
| 7 | Bindings | Generate sp_bindefault and sp_bindrule statements. Applies only when scripting references a table. |
| 10 | UDDTs To Base Type | Convert specification of user-defined data types to the appropriate SQL Server ™ base data type. Applies only when scripting references an SQL Server ™ table. |
| 12 | Include If Not Exists | Transact-SQL creating a component is prefixed by a check for existence. When script is executed, component is created only when a copy of the named component does not exist. |
| 13 | Non Clustered Indexes | Generate Transact-SQL defining nonclustered indexes. Applies only when scripting references an SQL Server ™ table. |
| 17 | Include Headers | Generated script is prefixed with a header containing date and time of generation and other descriptive information. |
| 18 | Owner Qualify | Object names in Transact-SQL generated to remove an object are qualified by the owner of the referenced object. Transact-SQL generated to create the referenced object qualify the object name using the current object owner. |
| 19 | Timestamp To Binary | When scripting object creation for a table or user-defined data type, convert specification of timestamp data type to binary(8). |
| 22 | DRI Non-Clustered | Generated script creates nonclustered indexes. Directs scripting when declarative referential integrity establishes dependency relationships. Applies only when scripting references an SQL Server ™ table. |
| 23 | DRI Clustered | Generated script creates clustered indexes. Directs scripting when declarative referential integrity establishes dependency relationships. Applies only when scripting references a SQL Server ™ table. |
| 24 | DRI Checks | Generated script creates column-specified CHECK constraints. Directs scripting when declarative referential integrity establishes dependency relationships. Applies only when scripting references a SQL Server ™ table. |
| 25 | DRI Defaults | Generated script includes column-specified defaults. Directs scripting when declarative referential integrity establishes dependency relationships. Applies only when scripting references a SQL Server ™ table. |
| 26 | DRI Unique Keys | Generated script creates candidate keys defined using a unique index. Directs scripting when declarative referential integrity establishes dependency relationships. Applies only when scripting references an SQL Server ™ table. |
| 27 | DRI Foreign Keys | Generated script creates FOREIGN KEY constraints. Directs scripting when declarative referential integrity establishes dependency relationships. Applies only when scripting references an SQL Server ™ table. |
| 28 | DRI Primary Key | Generated script creates PRIMARY KEY constraints. Directs scripting when declarative referential integrity establishes dependency relationships. Applies only when scripting references an SQL Server ™ table. |
| 29 | DRI With No Check | When using DRI Checks, DRI Foreign Keys, generated script includes the WITH NOCHECK clause optimizing constraint creation. Applies only when scripting references an SQL Server ™ table. |
| 30 | No Identity | Generated Transact-SQL statements do not include definition of identity property, seed, and increment. Applies only when scripting references an SQL Server ™ table. |
| 31 | Use Quoted Identifiers | Use quote characters to delimit identifier parts when scripting object names. |

[key] string SettingID

Access Type: Read/Write

The identifier by which the setting object is known.

Maximum Length: 256 boolean SourceTranslateChar

Access Type: Read/Write

The SourceTranslateChar property specifies whether to perform character data translation on the source server during a transfer operation. Performing character data translation during a transfer operation can significantly impact server performance if a large amount of data must be translated. The SourceTranslateChar property is set to TRUE by default. Set the DestTranslateChar property to TRUE to perform character translation on the destination server. Set SourceTranslateChar to TRUE to resume character translation on the source server.

[key] string SQLServerName
  Access Type: Read/Write
  The SQLServerName property identifies the SQL Server™ installation that the transfer setting has been defined for.
  Maximum Length: 128 string StoredProcedureName [ ]
  Access Type: Read/Write
  The StoredProcedureName property indicates the names of the stored procedures to be transferred. Note that the name should be in the format of owner.name, since in SQL Server™ the owner of a database object forms part of the identifier for the object.

string TableName [ ]
  Access Type: Read/Write
  The TableName property indicates the names of the tables to be transferred. Note that the name should be in the format of owner.name, since in SQL Server™ the owner of a database object forms part of the identifier for the object.

string TriggerName [ ]
  Access Type: Read/Write
  The TriggerName property indicates the names of the triggers to be transferred. Note that the name should be in the format of owner.name, since in SQL Server™ the owner of a database object forms part of the identifier for the object.

boolean UseCollation
  Access Type: Read/Write
  The UseCollation property controls column-level collation settings when transferring data between computers running an instance of Microsoft® SQL Server™ 2000. If UseCollation is set to TRUE, column-level collation settings are maintained when transferring data between computers running an instance of SQL Server™ 2000 if the code pages are the same on both servers. When transferring data to a computer running an instance of SQL Server™ 2000 using a different code page, all collation settings at the source computer are automatically translated to the code page of the destination server if the code pages settings are different. When transferring data to a computer running an instance of SQL Server™ 7.0 or earlier, all collation settings at the source server are automatically translated to the code page of the destination server if the code pages settings are different. The source database column-level collation is translated accordingly. If UseCollation is set to FALSE, direct data transfer is performed if the code pages are the same on both servers. If the code pages are different, the data is translated from source code page to destination code page. If both computers are running an instance of SQL Server™ 2000 and the source and destination databases are using different code pages, data might be translated to the incorrect code page setting depending on whether the column is using the default or a nor-default collation. Note that setting UseCollation to TRUE can result in a increase in performance overhead if the data contains nor-Unicode data types such as text or varchar. Performance can also be affected by the number of tables, columns, and rows in the source database.

boolean UseDestTransaction
  Access Type: Read/Write
  The UseDestTransaction property controls inclusion of DROP statements in a transaction during a transfer operation. When UseDestTransaction is set to TRUE, the entire transfer operation (including DROP statements, CREATE SCHEMA statements, and data copying) is included in a transaction. If any of these operations fail, the transaction is rolled back. Statistics are updated after the transaction is committed. The default is FALSE. When UseDestTransaction is set to TRUE, the application cannot perform these operations within the transaction—dump the transaction log, change bcp settings, update statistics, and script a full-text catalog.

string ViewName [ ]
  Access Type: Read/Write
  The ViewName property indicates the names of the views to be transferred. Note that the name should be in the format of owner.name, since in SQL Server™ the owner of a database object forms part of the identifier for the object.

MSSQL_Trigger: MSSQL_DBMSObject
  The MSSQL_Trigger class represents a trigger. SQL Server™ supports using triggers as a kind of stored procedure. Triggers are executed when a specified data modification, such as an attempt to delete a row, is attempted on the table on which the trigger is defined.

Properties boolean AfterTrigger
  Access Type: Read-only
  The AfterTrigger property indicates whether a trigger is an AFTER trigger. A value of TRUE indicates that the trigger is an AFTER trigger. AFTER triggers fire after the triggering action (INSERT, UPDATE, or DELETE) and after any constraints have been processed. AFTER triggers can only be created on tables. All triggers created using SQL Server version 7.0 or earlier are AFTER triggers.

boolean AnsiNullsStatus
  Access Type: Read-only
  The AnsiNullsStatus property returns TRUE when the trigger depends on a table exhibiting SQL-92 NULL handling behavior. By default, SQL Server™ creates columns that do not accept NULL when the user does not explicitly declare the ability to accept NULL. Further, SQL Server™ returns TRUE when evaluating the expression NULL=NULL. These default behaviors are nonstandard. Database and client connection options override default SQL Server™ behavior. When the default is overridden, tables created exhibit SQL-92 standard NULL handling and objects that depend upon those tables behave as specified by SQL-92.

string Caption
  Access Type: Read-only
  The Caption property is a short textual description (one-line string) of the object.
  Maximum Length: 64 datetime CreateDate
  Access Type: Read-only
  The CreateDate property indicates the time and date on which the trigger was created. Note that creation date may be different from the install date in cases where the object is created in one place and then installed elsewhere.

[key] string DatabaseName
  Access Type: Read-only
  The DatabaseName property indicates the name of the database that the object is a part of.
  Maximum Length: 128 string Description
  Access Type: Read-only
  The Description property provides a textual description of the object.

boolean Enabled
  Access Type: Read/Write

The Enabled property indicates the state of the trigger. When TRUE, the trigger is enabled. When FALSE, the trigger is disabled.

datetime InstallDate
Access Type: Read-only
The InstallDate property is datetime value indicating when the object was installed. A lack of a value does not indicate that the object is not installed.

boolean InsteadOfTrigger
Access Type: Read-only
The InsteadOfTrigger property indicates whether a trigger is an INSTEAD OF trigger. A value of TRUE indicates that the trigger is an INSTEAD OF trigger. INSTEAD OF triggers are executed instead of the triggering action. INSTEAD OF triggers can also be defined on views, in which case they greatly extend the types of updates a view can support. Each table or view can have one INSTEAD OF trigger for each triggering action (UPDATE, DELETE, and INSERT).

[key] string Name
Access Type: Read-only
The Name property defines the label by which the object is known.

boolean QuotedIdentifierStatus
Access Type: Read-only
The QuotedIdentifierStatus property returns TRUE when the trigger has been created with a dependent on quote characters for identifier determination. When TRUE, identifiers can be delimited by double quotation marks and character literal values must be delimited by single quotation marks. When FALSE, identifiers cannot be quoted and must follow all Transact-SQL rules for identifiers. For example, character literal values can be delimited by either single or double quotation marks.

[key] string SQLServerName
Access Type: Read-only
The SQLServerName property indicates the name of the SQL Server™ installation that the object is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor h one of the other states.
Values are: "OK", "Error", "Degraded", "Unknown", "Pred Fail", "Starting", "Stopping", "Service"
Maximum Length: 10 boolean SystemObject
Access Type: Read-only
The SystemObject property indicates whether the object is owned by Microsoft®. A value of TRUE indicates that the object implementation is owned by Microsoft®.

[key] string TableName
Access Type: Read-only
The TableName property indicates the name of the table that the trigger is defined in.
Maximum Length: 128 string Text
Access Type: Read/Write
The Text property returns the Transact-SQL script that defines the trigger. Note that there is a special requirement for the name of the object is specified in the CREATE statement. The name of the object has to be in the form that includes the name of the owner. For example, in order to create an object named "Some Object", one would need to specify it as [dbo].[Some Object].

uint32 Type
Access Type: Read-only
The Type property indicates the type of the trigger. A trigger can fire when a Transact-SQL INSERT, UPDATE, or DELETE statement modifies data in the table on which the trigger is defined.

| Value | Description | Explanation |
|---|---|---|
| 0 | Unknown | Bad or invalid value. |
| 1 | Insert | Fired by an INSERT statement. |
| 2 | Update | Fired by an UPDATE statement. |
| 4 | Delete | Fired by a DELETE statement. |
| 7 | All | Fired by any data modification statement. |

Methods
The MSSQL_Trigger class supports the following methods:

| Method Name | Description |
|---|---|
| Rename | The Rename method is used to rename the trigger instance. |

Associations
MSSQL_Trigger is associated to MSSQL_Table as the Antecedent property of the MSSQL_TableTrigger association.

MSSQL_UniqueKey: MSSQL_CandidateKey
The MSSQL_UniqueKey object represents a unique key in a database. All candidate keys that are not the primary key are unique keys.

Properties string Caption
Access Type: Read-only
The Caption property is a short textual description (one-line string) of the object.
Maximum Length: 64

[key] string DatabaseName
Access Type: Read-only
The DatabaseName property indicates the name of the database that the key is a part of.
Maximum Length: 128 string Description
Access Type: Read-only
The Description property provides a textual description of the object.

datetime InstallDate
 Access Type: Read-only
 The InstallDate property is datetime value indicating when the object was installed. A lack of a value does not indicate that the object is not installed.

[key] string Name
 Access Type: Read-only
 The Name property defines the label by which the object is known. The name of a key is unique within a database.

[key] string SQLServerName
 Access Type: Read-only
 The SQLServerName property indicates the name of the SQL Server™ installation that the key is a part of.
 Maximum Length: 128 string Status
 Access Type: Read-only
 The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
 Values are: "OK", "Error", "Degraded", "Unknown", "Pred Fail", "Starting", "Stopping", "Service"
 Maximum Length: 10

[key] string TableName
 Access Type: Read-only
 The TableName property indicates the name of the table that the key is defined in.
 Maximum Length: 128

Methods
 The MSSQL_UniqueKey class supports the following methods:

| Method Name | Description |
| --- | --- |
| Create | The Create method is used to create a new unique key instance. |
| RebuildIndex | The RebuildIndex method re-creates an index for a candidate key constraint. |
| Rename | The Rename method is used to rename a unique key instance. |

MSSQL_User: MSSQL_DBMSUserObject
 The MSSQL_User user exposes the attributes of a single Microsoft® SQL Server™ database user.

Properties string Caption
 Access Type: Read-only
 The Caption property is a short textual description (one-line string) of the object.
 Maximum Length: 64

[key] string DatabaseName
 Access Type: Read-only
 The DatabaseName property indicates the name of the database that the user is a part of.
 Maximum Length: 128 string Description
 Access Type: Read-only
 The Description property provides a textual description of the object.

datetime InstallDate
 Access Type: Read-only
 The InstallDate property is datetime value indicating when the object was installed. A lack of a value does not indicate that the object is not installed.

[key] string Name
 Access Type: Read-only
 The Name property defines the label by which the user is known.

[key] string SQLServerName
 Access Type: Read-only
 The SQLServerName property indicates the name of the SQL Server™ installation that the object is a part of.
 Maximum Length: 128 string Status
 Access Type: Read-only
 The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is online, yet the managed element is neither "OK" nor in one of the other states.
 Values are: "OK", "Error", "Degraded", "Unknown", "Pred Fail", "Starting", "Stopping", "Service"
 Maximum Length: 10 boolean SystemObject
 Access Type: Read-only
 The SystemObject property indicates whether the object is owned by Microsoft®. A value of True indicates that the object implementation is owned by Microsoft®.

Methods
 The MSSQL_User class supports the following methods:

| Method Name | Description |
| --- | --- |
| Create | The Create method is used to create a new user. |

Associations
 MSSQL_User is associated to MSSQL_Database as the ScopedElement property of the MSSQL_DatabaseUser association.
 MSSQL_User is associated to MSSQL_DatabaseRole as the Dependent property of the MSSQL_MemberUser association.
 MSSQL_User is associated to MSSQL_Login as the Dependent property of the MSSQL_UserLogin association.

MSSQL_User is associated to MSSQL_Database as the Grantee property of the MSSQL_UserDatabasePermission association.

MSSQL_User is associated to MSSQL_StoredProcedure as the Grantee property of the MSSQL_UserStoredProcedurePermission association.

MSSQL_User is associated to MSSQL_View as the Grantee property of the MSSQL_UserViewPermission association.

MSSQL_User is associated to MSSQL_Table as the Grantee property of the MSSQL_UserTablePermission association.

MSSQL_User is associated to MSSQL_DBMSObject as the Antecedent property of the MSSQL_DBMSObjectOwner association.

MSSQL_User is associated to MSSQL_UserDefinedFunction as the Grantee property of the MSSQL_UserUserDefinedFunctionPermission association.

MSSQL_User is associated to MSSQL_SQLServer as the Containee property of the MSSQL_SQLServerUser association.

MSSQL_UserDatabasePermission: MSSQL_Permission
   Association Class

The MSSQL_UserDatabasePermission class represents the permissions granted to a user for a database. The instances of this class represent only the permission that has been explicitly granted or denied to the user object. For example, if a user has permissions to access a database by virtue of being a member of a certain database role, then there will not be a permission association instance between the user and the database.

Properties boolean Granted
   Access Type: Read/Write
   The Granted property indicates whether the permission has been granted or denied. A value of True indicates that the permission has been granted. A value of False indicates that permission has been denied.

[key] uint32 PrivilegeType
   Access Type: Read/Write
   The PrivilegeType property indicates the type of privilege that has been granted or denied.

| Value | Description |
| --- | --- |
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_Database Element
   Access Type: Read/Write
   The Element property references a SQL Server™ database.

[key] MSSQL_User Grantee
   Access Type: Read/Write
   The Grantee property references a user for whom the permissions have been defined.

MSSQL_UserDatatype: MSSQL_Datatype

The MSSQL_UserDatatype class represents a data type defined by a user.

Properties boolean AllowIdentity
   Access Type: Read-only
   The AllowIdentity property indicates the ability of a data type to participate in a column defined with the identity property. The SQL Server™ identity property is defined for data types that can accept numeric values. A column defined with the identity property is defined with a starting value and a step value. SQL Server™ generates values for the column by querying the last applicable value and adding the step value.

boolean AllowNulls
   Access Type: Read-only
   The AllowNulls property indicates whether the data type has the ability to accept NULL as a value.

string BaseDatatype
   Access Type: Read-only
   The BaseDatatype property indicates the system datatype from which the user datatype was derived.

string Caption
   Access Type: Read-only
   The Caption property is a short textual description (one-line string) of the object.
   Maximum Length: 64 string Caption
   Access Type: Read-only
   The Caption property is a short textual description (one-line string) of the object.
   Maximum Length: 64 string Collation
   Access Type: Read-only
   The Collation property indicates the current collation of a string data type.

[key] string DatabaseName
   Access Type: Read-only
   The DatabaseName property indicates the name of the database that the object is a part of.
   Maximum Length: 128 string Description
   Access Type: Read-only
   The Description property provides a textual description of the object.

datetime InstallDate
   Access Type: Read-only
   The InstallDate property is datetime value indicating when the object was installed. A lack of a value does not indicate that the object is not installed.

boolean IsVariableLength
   Access Type: Read-only

The IsVariableLength property specifies data length handling for a data type. A value of True indicates that the data type supports variable length.

sint32 Length
Access Type: Read-only
The Length property specifies the maximum number of characters or bytes accepted user-defined data type.

sint32 MaxSize
Access Type: Read-only
The MaxSize property returns the greatest length of a data type in bytes, or the precision of the type. For binary and character data types, the MaxSize property returns the greatest number as bytes required to store a string of the type. For the fixed-precision, numeric data types, the MaxSize property returns the maximum precision of the type. For all other referenced data types, the MaxSize property returns the number of bytes required to store a value of the type in a structure representing the type.

[key] string Name
Access Type: Read-only
The Name property defines the label by which the object is known.

sint32 NumericPrecision
Access Type: Read-only
The NumericPrecision property specifies the maximum number of digits in a fixed-precision, numeric data type.

sint32 NumericScale
Access Type: Read-only
The NumericScale property specifies the number of digits to the right of the decimal point in a fixed-precision, numeric data type.

[key] string SQLServerName
Access Type: Read-only
The SQLServerName property indicates the name of the SQL Server installation that the object is a part of.
Maximum Length: 128 string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
Values are: "OK", "Error", "Degraded", "Unknown", "Pred Fail", "Starting", "Stopping", "Service"
Maximum Length: 10

Methods
The MSSQL_UserDatatype class supports the following methods:

| Method Name | Description |
| --- | --- |
| Rename | The Rename method is used to rename the user datatype instance. |

Associations
MSSQL_UserDatatype is associated to MSSQL_Rule as the Dependent property of the MSSQL_UserDatatypeRule association.
MSSQL_UserDatatype is associated to MSSQL_Default as the Dependent property of the MSSQL_UserDatatypeDefault association.
MSSQL_UserDatatype is associated to MSSQL_SystemDatatype as the Dependent property of the MSSQL_BaseDatatype association.

MSSQL_UserDatatypeDefault: CIM Dependency
Association Class
The MSSQL_UserDatatypeDefault class represents an association between a user-defined datatype and the rule bound to the column.

References

[key] MSSQL_Default Antecedent
Access Type: Read-only
The Antecedent property references the rule bound to the user-defined datatype.

[key] MSSQL_UserDatatype Dependent
Access Type: Read-only
The Dependent property references a user-defined datatype.

Methods
The MSSQL_UserDatatypeDefault class supports he following methods:

| Method Name | Description |
| --- | --- |
| Create | The Create method is used to create a new instance. |

MSSQL_UserDatatypeRule: CIM_Dependency
Association Class
The MSSQL_UserDatatypeRule class represents an association between a user defined datatype and the rule bound to the column.

References

[key] MSSQL_Rule Antecedent
Access Type: Read-only
The Antecedent property references the rule bound to the user-defined datatype.

[key] MSSQL_UserDatatype Dependent
Access Type: Read-only
The Dependent property references a user-defined datatype.

Methods
The MSSQL_UserDatatypeDefault class supports the following methods:

Method Name Description
Create The Create method is used to create a new instance.

MSSQL_UserDefinedFunction: MSSQL_DBMSObject
The MSSQL_UserDefinedFunction class represents a user-defined function in the SQL Server™ database.

Properties boolean AnsiNullsStatus
Access Type: Read/Write

The AnsiNullsStatus property returns TRUE when the database object referenced depends on a table exhibiting SQL-92 NULL handling behavior.

string Caption
　Access Type: Read-only
　The Caption property is a short textual description (one-line string) of the object.
　Maximum Length: 64 datetime CreateDate
　Access Type: Read-only
　The CreateDate property indicates the time and date on which the user-defined function was created. Note that creation date may be different from the install date in cases where the object is created in one place and then installed elsewhere.

[key] string DatabaseName
　Access Type: Read-only
　The DatabaseName property indicates the name of the database that the object is a part of.
　Maximum Length: 128 string Description
　Access Type: Read-only
　The Description property provides a textual description of the object.

boolean Deterministic
　Access Type: Read-only
　The Deterministic property specifies whether a user-defined function is a deterministic function. If TRUE, the user-defined function is deterministic. If FALSE, the user-defined function is not deterministic.

datetime InstallDate
　Access Type: Read-only
　The InstallDate property is datetime value indicating when the object was installed. A lack of a value does not indicate that the object is not installed.

[key] string Name
　Access Type: Read-only
　The Name property defines the label by which the object is known.

boolean QuotedIdentifierStatus
　Access Type: Read-only
　The QuotedIdentifierStatus property controls Microsoft® SQL Server™ interpretation of identifier strings in statements submitted for execution. When True, identifiers can be delimited by double quotation marks and character literal values must be delimited by single quotation marks. When False, identifiers cannot be quoted and must follow all Transact SQL rules for identifiers. For example, character literal values can be delimited by either single or double quotation marks.

[key] string SQLServerName
　Access Type: Read-only
　The SQLServerName property indicates the name of the SQL Server™ installation that the object is a part of.
　Maximum Length: 128 string Status
　Access Type: Read-only
　The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
　Values are: "OK", "Error", "Degraded", "Unknown", "Pred Fail", "Starting", "Stopping", "Service"
　Maximum Length: 10 boolean SystemObject
　Access Type: Read-only
　The SystemObject property indicates whether the object is owned by Microsoft®. A value of True indicates that the object implementation is owned by Microsoft®.

string Text
　Access Type: Read/Write
　The Text property indicates the Transact-SQL or other script that defines the object. Note that there is a special requirement for the name of the object is specified in the CREATE statement. The name of the object has to be in the form that includes the name of the owner. For example, in order to create an object named "Some Object", one would need to specify it as [dbo].[Some Object].

Associations
　MSSQL_UserDefinedFunction is associated to MSSQL_DatabaseRole as the Element property of the MSSQL_DatabaseRoleUserDefinedFunctionPermission association.
　MSSQL_UserDefinedFunction is associated to MSSQL_Database as the ScopedElement property of the MSSQL_DatabaseUserDefinedFunction association.
　MSSQL_UserDefinedFunction is associated to MSSQL_User as the Element property of the MSSQL_UserUserDefinedFunctionPermission association.

MSSQL_UserLogin: CIM Dependency
　Association Class
　The MSSQL_UserLogin class represents an association between a database user and the login used to authenticate the user.

References

[key] MSSQL_Login Antecedent
　Access Type: Read-only
　The Antecedent property references the login used to authenticate the user referenced by the Dependent property.

[key] MSSQL_User Dependent
　Access Type: Read-only
　The Dependent property references a database user.

MSSQL_UserStoredProcedurePermission:
　Association Class
　The MSSQL_UserStoredProcedurePermission class represents the permissions granted to a user for a stored procedure. The instances of this class represent only the permission that has been explicitly granted or denied to the user object. For example, if a user has permissions to access a stored procedure by virtue of being a member of a certain database role, then there will not be a permission association instance between the user and the stored procedure.

Properties boolean Granted
　Access Type: Read/Write

The Granted property indicates whether the permission has been granted or denied. A value of True indicates that the permission has been granted. A value of False indicates that permission has been denied.

[key] uint32 PrivilegeType
  Access Type: Read/Write
  The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_StoredProcedure Element
  Access Type: Read-only
  The Element property references a stored procedure.

[key] MSSQL_User Grantee
  Access Type: Read/Write
  The Grantee property references a user for whom the permissions have been defined.

MSSQL_UserTablePermission: MSSQL_Permission
  Association Class
  The MSSQL_UserTablePermission class represents the permissions granted to a user for a table. The instances of this class represent only the permission that has been explicitly granted or denied to the user object. For example, if a user has permissions to access a table by virtue of being a member of a certain database role, then there will not be a permission association instance between the user and the table.

Properties string ColumnName [ ]
  Access Type: Read/Write
  The ColumnName property specifies the columns within the table for which the permission is specified. If this property is null, then the permission applies to all columns in the table, otherwise it applies only to the columns indicated in this property.

boolean Granted
  Access Type: Read/Write
  The Granted property indicates whether the permission has been granted or denied. A value of True indicates that the permission has been granted. A value of False indicates that permission has been denied.

[key] uint32 PrivilegeType
  Access Type: Read/Write
  The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_Table Element
  Access Type: Read-only
  The Element property references a table in SQL Server.

[key] MSSQL_User Grantee
  Access Type: Read-only
  The Grantee property references a user for whom the permissions have been defined.

MSSQL_UserUserDefinedFunctionPermission: MSSQL_Permission
  Association Class
  The MSSQL_UserUserDefinedFunctionPermission class represents the permissions granted to a user for a stored procedure. The instances of this class represent only the permission that has been explicitly granted or denied to the user object. For example, if a user has permissions to access a user defined function by virtue of being a member of a certain database role, then there will not be a permission association instance between the user and the user defined function.

Properties boolean Granted
  Access Type: Read/Write
  The Granted property indicates whether the permission has been granted or denied. A value of True indicates that the permission has been granted. A value of False indicates that permission has been denied.

[key] uint32 PrivilegeType
  Access Type: Read/Write
  The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |

-continued

| Value | Description |
|---|---|
| 32 | Permission to grant DRI on a table |
| 63 | All privileges applicable to the database object |
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_UserDefinedFunction Element
  Access Type: Read/Write
  The Element property references a user-defined function.

[key] MSSQL_User Grantee
  Access Type: Read/Write
  The Grantee property references a user for whom the permissions have been defined.

MSSQL_UserViewPermission: MSSQL_Permission
  Association Class
  The MSSQL_UserViewPermission class represents the permissions granted to a user for a view. The instances of this class represent only the permission that has been explicitly granted or denied to the user object. For example, if a user has permissions to access a view by virtue of being a member of a certain database role, then there will not be a permission association instance between the user and the view.

Properties string ColumnName [ ]
  Access Type: Read/Write
  The ColumnName property specifies the columns within the view for which the permission is specified. If this property is null, then the permission applies to all columns in the view, otherwise it applies only to the columns indicated in this property.

boolean Granted
  Access Type: Read/Write
  The Granted property indicates whether the permission has been granted or denied. A value of True indicates that the permission has been granted. A value of False indicates that permission has been denied.

[key] uint32 PrivilegeType
  Access Type: Read/Write
  The PrivilegeType property indicates the type of privilege that has been granted or denied.

| Value | Description |
|---|---|
| 0 | Unknown |
| 1 | Permission to query a table |
| 2 | Permission to add rows to a table |
| 4 | Permission to update rows of a table |
| 8 | Permission to delete rows of a table |
| 16 | Permission to execute a stored procedure |
| 32 | Permission to grant DRI on a table |
| 63 | All privileges applicable to the database object |

-continued

| Value | Description |
|---|---|
| 128 | Permission to create and own a table |
| 256 | Permission to create and own a database |
| 512 | Permission to create and own a view |
| 1024 | Permission to create and own a stored procedure |
| 2048 | Permission to backup a database |
| 4096 | Permission to create a default |
| 8192 | Permission to backup a database transaction log |
| 16384 | Permission to create a rule |
| 32768 | Permission to backup to a table |
| 65366 | Permission to create a user defined function |
| 130944 | All privileges applicable to the database |

References

[key] MSSQL_View Element
  Access Type: Read-only
  The Element property references a SQL Server™ view.

[key] MSSQL_User Grantee
  Access Type: Read-only
  The Grantee property references a user for which the permissions have been defined.

MSSQL_View: MSSQL_DBMSObject
  The MSSQL_View class represents view tables in the database.

Properties boolean AnsiNullsStatus
  Access Type: Read-only
  The AnsiNullsStatus property returns TRUE when the database object referenced depends on a table exhibiting SQL-92 NULL handling behavior.

string Caption
  Access Type: Read-only
  The Caption property is a short textual description (one-line string) of the object.
  Maximum Length: 64 datetime CreateDate
  Access Type: Read-only
  The CreateDate property indicates the time and date on which the view was created. Note that creation date may be different from the install date in cases where the object is created in one place and then installed elsewhere.

[key] string DatabaseName
  Access Type: Read-only
  The DatabaseName property indicates the name of the database that the object is a part of.
  Maximum Length: 128 string Description
  Access Type: Read-only
  The Description property provides a textual description of the object.

datetime InstallDate
  Access Type: Read-only
  The InstallDate property is datetime value indicating when the object was installed. A lack of a value does not indicate that the object is not installed.

[key] string Name
  Access Type: Read-only
  The Name property defines the label by which the object is known.

boolean QuotedIdentifierStatus

Access Type: Read-only

The QuotedIdentifierStatus property controls Microsoft® SQL Server™ interpretation of identifier strings in statements submitted for execution. When TRUE, identifiers can be delimited by double quotation marks and character literal values must be delimited by single quotation marks. When FALSE, identifiers cannot be quoted and must follow all Transact-SQL rules for identifiers. For example, character literal values can be delimited by either single or double quotation marks.

[key] string SQLServerName

Access Type: Read-only

The SQLServerName property indicates the name of the SQL Server installation that the object is a part of.

Maximum Length: 128 string Status

Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10 boolean SystemObject

Access Type: Read-only

The SystemObject property indicates whether the object is owned by. Microsoft®. A value of True indicates that the object implementation is owned by Microsoft®.

string Text

Access Type: Read/Write

The Text property indicates the Transact-SQL or other script that defines the object. Note that there is a special requirement for the name of the object is specified in the CREATE statement. The name of the object has to be in the form that includes the name of the owner. For example, in order to create an object named "Some Object", one would need to specify it as [dbo].[Some Object].

Methods

The MSSQL_View class supports the following methods:

| Method Name | Description |
| --- | --- |
| ExportData | The ExportData method is used to copy data from a Microsoft ® SQL Server ™ database to a data file. |
| Rename | The Rename method is used to rename an instance of a view. |

Associations

MSSQL_View is associated to MSSQL_Database as the Part Component property of the MSSQL_DatabaseView association.

MSSQL_View is associated to MSSQL_User as the Element property of the MSSQL_UserViewPermission association.

MSSQL_View is associated to MSSQL_DatabaseRole as the Element property of the MSSQL_DatabaseRoleViewPermission association.

C. Win32 Classes

Win32_Account: CIM_LogicalElement

Abstract Class

The Win32_Account class contains information about user accounts and group accounts known to the Win32 system. User or group names recognized by a Windows NT domain are descendents (or members) of this class. The Win32_Account class is not included in a default hardware inventory operation.

Properties string Caption

Access Type: Read-only

The Caption property is a short textual description (one-line string) of the object.

Maximum Length: 64 string Description

Access Type: Read-only

The Description property provides a textual description of the object.

[key] string Domain

Access Type: Read-only

The Domain property indicates the name of the Windows domain to which a group or user belongs. Example: NA-SALES datetime InstallDate Access Type: Read-only The InstallDate property is datetime value indicating when the object was installed. A lack of a value does not indicate that the object is not installed.

[key] string Name

Access Type: Read-only

The Name property indicates the name of the Win32 system account on the domain specified by the Domain member of his class.

string SID

Access Type: Read-only

The SID property contains the security identifier (SID) for this account a SID is a string value of variable length used to identify a trustee. Each account has a unique SID issued by an authority (such as a Windows domain), stored in a security database. When a user logs on, the system retrieves the user's SID from the database and places it in the user's access token. The system uses the SID in the user's access token to identify the user in all subsequent interactions with Windows security. When a SID has been used as the unique identifier for a user or group, it cannot be used again to identify another user or group.

uint8 SIDType

Access Type: Read-only

The SIDType property contains enumerated values that specify the type of security identifier (SID).

| Value | Description | Explanation |
|---|---|---|
| 1 | SidTypeUser | Indicates a user SID. |
| 2 | SidTypeGroup | Indicates a group SID. |
| 3 | SidTypeDomain | Indicates a domain SID. |
| 4 | SidTypeAlias | Indicates an alias SID. |
| 5 | SidTypeWellKnownGroup | Indicates a SID for a well-known group. |
| 6 | SidTypeDeletedAccount | Indicates a SID for a deleted account. |
| 7 | SidTypeInvalid | Indicates an invalid SID. |
| 8 | SidTypeUnknown | Indicates an unknown SID type. |
| 9 | SidTypeComputer | Indicates a SID for a computer. | string Status

Access Type: Read-only

The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Nor-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.

Values are: "OK", "Error", "Degraded", "Unknown", "Pred Fail", "Starting", "Stopping", "Service"

Maximum Length: 10

Associations

Win32_Account is associated to Win32 Group as the Part Component property of the Win32 GroupUser association.

Win32_BaseService: CIM_Service

Abstract Class

The Win32_BaseService class represents executable objects that are installed in a registry database maintained by the Service Control Manager. The executable file associated with a service can be started at boot time by a boot program or by the system. It can also be started on-demand by the Service Control Manager. Any service or process that is not owned by a specific user, and that provides an interface to some functionality supported by the computer system, is a descendent (or member) of this class. Example: The dynamic host configuration protocol (DHCP) client service on a Windows NT/Windows 2000 computer system.

Properties boolean AcceptPause

Access Type: Read-only

The AcceptPause property indicates whether the service can be paused. Values: TRUE or FALSE. A value of TRUE indicates the service can be paused.

boolean AcceptStop

Access Type: Read-only

The AcceptStop property indicates whether the service can be stopped. Values: TRUE or FALSE. A value of TRUE indicates the service can be stopped.

string Caption

Access Type: Read-only

The Caption property is a short textual description (one-line string) of the object.

Maximum Length: 64 string CreationClassName

Access Type: Read-only

CreationClassName indicates the name of the class or the subclass used in the creation of an instance. When used with the other key properties of this class, this property allows all instances of this class and its subclasses to be uniquely identified.

string Description

Access Type: Read-only

The Description property provides a textual description of the object.

boolean DesktopInteract

Access Type: Read-only

The DesktopInteract property indicates whether the service can create or communicate with windows on the desktop. Values: TRUE or FALSE. A value of TRUE indicates the service can create or communicate with windows on the desktop.

string DisplayName

Access Type: Read-only

The DisplayName property indicates the display name of the service. This string has a maximum length of 256 characters. The name is case-preserved in the Service Control Manager. DisplayName comparisons are always case-insensitive. Constraints: Accepts the same value as the Name property. Example: At disk.

string Error Control

Access Type: Read-only

If this service fails to start during startup, the Error Control property specifies the severity of the error. The value indicates the action taken by the startup program if failure occurs. All errors are logged by the computer system. The computer system does not notify the user of "Ignore" errors. With "Normal" errors the user is notified. With "Severe" errors, the system is restarted with the last-known-good configuration. Finally, on "Critical" errors the system attempts to restart with a good configuration.

Values are: "Ignore", "Normal", "Severe", "Critical", "Unknown"

uint32 ExitCode

Access Type: Read-only

The ExitCode property specifies a Win32 error code defining any problems encountered in starting or stopping the service. This property is set to ERROR_SERVICE_SPECIFIC_ERROR (1066) when the error is unique to the service represented by this class, and information about the error is available in the ServiceSpecificExitCode member. The service sets this value to NO_ERROR when running, and again upon normal termination.

datetime InstallDate

Access Type: Read-only

The InstallDate property is datetime value indicating when the object was installed. A lack of a value does not indicate that the object is not installed.

[key] string Name

Access Type: Read-only

The Name property uniquely identifies the service and provides an indication of the functionality that is managed. This functionality is described in more detail in the object's Description property.

string PathName
    Access Type: Read-only
    The PathName property contains the fully qualified path to the service binary file that implements the service. Example: \SystemRoot\System32\drivers\afd.sys uint32 ServiceSpecificExitCode
    Access Type: Read-only
    The ServiceSpecificExitCode property specifies a service-specific error code for errors that occur while the service is either starting or stopping. The exit codes are defined by the service represented by this class. This value is only set when the ExitCodeproperty value is ERROR_SERVICE_SPECIFIC_ERROR, 1066.

string ServiceType
    Access Type: Read-only
    The ServiceType property supplies the type of service provided to calling processes.
    Values are: "Kernel Driver", "File System Driver", "Adapter", "Recognizer Driver", "Own Process", "Share Process", "Interactive Process"

boolean Started
    Access Type: Read-only
    Started is a boolean indicating whether the service has been started (TRUE), or stopped (FALSE).

string StartMode
    Access Type: Read-only
    The StartMode property indicates the start mode of the Win32 base service. "Boot" specifies a device driver started by the operating system loader. This value is valid only for driver services. "System" specifies a device driver started by the IoInitSystem function. This value is valid only for driver services. "Automatic" specifies a service to be started automatically by the service control manager during system startup. "Manual" specifies a service to be started by the service 21 control manager when a process calls the StartService function. "Disabled" specifies a service that can no longer be started.
    Values are: "Boot", "System", "Auto", "Manual", "Disabled"

string StartName
    Access Type: Read-only
    The StartName property indicates the account name under which the service runs. Depending on the service type, the account name may be in the form of "DomainName\Username". The service process will be logged using one of these two forms when it runs. If the account belongs to the built-in domain, "\.Username" can be specified. If NULL is specified, the service will be logged on as the LocalSystem account. For kernel or system level drivers, StartName contains the driver object name (that is, \FileSystem\Rdr or \Driver\Xns) which the input and output (I/O) system uses to load the device driver. Additionally, if NULL is specified, the driver runs with a default object name created by the I/O system based on the service name. Example: DWDOM\Admin.

string State
    Access Type: Read-only
    The State property indicates the current state of the base service.
    Values are: "Stopped", "Start Pending", "Stop Pending", "Running", "Continue Pending", "Pause Pending", "Paused", "Unknown"

string Status
    Access Type: Read-only
    The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is on-line, yet the managed element is neither "OK" nor in one of the other states.
    Values are: "OK", "Error", "Degraded", "Unknown", "Pred Fail", "Starting", "Stopping", "Service"
    Maximum Length: 10 string SystemCreationClassName
    Access Type: Read-only
    The type name of the system that hosts this service.

string SystemName
    Access Type: Read-only
    The name of the system that hosts this service.

uint32 TagId
    Access Type: Read-only
    The TagId property specifies a unique tag value for this service in the group. A value of 0 indicates that the service has not been assigned a tag. A tag can be used for ordering service startup within a load order group by specifying a tag order vector in the registry located at: HKEY_LOCAL_MACHINE\System\CurrentControlSet\Control\GroupOr derList. Tags are only evaluated for Kernel Driver and File System Driver start type services that have "Boot" or "System" start modes.

Methods
    The Win32_BaseService class supports the following methods:

| Method Name | Description |
| --- | --- |
| Change | The Change method modifies a service. |
| ChangeStartMode | The ChangeStartMode method modifies the StartMode of a service. |
| Create | The Create method creates a new service. |
| Delete | The Delete method deletes an existing service. |
| InterrogateService | The InterrogateService method requests that the service update its state to the service manager. |
| PauseService | The PauseService method attempts to place the service in the paused state. |
| ResumeService | The ResumeService method attempts to place the service in the resumed state. |
| StartService | The StartService method places the service in the started state. |
| StopService | The StopService method places the service in the stopped state. |
| UserControlService | The UserControlService method attempts to send a user-defined control code to a service. |

Win32_Group: Win32_Account
    The Win32_Group class represents data about a group account. A group account allows access privileges to be changed for a list of users. Example: Marketing2.

Properties string Caption
    Access Type: Read-only

The Caption property is a short textual description (one-line string) of the object.
Maximum Length: 64 string Description
Access Type: Read-only
The Description property provides a textual description of the object.

[key] string Domain
Access Type: Read-only
The Domain property indicates the name of the Windows domain to which the group account belongs. Example: NA-SALES datetime InstallDate
Access Type: Read-only
The InstallDate property is datetime value indicating when the object was installed. A lack of a value does not indicate that the object is not installed.

[key] string Name
Access Type: Read-only
The Name property indicates the name of the Win32 group account on the domain specified by the Domain member of his class.

string SID
Access Type: Read-only
The SID property contains the security identifier (SID) for this account a SID is a string value of variable length used to identify a trustee. Each account has a unique SID issued by an authority (such as a Windows domain), stored in a security database. When a user logs on, the system retrieves the user's SID from the database and places it in the user's access token. The system uses the SID in the user's access token to identify the user in all subsequent interactions with Windows security. When a SID has been used as the unique identifier for a user or group, it cannot be used again to identify another user or group.

uint8 SIDType
Access Type: Read-only
The SIDType property contains enumerated values that specify the type of security identifier (SID).

| Value | Description | Explanation |
|---|---|---|
| 1 | SidTypeUser | Indicates a user SID. |
| 2 | SidTypeGroup | Indicates a group SID. |
| 3 | SidTypeDomain | Indicates a domain SID. |
| 4 | SidTypeAlias | Indicates an alias SID. |
| 5 | SidTypeWellKnownGroup | Indicates a SID for a well-known group. |
| 6 | SidTypeDeletedAccount | Indicates a SID for a deleted account. |
| 7 | SidTypeInvalid | Indicates an invalid SID. |
| 8 | SidTypeUnknown | Indicates an unknown SID type. |
| 9 | SidTypeComputer | Indicates a SID for a computer. | string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.
Values are: "OK", "Error", "Degraded", "Unknown", "Pred Fail", "Starting", "Stopping", "Service"
Maximum Length: 10

Associations
Win32_Group is associated to Win32 Account as the GroupComponent property of the Win32 GroupUser association.
Win32_Group is associated to MSSQL_Login as the Antecedent property of the MSSQL_LoginWin32Group association.

Win32 GroupUser: CIM Component
Association Class
The Win32_GroupUser class represents an association between a group and an account that is a member of that group.

References

[key] Win32_Group GroupComponent
Access Type: Read-only
The GroupComponent reference represents a group that the account is a member of.

[key] Win32 Account Part Component
Access Type: Read-only
The Part Component reference represents a user or system account that is a part of a group of accounts.

Win32_Process: CIM_Process
The Win32_Process class represents a sequence of events on a Win32 system. Any sequence consisting of the interaction of one or more processors or interpreters, some executable code, and a set of inputs, is a descendent (or member) of this class. Example: A client application running on a Win32 system.

Properties string Caption
Access Type: Read-only
The Caption property is a short textual description (one-line string) of the object.
Maximum Length: 64 string CreationClassName
Access Type: Read-only
The inherited CreationClassName property indicates the name of the class or the subclass used in the creation of an instance. When used with the other key properties of this class, this property allows all instances of this class and its subclasses to be uniquely identified.

datetime CreationDate
Access Type: Read-only
Time that the process began executing string CSCreationClassName
Access Type: Read-only
The inherited CSCreationClassName property is a string indicating the class of the computer system.

string CSName
Access Type: Read-only
The inherited CSName property is a string indicating the name of the computer system.

string Description
    Access Type: Read-only
    The Description property provides a textual description of the object.

string ExecutablePath
    Access Type: Read-only
    The ExecutablePath property indicates the path to the executable file of the process. Example: C:\WINDOWS\EXPLORER.EXE
    Privileges Required: Debug (SeDebugPrivilege)

uint16 ExecutionState
    Access Type: Read-only
    Indicates the current operating condition of the process.

| Value | Description |
|-------|-------------|
| 0 | Unknown |
| 1 | Other |
| 2 | Ready |
| 3 | Running |
| 4 | Blocked |
| 5 | Suspended Blocked |
| 6 | Suspended Ready |

[key] string Handle
    Access Type: Read-only
    A string used to identify the process. A process ID is a process handle.

uint32 HandleCount
    Access Type: Read-only
    The HandleCount property specifies the total number of handles currently open by this process. This number is the sum of the handles currently open by each thread in this process. A handle is used to examine or modify the system resources. Each handle has an entry in an internally maintained table. These entries contain the addresses of the resources and the means to identify the resource type.

datetime InstallDate
    Access Type: Read-only
    The InstallDate property is datetime value indicating when the object was installed. A lack of a value does not indicate that the object is not installed.

uint64 KernelModeTime
    Access Type: Read-only
    Time in kernel mode, in milliseconds. If this information is not available, a value of 0 should be used.
    Units: Milliseconds (ms)

uint32 MaximumWorkingSetSize
    Access Type: Read-only
    The MaximumWorkingSetSize property indicates the maximum working set size of the process. The working set of a process is the set of memory pages currently visible to the process in physical RAM. These pages are resident and available for an application to use without triggering a page fault. Example: 1413120.
    Privileges Required: Debug (SeDebugPrivilege)
    Units: Kilobytes uint32 MinimumWorkingSetSize
    Access Type: Read-only
    The MinimumWorkingSetSize property indicates the minimum working set size of the process. The working set of a process is the set of memory pages currently visible to the process in physical RAM. These pages are resident and available for an application to use without triggering a page fault. Example: 20480.
    Privileges Required: Debug (SeDebugPrivilege)
    Units: Kilobytes string Name
    Access Type: Read-only
    The Name property defines the label by which the object is known. When subclassed, the Name property can be overridden to be a Key property.

string OSCreationClassName
    Access Type: Read-only
    The inherited OSCreationClassName property indicates the name of the class or the subclass used in the creation of an instance. When used with the other key properties of this class, this property allows all instances of this class and its subclasses to be uniquely identified.

string OSName
    Access Type: Read-only
    The inherited OSName property serves as key of an operating system instance within a computer system.

uint64 OtherOperationCount
    Access Type: Read-only
    The OtherOperationCount property specifies the number of I/O operations performed, other than read and write operations.

uint64 OtherTransferCount
    Access Type: Read-only
    The OtherTransferCount property specifies the amount of data transferred during operations other than read and write operations.
    Units: Bytes uint32 PageFaults
    Access Type: Read-only
    The PageFaults property indicates the number of page faults generated by the process. Example: 10 uint32 PageFileUsage
    Access Type: Read-only
    The PageFileUsage property indicates the amount of page file space currently being used by the process. Example: 102435
    Units: Kilobytes uint32 ParentProcessId
    Access Type: Read-only
    The ParentProcessId property specifies the unique identifier of the process that created this process. Process identifier numbers are reused, so they only identify a process for the lifetime of that process. It is possible that the process identified by ParentProcessId has terminated, so ParentProcessId may not refer to a running process. It is also possible that ParentProcessId incorrectly refers to a process which re-used that process identifier. The CreationDate property can be used to determine whether the specified parent was created after this process was created.

uint32 PeakPageFileUsage
    Access Type: Read-only
    The PeakPageFileUsage property indicates the maximum amount of page file space used during the life of the process. Example: 102367
    Units: Kilobytes uint64 PeakVirtualSize
    Access Type: Read-only The PeakVirtualSize property specifies the maximum visual address space the process has used at any one time. Use of virtual address space does not necessarily imply corresponding use of either disk or main memory pages. However, virtual space is finite, and by using too much, the process might limit its ability to load libraries.
Units: Bytes uint32 PeakWorkingSetSize
Access Type: Read-only
The PeakWorkingSetSize property indicates the peak working set size of the process. Example: 1413120
Units: Kilobytes uint32 Priority
Access Type: Read-only
The Priority property indicates the scheduling priority of the process within the operating system. The higher the value, the higher priority the process receives. Priority values can range from 0 (lowest priority) to 31 (highest priority). Example: 7.

uint64 PrivatePageCount
Access Type: Read-only
The PrivatePageCount property specifies the current number of pages allocated that are accessible only to this process.

uint32 ProcessId
Access Type: Read-only
The ProcessId property contains the global process identifier that can be used to identify a process. The value is valid from the creation of the process until the process is terminated.

uint32 QuotaNonPagedPoolUsage
Access Type: Read-only
The QuotaNonPagedPoolUsage property indicates the quota amount of non-paged pool usage for the process. Example: 15 uint32 QuotaPagedPoolUsage
Access Type: Read-only
The QuotaPagedPoolUsage property indicates the quota amount of paged pool usage for the process. Example: 22 uint32 QuotaPeakNonPagedPoolUsage
Access Type: Read-only
The QuotaPeakNonPagedPoolUsage property indicates the peak quota amount of nor-paged pool usage for the process. Example: 31 uint32 QuotaPeakPagedPoolUsage
Access Type: Read-only
The QuotaPeakPagedPoolUsage property indicates the peak quota amount of paged pool usage for the process. Example: 31 uint64 ReadOperationCount
Access Type: Read-only
The ReadOperationCount property specifies the number of read operations performed.

uint64 ReadTransferCount
Access Type: Read-only
The ReadTransferCount property specifies the amount of data read.
Units: Bytes uint32 SessionId
Access Type: Read-only
The SessionId property specifies the unique identifier that is generated by the operating system when the session is created. A session spans a period of time from log in to log out on a particular system.

string Status
Access Type: Read-only
The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
Values are: "OK", "Error", "Degraded", "Unknown", "Pred Fail", "Starting", "Stopping", "Service"
Maximum Length: 10 datetime TerminationDate
Access Type: Read-only
Time that the process was stopped or terminated.

uint32 ThreadCount
Access Type: Read-only
The ThreadCount property specifies the number of active threads in this process. An instruction is the basic unit of execution in a processor, and a thread is the object that executes instructions. Every running process has at least one thread. This property is for computers running Windows NT only.

uint64 UserModeTime
Access Type: Read-only
Time in user mode, in milliseconds. If this information is not available, a value of 0 should be used.
Units: Milliseconds (ms)

uint64 VirtualSize
Access Type: Read-only
The VirtualSize property specifies the current size in bytes of the virtual address space the process is using. Use of virtual address space does not necessarily imply corresponding use of either disk or main memory pages. Virtual space is finite, and by using too much, the process can limit its ability to load libraries.
Units: Bytes string WindowsVersion
Access Type: Read-only
The WindowsVersion property indicates the version of Windows in which the process is running. Example: 4.0 uint64 WorkingSetSize
Access Type: Read-only
The amount of memory in bytes that a process needs to execute efficiently, for an operating system that uses page-based memory management. If an insufficient amount of memory is available (<working set size), thrashing will occur. If this information is not known, NULL or 0 should be entered. If this data is provided, it could be monitored to understand a process' changing memory requirements as execution proceeds.
Units: Bytes uint64 WriteOperationCount
Access Type: Read-only The WriteOperationCount property specifies the number of write operations performed.

uint64 WriteTransferCount
　Access Type: Read-only
　The WriteTransferCount property specifies the amount of data written.
　Units: Bytes Methods
　The Win32_Process class supports the following methods:

| Method Name | Description |
| --- | --- |
| Create | The Create method creates a new process. |
| GetOwner | The GetOwner method retrieves the user name and domain name under which the process is running. |
| GetOwnerSid | The GetOwnerSid method retrieves the security identifier (SID) for the owner of this process. |
| Terminate | The Terminate method terminates a process and all of its threads. |

Win32-Service: Win32-BaseService
　The Win32_Service class represents a service on a Win32 computer system. A service application conforms to the interface rules of the Service Control Manager (SCM) and can be started by a user automatically at system boot through the Services control panel utility, or by an application that uses the service functions included in the Win32 API. Services can execute even when no user is logged on to the system.

Properties boolean AcceptPause
　Access Type: Read-only
　The AcceptPause property indicates whether the service can be paused. Values: TRUE or FALSE. A value of TRUE indicates the service can be paused.

boolean AcceptStop
　Access Type: Read-only
　The AcceptStop property indicates whether the service can be stopped. Values: TRUE or FALSE. A value of TRUE indicates he service can be stopped.

string Caption
　Access Type: Read-only
　The Caption property is a short textual description (one-line string) of the object.
　Maximum Length: 64 uint32 Checkpoint
　Access Type: Read-only
　The CheckPoint property specifies a value that the service increments periodically to report its progress during a lengthy start, stop, pause, or continue operation. For example, the service should increment this value as it completes each step of its initialization when it is starting up. The user interface program that invoked the operation on the service uses this value to track the progress of the service during a lengthy operation. This value is not valid and should be zero when the service does not have a start, stop, pause, or continue operation pending.

string CreationClassName
　Access Type: Read-only
　CreationClassName indicates the name of the class or the subclass used in the creation of an instance. When used with the other key properties of this class, this property allows all instances of this class it and its subclasses to be uniquely identified.

string Description
　Access Type: Read-only
　The Description property provides a textual description of the object.

boolean DesktopInteract
　Access Type: Read-only
　The DesktopInteract property indicates whether the service can create or communicate with windows on the desktop. Values: TRUE or FALSE. A value of TRUE indicates the service can create or communicate with windows on the desktop.

string DisplayName
　Access Type: Read-only
　The DisplayName property indicates the display name of the service. This string has a maximum length of 256 characters. The name is case-preserved in the Service Control Manager. DisplayName comparisons are always case-insensitive.
　Constraints: Accepts the same value as the Name property.
　Example: Atdisk.

string Error Control
　Access Type: Read-only
　If this service fails to start during startup, the Error Control property specifies the severity of the error. The value indicates the action taken by the startup program if failure occurs. All errors are logged by the computer system. The computer system does not notify the user of "Ignore" errors. With "Normal" errors the user is notified. With "Severe" errors, the system is restarted with the last-known-good configuration. Finally, on "Critical" errors the system attempts to restart with a good configuration.
　Values are: "Ignore", "Normal", "Severe", "Critical", "Unknown"

uint32 ExitCode
　Access Type: Read-only
　The ExitCode property specifies a Win32 error code defining any problems encountered in starting or stopping the service. This property is set to ERROR_SERVICE_SPECIFIC_ERROR (1066) when the error is unique to the service represented by this class, and information about the error is available in the ServiceSpecificExiCode member. The service sets this value to NO_ERROR when running, and again upon normal termination.

datetime InstallDate
　Access Type: Read-only
　The InstallDate property is datetime value indicating when the object was installed. A lack of a value does not indicate that the object is not installed.

[key] string Name
　Access Type: Read-only
　The Name property uniquely identifies the service and provides an indication of the functionality that is managed. This functionality is described in more detail in the object's Description property.

string PathName
　Access Type: Read-only
　The PathName property contains the fully qualified path to the service binary file that implements the service.
　Example: \SystemRoot\System32\drivers\afd.sys uint32 ProcessId
    Access Type: Read-only
    The ProcessId property specifies the process identifier of the service. Example: 324 uint2 ServiceSpecificExitCode
    Access Type: Read-only
    The ServiceSpecificExitCode property specifies a service-specific error code for errors that occur while the service is either starting or stopping. The exit codes are defined by the service represented by this class. This value is only set when the ExitCodeproperty value is ERROR_SERVICE_SPECIFIC_ERROR, 1066.

string ServiceType
    Access Type: Read-only
    The ServiceType property supplies the type of service provided to calling processes.
    Values are: "Kernel Driver", "File System Driver", "Adapter", "Recognizer Driver", "Own Process", "Share Process", "Interactive Process"

boolean Started
    Access Type: Read-only
    Started is a boolean indicating whether the service has been start ed (TRUE), or stopped (FALSE).

string StartMode
    Access Type: Read-only
    The StartMode property indicates the start mode of the Win32 base service. "Boot" specifies a device driver started by the operating system loader. This value is valid only for driver services. "System" specifies a device driver started by the IoInitSystem function. This value is valid only for driver services. "Automatic" specifies a service to be started automatically by the service control manager during system startup. "Manual" specifies a service to be started by the service control manager when a process calls the StartService function. "Disabled" specifies a service that can no longer be started.
    Values are: "Boot", "System", "Auto", "Manual", "Disabled"

string StartName
    Access Type: Read-only
    The StartName property indicates the account name under which the service runs. Depending on the service type, the account name may be in the form of "DomainName\Username". The service process will be logged using one of these two forms when it runs. If the account belongs to the built-in domain, ".\Username" can be specified. If NULL is specified, the service will be logged on as the LocalSystem account. For kernel or system level drivers, StartName contains the driver object name (that is, \FileSystem\Rdr or \Driver\Xns) which the input and output (I/O) system uses to load the device driver. Additionally, if NULL is specified, the driver runs with a default object name created by the I/O system based on the service name. Example: DWDOMAdmin.

string State
    Access Type: Read-only
    The State property indicates the current state of the base service.
    Values are: "Stopped", "Start Pending", "Stop Pending", "Running", "Continue Pending", "Pause Pending", "Paused", "Unknown"

string Status
    Access Type: Read-only
    The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.
    Values are: "OK", "Error", "Degraded", "Unknown", "Pred Fail", "Starting", "Stopping", "Service"
    Maximum Length: 10 string SystemCreationClassName
    Access Type: Read-only
    The type name of the system that hosts this service.

string SystemName
    Access Type: Read-only
    The name of the system that hosts this service.

uint32 TagId
    Access Type: Read-only
    The TagId property specifies a unique tag value for this service in the group. A value of 0 indicates that the service has not been assigned a tag. A tag can be used for ordering service startup within a load order group by specifying a tag order vector in the registry located at: HKEY_LOCAL_MACHINE\System\CurrentControlSet\Control\GroupOr derList. Tags are only evaluated for Kernel Driver aid File System Driver start type services that have "Boot" or "System" start modes.

uint32 WaitHint
    Access Type: Read-only
    The WaitHint property specifies the estimated time required (in milliseconds) for a pending start, stop, pause, or continue operation. After the specified amount of time has elapsed, the service makes its next call to the SetServiceStatus function with either an incremented CheckPoint value or a change in CurrentState. If the amount of time specified by WaitHint passes, and CheckPoint has not been incremented, or the CurrentState has not changed, the service control manager or service control program assumes that an error has occurred.

Methods
    The Win32_Service class supports the following methods:

| Method Name | Description |
| --- | --- |
| Change | The Change method modifies a service. |
| ChangeStartMode | The ChangeStartMode method modifies the StartMode of a service. |
| Create | The Create method creates a new service. |
| Delete | The Delete method deletes an existing service. |
| InterrogateService | The InterrogateService method requests that the service update its state to the service manager. |
| PauseService | The PauseService method attempts to place the service in the paused state. |
| ResumeService | The ResumeService method attempts to place the service in the resumed state. |
| StartService | The StartService method places the service in the started state. |
| StopService | The StopService method places the service in the stopped state. |

-continued

| Method Name | Description |
| --- | --- |
| UserControlService | The UserControlService method attempts to send a user-defined control code to a service. |

Associations

Win32_Service is associated to MSSQL_FullTextCatalogService as the SystemElement property of the MSSQL_FullTextWin32Service association.

Win32_UserAccount: Win32_Account

The Win32_UserAccount class contains information about a user account on a Win32 system.

Properties uint32 AccountType
 Access Type: Read-only
 The AccountType property contains flags describing the characteristics of a Win32 user account

| Bit Position | Description | Explanation |
| --- | --- | --- |
| 8 | Temporary duplicate account | Local user account for users whose primary account is in another domain. This account provides user access to this domain, but not to any domain that trusts this domain. |
| 9 | Normal account | Default account type that representing a typical user. |
| 11 | Interdomain trust account | Account is for a system domain that trusts other domains. |
| 12 | Workstation trust account | This is a computer account for a Windows NT/Windows 2000 machine that is a member of this domain. |
| 13 | Server trust account | Account is for a system backup domain controller that is a member of this domain. | string Caption
 Access Type: Read-only
 The Caption property is a short textual description (one-line string) of the object.
 Maximum Length: 64 string Description
 Access Type: Read-only
 The Description property provides a textual description of the object.

boolean Disabled
 Access Type: Read-only
 The Disabled property determines whether the Win32 user account is disabled. Values: TRUE or FALSE. If TRUE, the user account is disabled.

[key] string Domain
 Access Type: Read-only
 The Domain property indicates the name of the Windows domain to which the user account belongs. Example: NA-SALES string FullName
 Access Type: Read-only
 The FullName property indicates the full name of the local user. Example: Thomas Williams datetime InstallDate
 Access Type: Read-only
 The InstallDate property is datetime value indicating when the object was installed. A lack of a value does not indicate that the object is not installed.

boolean Lockout
 Access Type: Read-only
 The Lockout property determines whether the user account is locked out of the Win32 system. Values: TRUE or FALSE. If TRUE, the user account is locked out.

[key] string Name
 Access Type: Read-only
 The Name property indicates the name of the Win32 user account on the domain specified by the Domain member of this class. Example: thomasw boolean PasswordChangeable
 Access Type: Read-only
 The PasswordChangeable property determines whether the password on the Win32 user account can be changed. Values: TRUE or FALSE. If TRUE, the password can be changed.

boolean PasswordExpires
 Access Type: Read-only
 The PasswordExpires property determines whether the password on the Win32 user account will expire. Values: TRUE or FALSE. If TRUE, the password will expire.

boolean PasswordRequired
 Access Type: Read-only
 The PasswordRequired property determines whether a password is required on the Win32 user account. Values: TRUE or FALSE. If TRUE, a password is required.

string SID
 Access Type: Read-only
 The SID property contains the security identifier (SID) for this account. a SID is a string value of variable length used to identify a trustee. Each account has a unique SID issued by an authority (such as a Windows domain), stored in a security database. When a user logs on, the system retrieves the user's SID from the database and places it in the user's access token. The system uses the SID in the user's access token to identify the user in all subsequent interactions with Windows security. When a SID has been used as the unique identifier for a user or group, it cannot be used again to identify another user or group.

uint8 SIDType
 Access Type: Read-only
 The SIDType property contains enumerated values that specify the type of security identifier (SID).

| Value | Description | Explanation |
| --- | --- | --- |
| 1 | SidTypeUser | Indicates a user SID. |
| 2 | SidTypeGroup | Indicates a group SID. |
| 3 | SidTypeDomain | Indicates a domain SID. |
| 4 | SidTypeAlias | Indicates an alias SID. |
| 5 | SidTypeWellKnownGroup | Indicates a SID for a well-known group. |
| 6 | SidTypeDeletedAccount | Indicates a SID for a deleted account. |
| 7 | SidTypeInvalid | Indicates an invalid SID. |
| 8 | SidTypeUnknown | Indicates an unknown SID type. |
| 9 | SidTypeComputer | Indicates a SID for a computer. | string Status
   Access Type: Read-only
   The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror-resilvering of a disk, reload of a user permissions list, or other administrative work. Not all such work is online, yet the managed element is neither "OK" nor in one of the other states.
   Values are: "OK", "Error", "Degraded", "Unknown", "red Fail", "Starting", "Stopping", "Service"
   Maximum Length: 10

Associations
   Win32_UserAccount is associated to MSSQL_Login as the Antecedent property of the MSSQL_LoginWin32UserAccount association.
   Conclusion
   Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims.

The invention claim is:

1. A computer comprising:
   memory configured to store an operating system, the operating system having an object-oriented management service to monitor, configure, and control systems, services, and applications represented by objects; and
   a schema for a structured query language (SQL) database maintained by the object-oriented service of the operating system, the schema being configured to represent a SQL database system for the object-oriented management service and to permit manipulation of classes to model the objects that represent systems, services, and applications, the classes include:
   database objects class that represents components of the SQL database system;
   application system class that represents installation parameters of the SQL database system;
   security class that represents security features pertaining to use of the SQL database system;
   physical storage class that represents physical files and file groups used by the SQL database system to store data;
   bulk data class that represents bulk data operations with the data in the SQL database.

2. A computer as recited in claim 1, wherein:
   the database objects class comprises multiple classes representing tables, views, stored procedures, indexes, constraints, and keys;
   the application system class comprises multiple classes representing settings, services, and transaction and error logs used by the database system; and
   the security class comprises multiple classes representing users, roles, authentication login, and permissions for the users and the roles.

3. A computer as recited in claim 2, wherein permissions are modeled as association classes between database objects class and the users and roles.

4. A computer comprising:
   memory configured to store an operating system, the operating system having an object-oriented management service to monitor, configure and control systems, services, and applications that are represented as objects; and
   a schema for a structured query language (SQL) database maintained by the object-oriented service of the operating system, the schema being configured to represent the SQL database for the object-oriented management service and to permit manipulation of classes to model the objects that represent systems, services, and applications, the classes include:
   a SQL setting class to represent settings that are used to configure an installation of the database;
   a SQL database setting class to represent operational settings for the database;
   a SQL configuration value class to represent configuration values;
   a SQL language setting class to expose properties of a language record;
   a SQL registry setting class to represent the installation and run-time parameters stored in the registry;
   a SQL server connection setting class to represent default connection settings;
   a SQL objects class to represent objects in a SQL database;
   a SQL database class to represent instances of the SQL database; a SQL server class to represent instances of a SQL server;
   a SQL server configuration value class to associate a SQL server installation and the configured value settings for the installation;
   a SQL server language setting class to associate a SQL server installation and its language settings;
   a SQL server registry setting class to associate a SQL server installation and its registry setting; and
   a SQL server database class to associate a SQL server installation and a database that is part of the installation.

5. A computer as recited in claim 4, wherein the SQL objects class comprises at least one of the following properties:
   a name property that defines a label by which an object in the objects class is known; and
   a status property to indicate a current status of the object.

6. A computer as recited in claim 4, wherein the SQL database class comprises at least one of the following properties:
   a collation property to specify a column-level collation of a string datatype in the database;
   a create-for-attach property to control database file creation;
   a database status property to indicate a current operational status on the database;
   a name property to define a label by which an object is known;
   a primary file path property to return a path and name of an operating system directory containing a primary file for the database;
   a size property to expose a total size of the database;
   a space available property that returns an amount of disk resource allocated and unused; and
   a status property to indicate a current status of the object.

7. A computer as recited in claim 4, wherein the SQL server class comprises at least one of the following properties:
   a collation property to specify a column-level collation of a string datatype in the database;

a name property to define a label by which an object is known;

a status property to indicate a current status of the object; and a user profile property to return a high-level role description for a login used by a current connection.

8. A computer comprising:

memory configured to store an operating system having an object-oriented management service to monitor, configure and control systems, services, and applications represented by objects; and a schema for a structured query language (SQL) database maintained by the object-oriented service of the operating system, the schema being configured to represent the SQL database for the object-oriented management system in an object-oriented manner and to manipulate classes included in the SQL database to model the objects that represent systems, services, and applications to the operating system, the classes include:

a SQL error log class to represent at least one error log;

a SQL error log entry class to represent entries in the error log;

a SQL transaction log to represent a transaction log in the SQL database;

a SQL objects class to represent objects in the SQL database;

a SQL database class to represent instances of the SQL database; a

SQL server class to represent instances of a SQL Server;

a SQL error log error log entry class to represent an association between the error log and an entry in the error log;

a SQL server error log class to represent an association between a server installation and the error log used by the installation;

a SQL error log data file class to represent an association between the error log and an operating system file used to store the error log;

a SQL transaction log data file class to represent an association between the transaction log and an operating system file that is used to store the log;

a SQL database transaction log class to represent an association between the database and the transaction log for the database; and a SQL server database class to associate a SQL server installation and a database that is part of the installation.

9. A computer as recited in claim 8, wherein the SQL error log class comprises at least one of the following properties:

a last modified property to indicate a time and date that the error log was last modified; and a status property to indicate a current status of an object in the database.

10. A computer as recited in claim 8, wherein the SQL objects class comprises at least one of the following properties:

a property that defines a label by which an object in the objects class is known; and a status property to indicate a current status of the object.

11. A computer as recited in claim 8, wherein the SQL database class comprises at least one of the following properties:

a collation property to specify a column-level collation of a string datatype in the database;

a create-for-attach property to control database file creation;

a database status property to indicate a current operational status on the database;

a name property to define a label by which an object is known;

a primary file path property to return a path and name of an operating system directory containing a primary file for the database;

a size property to expose a total size of the database;

a space available property that returns an amount of disk resource allocated and unused; and a status property to indicate a current status of the object.

12. A computer comprising:

an operating system having an object-oriented management service to monitor, configure and control systems, services and applications represented by objects:

memory to store the operating system; and a schema for a structured query language (SQL) database maintained by the object-oriented service of the operating system, the schema being configured to represent the SQL database for the object-oriented management service and to manipulate classes included in the SQL database to model the objects that represent the control systems, services, and applications, the classes include:

a SQL objects class to represent objects in a database;

a SQL database class to represent instances of a SQL database;

a SQL table class to represent at least one table in the SQL database; a SQL column class to represent a column in the table;

a SQL trigger class to represent a trigger to be executed when a specified data modification is attempted on the table;

a SQL user defined function class to represent a user defined function in the SQL database;

a SQL stored procedure class to represent stored procedures defined in the SQL database;

a SQL view class to represent view tables in the SQL database;

a SQL stored procedure parameter class to represent input and output parameters of a stored procedure;

a SQL table column class to represent an association between the table and the column contained in the table;

a SQL table trigger class to represent an association between the table and the trigger defined for the table;

a SQL database table class to represent an association between the database and the table contained in the SQL database;

a SQL database user defined function class to represent an association between the database and the user-defined function defined within the SQL database;

a SQL database view class to represent an association between the SQL database and the view;

a SQL database stored procedure class to represent an association between the database and a stored procedure defined within the database; and a SQL stored procedure stored procedure parameter class associates a stored procedure to a parameter used in the stored procedure.

13. A computer as recited in claim 12, wherein the SQL objects class comprises at least one of the following properties:

a name property that defines a label by which an object in the objects class is known; and a status property to indicate a current status of the object.

14. A computer as recited in claim 12, wherein the SQL database class comprises at least one of the following properties:

a collation property to specify a column-level collation of a string datatype in the database;

a create-for-attach property to control database file creation;

a database status property to indicate a current operational status on the database;

a name property to define a label by which an object is known;

a primary file path property to return a path and name of an operating system directory containing a primary file for the database;

a size property to expose a total size of the database;

a space available property that returns an amount of disk resource allocated and unused; and a status property to indicate a current status of the object.

15. A computer as recited in claim 12, wherein the SQL table class comprises at least one of the following properties:

an attributes property to indicate various aspects of the table;

a database name property to indicate a name of the database of which the table is part;

a data space used property to report storage space used by rows of the table;

an index space used property that returns a quantity of disk resource used to store indexes;

a rows property that returns a number of rows in the table; and a status property to indicate a current status of the table.

16. A computer as recited in claim 12, wherein the SQL column class comprises at least one of the following properties:

a computed property that indicates whether the column is computed based on other values in the database;

a datatype property that indicates a datatype for the column;

an identity property that indicates whether the column is an identity column for the table;

a length property that indicates a maximum number of characters or bytes accepted by the column;

a table name property that indicates a name of the table that a key is defined in; and a status property to indicate a current status of the table.

17. A computer comprising:

an operating system having an object-oriented management service to monitor, configure and control systems, services and applications represented by objects, the operating system being configured to execute on one or more processors included in the computer; and a schema for a structured query language (SQL) database maintained by the object-oriented service of the operating system, the schema being configured to represent the SQL database for the object-oriented management service and to permit manipulation of classes to model the objects that represent systems, services, and applications, the classes that include:

a SQL objects class to represent objects in a database;
a SQL column class to represent a column in the table;
a SQL index class to represent an index for a table; and
a SQL index column class to represent an association between the index and the column.

18. A computer comprising:

an operating system having an object-oriented management service to monitor, configure and control systems, service, and applications represented by objects, the operating system being stored in memory included in the computer; and a schema for a structured query language (SQL) database maintained by the object-oriented service of the operating system, the schema being configured to represent the SQL database for the object-oriented management and to permit manipulation of classes to model the objects that represent systems, services, and applications, the classes include:

a SQL objects class to represent objects in a database;
a SQL constraint class to represent constraints defined in the SQL database;
a SQL table class to represent at least one table in the SQL database;
a SQL default class to represent attributes of a single SQL server default;
a SQL column class to represent a column in the table;
a SQL database class to represent instances of a SQL database;
a SQL datatype class to represent datatypes defined in a SQL server installation, the SQL datatype class having two subclasses that represent user data and system data;
a SQL check class to represent check attributes of a SQL server integrity constraint;
a SQL rule class to represent a single data-integrity rule;
a SQL table check class to represent an association between the table and the check attributes defined for the table;
a SQL user datatype default class to represent an association between a user-defined datatype and a rule bound to the column;
a SQL database default class to represent an association between the database and the defaults defined within the database;
a SQL column rule class to represent an association between the column and the rule bound to the column;
a SQL column datatype class to associate the column with its data type;
a SQL database rule class to represent an association between the database and the rules defined within the database;
a SQL user datatype rule class represents an association between the user defined datatype and the rule bound to the column;
a SQL database datatype class associates the database to the datatypes defined within the database;
a SQL base datatype class represents an association between the user-defined datatype and the system datatype; and
a SQL column default class to associate the column to the default for the column.

19. A computer comprising:

an operating system having an object-oriented management service to monitor, configure and control systems, services, and applications represented by objects, the operating system being configured to execute on one or more processors included in the computer; and a schema for a structured query language (SQL) database maintained by the object-oriented service of the operating system, the schema being configured to represent the SQL database to the object-oriented management service and to permit manipulation of classes to model the objects that represent systems, services, and applications, the classes include:

a SQL objects class to represent objects in a database;
a SQL constraint class to represent constraints defined in the SQL database;

a SQL table class to represent at least one table in the SQL database; a SQL column class to represent a column in the table;
a SQL database class to represent instances of a SQL database;
a SQL key class to represent keys defined for the table, the SQL key class having two subclasses that represent candidate keys in the table and foreign keys in the table, the candidate key subclass having two subclasses that represent unique keys and primary keys;
a SQL key column class to represent an association between a key and the column that is part of the key;
a SQL table key class to represent an association between the table and the key defined for the table;
a SQL referenced table class to represent an association between the foreign key and the table that contains the primary key referenced by the foreign key;
a SQL database candidate key class to represent an association between the database and the candidate key that is present in one of the tables in the database; and
a SQL referenced key class to represent an association between the foreign key and the candidate key that the foreign key references.

20. A computer comprising:
an operating system having an object-oriented management service to monitor, configure and control systems, services, and applications represented by objects;
memory configured to store the operating system: and
a schema for a structured query language (SQL) database maintained by the object-oriented service of the operating system, the schema being configured to represent the SQL database to the object-oriented management system and to permit manipulation of classes to model the objects that represent systems, services, and applications, the classes include:
  a SQL setting class to represent settings that are used to configure an installation of the database;
  a SQL objects class to represent objects in a SQL database;
  a SQL database class to represent instances of the SQL database;
  a SQL server class to represent instances of a SQL server;
  a SQL integrated security setting class to represent integrated security settings;
  a SQL DBMS user object class to represent objects related to user authentication;
  a SQL user class to represent users of the SQL database;
  a SQL login class to represent logins of the SQL database;
  a SQL role class to represent groups of users with similar security attributes of the SQL database, the SQL role class having two subclasses to represent a SQL server security role not constrained to operation within a single database and to represent properties of a SQL server database role;
  a SQL server integrated security setting class to represent an association between a SQL server installation and its security settings;
  a SQL server login class to represent an association between the SQL server and a login defined within the SQL Server;
  a SQL server role class to represent an association between the SQL server and server roles defined within the SQL Server;
  a SQL server user class to represent an association between the SQL server and a database user;
  a SQL database login class to represent an association between a database and a login that is mapped to a user defined in the database;
  a SQL database owner login class to represent an association between a database and the login mapped to the user that owns the database;
  a SQL user login class to represent an association between a database user and the login used to authenticate the user;
  a SQL member login class to represent an association between a SQL Server role and a login that is a member of the role;
  a SQL login default database class to represent an association between a login and the default database for the login;
  a SQL member user class to represent an association between a database role and a user that is a member of the role;
  a SQL DBMS object owner class to represent an association between a SQL server database object and the user who owns the object;
  a SQL database user class to represent an association between a database and a user defined for the database;
  a SQL member database role class to associate two database roles; and
  a SQL database role class to associate a database role to the database within which the role is defined.

21. A computer comprising:
memory to store an operating system, the operating system having an object-oriented management service to monitor, configure and control systems, services, and applications represented by objects; and
a schema for a structured query language (SQL) database maintained by the object-oriented service of the operating system, the schema being configured to represent the SQL database for the object-oriented management service and to permit manipulation of classes to model the objects that represent systems, services, and application, the classes include:
  a SQL objects class to represent objects in a SQL database;
  a SQL database class to represent instances of the SQL database;
  a SQL stored procedure class to represent stored procedures defined in the SQL database;
  a SQL table class to represent at least one table in the SQL database; a SQL user defined function class to represent a user defined function in the SQL database
  a SQL view class to represent view tables in the SQL database;
  a SQL DBMS user object class to represent objects related to user authentication;
  a SQL user class to represent users of the SQL database;
  a SQL role class to represent groups of users with similar security attributes of the SQL database, the SQL role class having two subclasses to represent a SQL server security role not constrained to operation within a single database and to represent properties of a SQL server database role;
  a SQL database role database permission class to represent permissions that a database role has for the database in which it is defined;
  a SQL user database permission class to represent permissions granted to a user for a database;

a SQL user stored procedure permission class to represent permissions granted to a user for a stored procedure;
a SQL database role stored procedure permission class to represent permissions that a database role has for a stored procedure;
a SQL user table permission class to represent permissions granted to a user for a table;
a SQL database role table permission to represent the permissions that a database role has for a table;
a SQL user defined function permission to represent permissions granted to a user for a stored procedure;
a SQL database role user defined function permission to represent permissions that a database role has for a table; and
a SQL user view permission to represent permissions granted to a user for a view.

22. A computer comprising:
an operating system having an object-oriented management service to monitor, configure and control systems, services, and applications represented by objects; and
a schema for a structured query language (SQL) database maintained by the object-oriented service of the operating system, the schema being configured to represent the SQL database for the object-oriented management service and to permit manipulation of classes to model the objects that represent systems, services, and applications, the classes include:
a SQL database class to represent instances of the SQL database;
a SQL table class to represent at least one table in the SQL database; a SQL index class to represent an index for a table; and
a SQL key class to represent keys defined for the table, the SQL key class having a subclass that represents candidate keys in the table;
a SQL file group class to represent attributes of a SQL server file group;
a SQL extension class to represent extensions made via associations to a managed system element;
a SQL extends class to associate a first class with a second class that extends the first class by defining new properties and methods;
a SQL file group database file class to associate a database file group to operating system files that are part of the group;
a SQL index file group class to represent an association between an index and a file group that stores the index;
a SQL key file group class to represent an association between a key and a file group used to store the key;
a SQL table file group class to represent an association between a table and file groups used to store the table;
a SQL table text file group class to associate a table with a file group; and
a SQL database file group class to represent an association between a database and a file group that contains operating system files that store data for the database.

23. One or more computer-readable storage media comprising an operating system that is executable to provide:
an object-oriented management service to monitor, configure, and control systems, services, and applications represented by objects;
an object-oriented database schema for a SQL (structured query language) database maintained by the object-oriented service, the an object-oriented database schema being configured to represent the systems, services, and applications as objects and to permit manipulation of classes to model the objects that represent the systems, services, and application, the classes include:
database objects classes that represent components of a SQL database;
application system classes that represent settings, services, and transaction and error logs used by the SQL database;
security classes that represent users, roles, authentication login, and permissions for the users and the roles to use the SQL database; and
physical storage classes that represent physical files and file groups used by the database system to store data.

24. One or more computer-readable media as recited in claim 23, wherein:
the database objects class comprises multiple classes representing tables, views, stored procedures, indexes, constraints, and keys;
the application system class comprises multiple classes representing settings, services, and transaction and error logs used by the database system; and
the security class comprises multiple classes representing users, roles, authentication login, and permissions for the users and the roles.

25. One or more computer-readable media as recited in claim 24, wherein permissions are modeled as association classes between database objects class and the users and roles.

26. One or more computer-readable media as recited in claim 23, wherein the database objects classes comprises at least one of the following classes:
an objects class to represent objects in the SQL database;
a database class to represent instances of the SQL database;
a server class to represent instances of a SQL server;
a table class to represent at least one table in the SQL database; a column class to represent a column in the table;
a key class to represent keys defined for the table;
a user defined function class to represent a user defined function in the SQL database;
a stored procedure class to represent stored procedures defined in the SQL database; and
a view class to represent view tables in the SQL database.

27. One or more computer-readable media as recited in claim 23, wherein the application system classes comprises at least one of the following classes:
a setting class to represent settings that are used to configure an installation of the SQL database;
a database setting class to represent operational settings for the SQL database;
a configuration value class to represent configuration values;
a language setting class to expose properties of a language record;
a registry setting class to represent the installation and run-time parameters stored in the registry; and
a server connection setting class to represent default connection settings.

28. One or more computer-readable media as recited in claim 23, wherein the security classes comprises at least one of the following classes:
an integrated security setting class to represent integrated security settings;
a user class to represent users of the SQL database;
a login class to represent logins of the SQL database; and
a role class to represent groups of users with similar security attributes of the SQL database.

29. One or more computer-readable media as recited in claim 23, wherein the physical storage classes comprises at least one of the following classes:
- a file group class to represent attributes of a SQL server file group;
- a extension class to represent extensions made via associations to a managed system element;
- a extends class to associate a first class with a second class that extends the first class by defining new properties and methods;
- a file group database file class to associate a database file group to operating system files that are part of the group;
- a index file group class to represent an association between an index and a file group that stores the index;
- a key file group class to represent an association between a key and a file group used to store the key;
- a table file group class to represent an association between a table and file groups used to store the table;
- a table text file group class to associate a table with a file group; and
- a database file group class to represent an association between a database and a file group that contains operating system files that store data for the database.

* * * * *